United States Patent [19]
Holm-Kennedy et al.

[11] Patent Number: 5,784,507
[45] Date of Patent: Jul. 21, 1998

[54] INTEGRATED OPTICAL WAVELENGTH DISCRIMINATION DEVICES AND METHODS FOR FABRICATING SAME

[76] Inventors: James W. Holm-Kennedy, 3215 Pacific Heights Rd., Honolulu, Hi. 95813; Koon Wing Tsang, 2352 Walnut Grove Ave., San Jose, Calif. 95128; Datong Yang, 744 East Georgia, Vancouver, British Colombia, Canada, V6A 2A3

[21] Appl. No.: 312,286

[22] Filed: Apr. 26, 1994

Related U.S. Application Data

[63] Continuation-in-part of Ser. No. 681,695, Apr. 5, 1991, abandoned.

[51] Int. Cl.$^6$ .................................................. G02B 6/293
[52] U.S. Cl. .................. 385/31; 250/227.23; 356/416; 385/36
[58] Field of Search .................. 385/14, 15, 24, 385/27, 31, 36; 359/885, 887, 890; 356/352, 416, 419; 250/227.18, 227.23, 227.24, 226

[56] References Cited

U.S. PATENT DOCUMENTS

| | | | |
|---|---|---|---|
| 4,902,136 | 2/1990 | Müeller et al. | 356/419 |
| 5,022,730 | 6/1991 | Cimini et al. | 385/27 |
| 5,128,798 | 7/1992 | Bowen et al. | 356/352 X |
| 5,144,498 | 9/1992 | Vincent | 359/885 |

*Primary Examiner*—John D. Lee
*Attorney, Agent, or Firm*—Flehr Hohbach Test Albritton & Herbert LLP

[57] ABSTRACT

A top incident spectrometer includes a first distributed wavelength wedge filter region of order $n_1$ that discriminates incoming radiation as a function of wedge location, at least one second wedge region order $n_2$ (which region may be a graded dielectric film), and an underlying detector array. In another embodiment, a second dielectric wedge element includes a Fabrey-Perot etalon, a wedge dielectric film, or a graded index film matching the second dielectric wedge region to an underlying substrate. One or more slopes associated with wedge elements may also be varied to alter filter characteristics. Spatial characteristics may further be modified by including a dielectric material whose dielectric constant varies as a function of location. Wedge filter crosstalk is minimized by partitioning a wedge dielectric region in the lateral dimension. Another embodiment provides an edge incident spectrometer including an optical waveguide or thin film structure whose spatial optical impedance varies as a function of position. Outcoupling of optical radiation occurs as a function of wavelength along the spectrometer propagation direction. Outcoupling of optical radiation may also be made to overlying structures, or to regions within a common, preferably solid state, structure. Wedge structures may further be combined to intentionally create gaps in the spectral transmission for a filter structure. A shadow masking fabricates thin film elements having spatially varying features. A material is deposited onto a substrate using an edge to provide a shadow mask affecting the deposition stream.

57 Claims, 27 Drawing Sheets

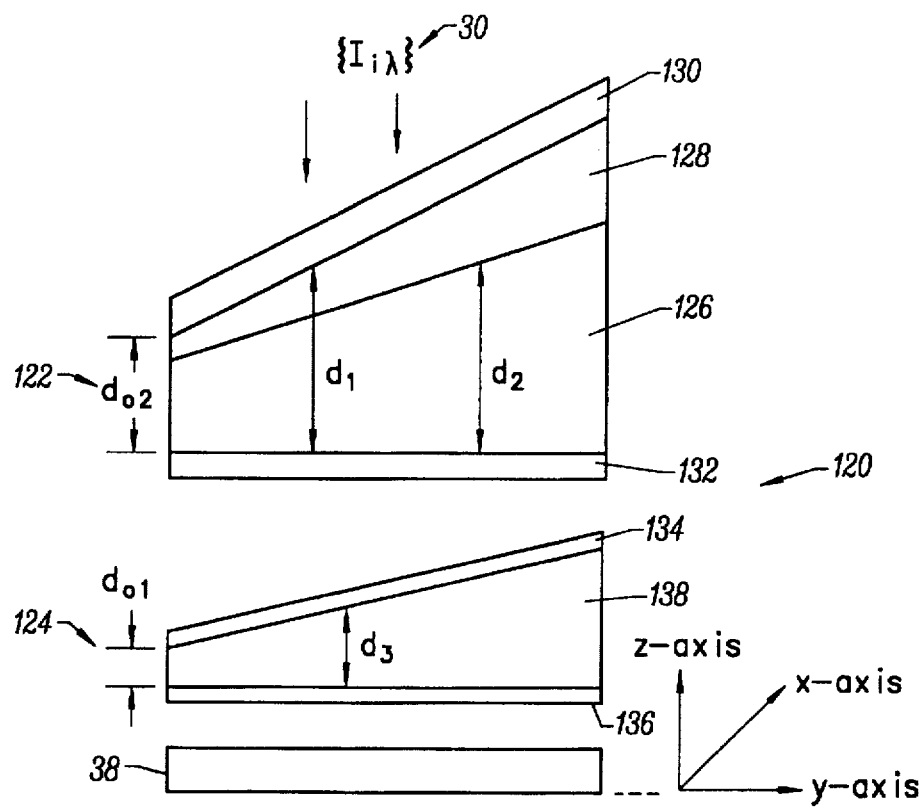
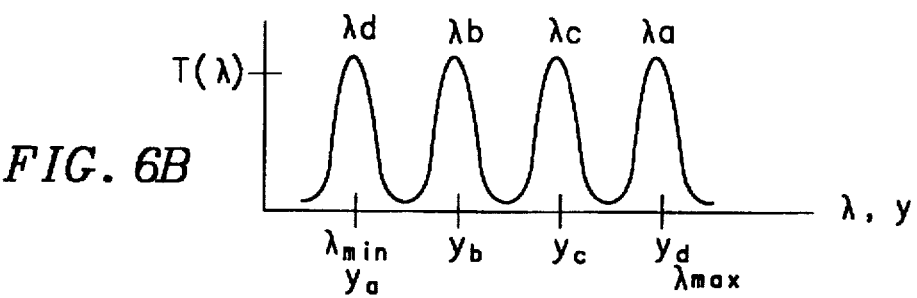
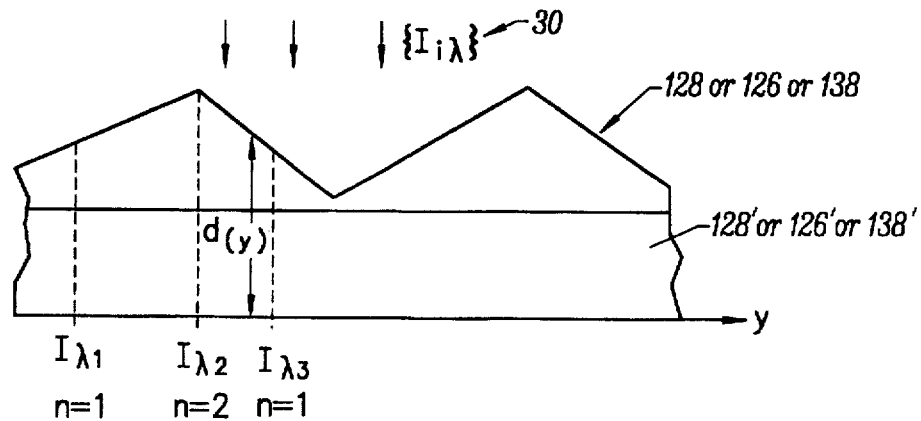
FIG. 6A
FIG. 6B
FIG. 6C

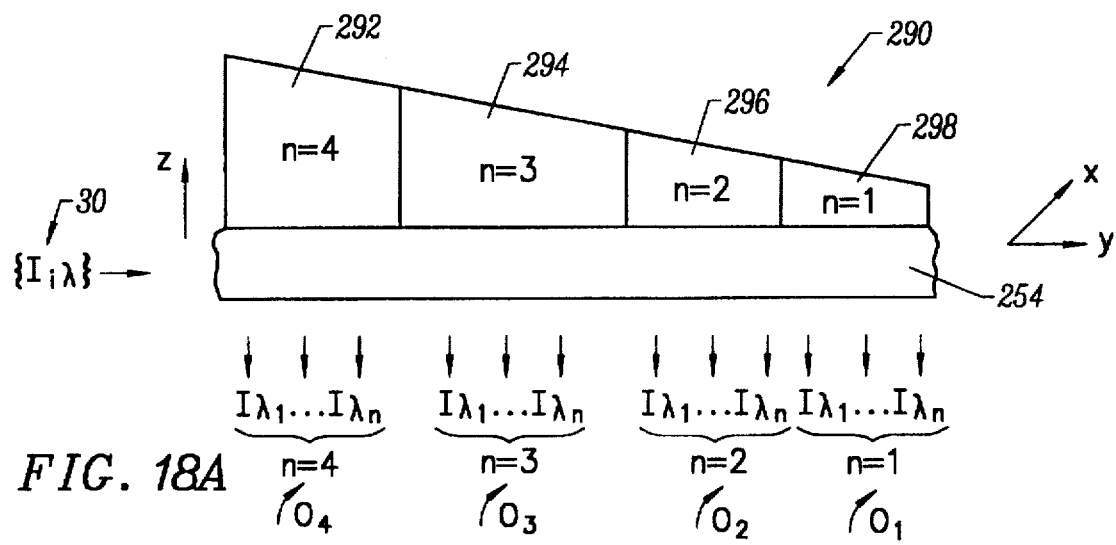
FIG. 18A
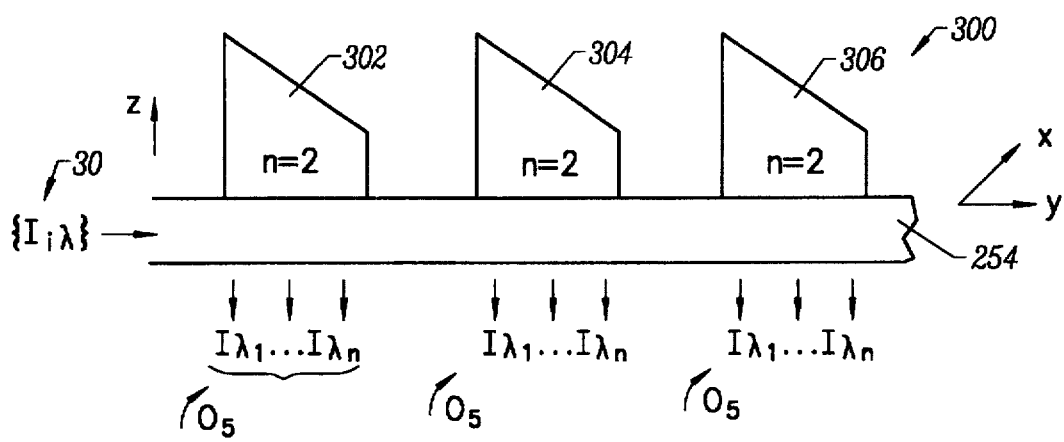
FIG. 18B
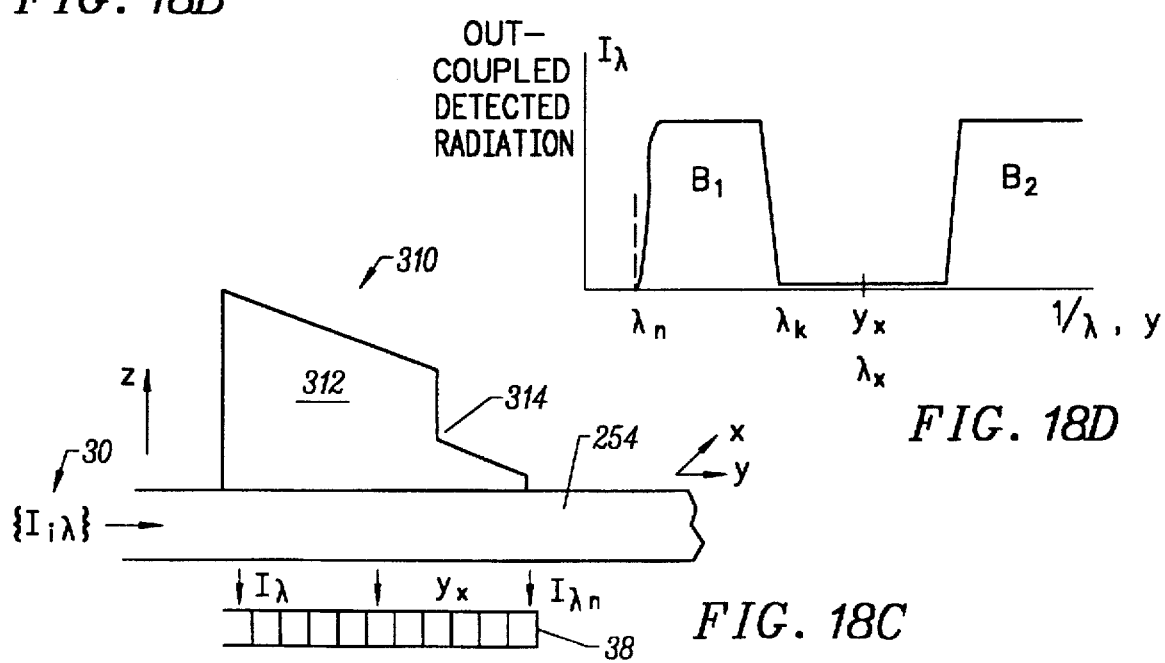
FIG. 18C
FIG. 18D 5,784,507

INTEGRATED OPTICAL WAVELENGTH DISCRIMINATION DEVICES AND METHODS FOR FABRICATING SAME

CROSS-REFERENCE TO RELATED APPLICATION

This is a continuation-in-part of prior applications Ser. No. 07/681,695, filed on Apr. 5, 1991, now abandoned.

FIELD OF THE INVENTION

The present invention relates generally to devices that discriminate optical wavelength, and more specifically to twin film optical devices that spatially separate and discriminate incoming optical energy, which the devices then distribute and process according to wavelength and/or optical energy. The present invention further relates to shadow mask technology for batch fabrication of thin films with spatial and composition inhomogeneities.

BACKGROUND OF THE INVENTION

Optical energy may contain useful information such as in optical communications wherein information is carried via a light carrier. Multiple optical wavelengths may be used to transmit information, wherein each wavelength of optical energy acts as an optical carrier that can convey different information.

Many devices are known in the prior art to segregate optical energy according to wavelength or bands of wavelengths. In the field of spectroscopy, many applications utilize the distribution of optical energy by wavelength. Many materials have specific optical absorption and reflection properties, as well as emission spectral signatures. In applications where optical energy intensity, wavelength and possibly also wavelength distribution are known, a knowledge of the bandwidth of the light and perhaps its variation with time can be important in extracting information of interest from light measurements.

Color may be comprised of a band or combination of wavelengths, and can carry information. Thus, identification, discrimination and measurement of color are also of importance in many applications. Spectrometers are often used to separate light according to wavelength, and numerous embodiments of spectrometers and color generating and separating devices are known in the art. Commonly recognized spectrometers include diffraction gratings and prisms. Spectrometers are also used for spectral imaging, wherein the same device images at various wavelengths.

Alternatively, light components may be separated by wavelengths or bands of wavelengths using optical filters having appropriate transmission or reflection coefficients. Frequently such filters are stacked dielectric type and comprise a relatively large number (e.g., 20) of individual layers of having various dielectric characteristics and thicknesses.

Such filters may instead be Fabrey-Perot etalon, a filter type having relatively few layers, wherein a dielectric material is sandwiched between two reflecting mirrors, and transmits a preselected optical signal. In Fabrey-Perot filters, a normally single narrow bandwidth transmission wavelength is determined by a resonance condition dependant upon the wavelength $\lambda$ of the optical energy transmitted and upon the thickness (d) of the sandwiched reflector dielectric, where $d=n\lambda/2$ and n is an integer. Generally, stacked dielectric and Fabrey-Perot filters are homogeneous in their transmission and reflection characteristics over the entire filter surface. Understandably, bandwidth is an important characteristic for a spectrometer, especially in applications where a narrow transmission radiation bandwidth is desired. Optical devices that can image at preselected wavelengths or bands of wavelengths are also important, for example a color TV vidicon tube. Further, imaging materials and processes by wavelength can be important diagnostic applications for such devices.

Prior art spectrometers are generally relatively bulky, fragile devices that require essentially one at a time fabrication, especially when compared to modern integrated circuits ("IC's"). Thus, there is a need for a low cost spectrometer that is rugged, small, relatively environmentally inert and lends itself to mass fabrication. The prior art has not succeeded in batch fabricating microspectrometers, e.g., spectrometers constructed on a truly microscopic scale and using batch processing to achieve low cost. Attempts have made to fabricate thin film etalons comprising a dielectric those thickness (d) varies stepwise and that overlies a series of photodetectors. Such thin film devices transmit a number of wavelengths equal to the discrete number of different thickness regions. As more regions of different dielectric thickness are provided, the number of measurable wavelengths increases.

Unfortunately, fabricating such thin film etalons economically using IC batch process techniques becomes difficult when more than a few wavelengths are of interest. Each additional wavelength region requires additional process steps in fabricating the device, and the number of increased process steps can rapidly become unduly large.

Another known approach for fabricating a microspectrometer relies upon a micromachined silicon-based micromechanical structure. The resultant structure is a voltage tunable Fabrey-Perot etalon with a beam or movable silicon plate whose distance (d) from an underlying second conductor plate changes with applied voltage. This in turn changes the resonant condition ($d=n\lambda/2$) for the Fabrey-Perot filter and its transmission wavelength, where n is the order number for the filter, and where $\lambda$ is the wavelength.

Unfortunately, micromechanical structures tend to be notoriously fragile and susceptible to microphonics or vibrations. Further, micromechanical structures are often large relative to many ICs, and their fabrication technology is not always IC compatible. As a result, fabrication is relatively expensive. Further, the resultant structure is not a real time measuring device in that micromechanical devices do not measure energy at all optical wavelengths simultaneous, a serious shortcoming for many applications.

One reported wedge filter structure suggests attaching a plurality of light-conducting fibers to the top of a wedge filter structure, which fibers conduct different wavelengths of light into the filter structure. A detector array is placed below the filter, apparently to detect light from the various fibers with wavelength corresponding to detector location. Unfortunately this reference does not suggest how such a wedge is to be fabricated, or how the plurality of fibers might be attached.

Wedge shaped thin-film Fabrey-Perot etalons are known, wherein the wavelength transmitted is determined by measuring the location of the transmission along the wedge plane with respect to the detector location. (See FIG. 1A.) However, such devices generally are large, having dimensions on the order of inches, are limited to rectangular or circular geometry. Further, such devices are subject to deposition limitations imposed by a flying shutter arrangement used in the fabrication process, in contrast to IC-sized devices that may be inexpensively batch produced. Efficient batch fabrication of small wedge filters using the flying shutter approach is unrealistic. Not surprisingly, monolithic integration of such devices onto an IC detector array is limited at best. Wedge shaped stacked dielectric filters comprising stacks of many dielectric layers are known. The use of two identical Fabrey-Perot wedge filters stacked one on the other is known. As used herein, "distributed wavelength" refers to an optical device that separates optical energy by wavelength such that different wavelengths exit the device at different physical locations along the device. Unfortunately, the in Fabrey-Perot wedge filters are thin, and the distribution of the reflector thickness (which often has a slope opposite in direction to the dielectric wedge slope) must be precisely controlled. These design constraints are difficult to meet using prior art wedge filter fabrication techniques. For example, fabrication involves precisely controlled moving parts, slow depositions, and tightly controlled shutter speed to achieve desired dimensional control. Such prior art fabrication manufactures but a few filters at one time, with resultant relatively high cost. Elimination of the reflector wedge shape, improvement in other performance features of Fabrey-Perot wedge filters and incorporation of batch processing would be very useful.

FIG. 1A illustrates respectively a generic prior art Fabrey-Perot first order (n=1) wedge filter 2 as including a thin dielectric $Al_2O_3$ film member 4 sandwiched between upper and lower spatially graded silver coating reflecting film members 6 and 8, whose reflectivity properties and thickness create a wavelength dependency. Members 2, 4, 6 are spatially disposed atop a transparent substrate 10. In FIG. 1A, as in the various embodiments of the present invention to be described, the plane of the filter is the plane of the x-axis and y-axis, to which axes the z-axis is normal. In FIG. 1A, incoming radiation 12 is shown as propagating substantially in the z-direction, and as such top illuminates filter 2. The incident intensity $I_\lambda(x,y)$ from this top incident radiation is received across the upper surface of filter 2, is distributed over the (x,y) dimension of the filter. (By contrast, in an edge illuminated structure such as described with respect to several embodiments of the present invention, illumination may be edge incident from the y-axis direction, and would be denoted $I_\lambda(y,z)$ .) In FIG. 1A, outgoing radiation 14 is transmitted across the bottom of the filter, for example wavelengths λ1, λ2 and λ3 being depicted at different lateral positions.

Member 4 example ranges from 170 nm to 70 nm in height. Above the location shown for λ1, which corresponds to about 459 nm (blue), member 6 is 54 nm, member 4 is 90 nm, and member 8 is 54 nm. Above the location shown for λ2, which corresponds to about 539 nm (green), member 6 is 44 nm, member 4 is 123 nm, and member 8 is 44 nm. Finally, above the location shown for λ3, which corresponds to about 620 nm (red), member 6 is about 40 nm, member 4 is about 141 nm, and member 8 is about 40 nm.

The spatial dependence of the dielectric and reflector films in the Fabrey-Perot wedge may form a spectrometer with a distributed wavelength filter characteristic. Unfortunately, one disadvantage inherent in the configuration of FIG. 1A is that most of the optical radiation incident 12 on filter 2 is rejected (e.g., wasted), rather than transmitted through the filter. Those skilled in the art recognize that the angle of incidence and radiation wavelength can influence reflection of incoming radiation.

FIG. 1B shows transmittance as a function of wavelength for the visible spectrum, for the above-described filter, for three wavelengths λ1, λ2 and λ3, corresponding to about 450 nm, 500 nm and 550 nm. Note that these wavelengths are detectable at different locations along the lateral dimension of filter 2. FIG. 1B further shows relative transmission amplitudes and bandwidths for these sample wavelengths, the bandwidths being in the range of about 18 nm to about 23 nm, bandwidths that are broader than desirable for many applications.

Prior art wedge filters such as shown in FIG. 1A can suffer from an inherent spatial bandwidth broadening (and apparent frequency bandwidth increase), often termed crosstalk. Although the upper surface of filter 2 typically receives many wavelengths of incoming energy simultaneously, consider what can occur for energy at a specific wavelength λ1, which wavelength may in fact be undesirable radiation.

Wavelength λ1 can enter the wedge filter member 4 through normal or, oblique incidence. For ease of understanding, λ1 is shown impinging upon the upper surface of filter 4 at an angle θ. Once coupled into the wedge, perhaps through scattering, this radiation can propagate somewhat laterally before exiting at one or more locations along the y-axis. In FIG. 1A, substrate 10 may be an underlying detector that correlates different wavelengths with different positions along the detector y-axis.

As shown, an incoming ray of wavelength λ1 can enter into wedge filter 4, partially reflect and partially transmit through film 8. Due to scattering and other effects, this radiation can be displaced laterally (rightward in FIG. 1A), such that part of the radiation is detected at a position $y_2$ corresponding to a wavelength λ2, which may in fact be close to λ1. However, detector 10 also erroneously detects radiation at locations y3 (corresponding to λ3, at y4 (corresponding to λ4, which typically is removed from λ1), and so forth. This phenomenon is called crosstalk, and has the undesired effect of producing frequency broadening at locations y3, y4, and so forth, and also undesirably increases the measured frequency and spatial bandwidths for filter 2. The problem becomes more severe when coherent, e.g., laser, radiation is present in that scattering in many directions will occur.

While it would often be desirable for transmission amplitudes to be constant at the various wavelengths, such characteristics are not present for the prior art configuration depicted. The inhomogeneous transmission characteristics are related to very slight errors in the thickness of film members 6 and/or 8, possibly 4, and their slopes. Again, the need to control the slopes of reflector members 6 and/or 8, especially to achieve flexible filter design, complicates the fabrication process. Thus, there is a need for bandwidth and transmission efficiency, and an ability to provide simultaneous real time measurement at all wavelengths.

Wedge filters in the prior art are generally limited to first order (n=1). Although large spectral ranges are often desired, first order Fabrey-Perot wedge filters exhibit a wavelength range limited to a factor of about 2 (if transmission wavelength ambiguity is to be avoided). Although high transmission efficiency is desirable, unfortunately first order wedge Fabrey-Perot etalons exhibit limited transmission(at reasonable transmission bandwidths), and the transmission-dependent bandwidth.

For example, FIGS. 1A and 1B indicate that a wavelength bandwidth of about 10 nm limits the transmission coefficient at the appropriate wavelength to about 40% for the filter shown.

Wedge filters have a wavelength bandwidth that decreases as 1/n, the narrower bandwidth resulting, undesirably, with a decrease in spectral range. The order n (an integer) may be increased by fabricating a thicker dielectric wedge member 4, which would narrow the wavelength bandwidth.

For first order filters, bandwidth increases significantly if filter transmission is increased, for example by thinning reflection films 6 and 8. In practice, reflective film layers 6, 8 are troublesome and are difficult to fabricate.

An increase in transmission without loss of frequency and/or spatial bandwidth is desirable in many applications, transmission coefficient as would an increase in and wavelength spatial separation and wavelength (frequency) resolution. Constant bandwidth devices are useful, as are devices whose spectral range has gaps. Gaps in incident radiation wavelength can occur from absorption of some wavelengths before they reach the filter, and for which wavelengths it would be wasteful to provide a filter/detector mechanism. Understandably it would be useful to be able to electronically control filter performance, optical modulation, optical band selection, optical band removal, transmission/reclection bandwidth control, transmission/reflection amplitude control, among; other parameters. It is also desired to suppress optical radiation incident angle dependence, especially for imaging applications.

As shown in FIG. 1A, reflector film members 6, 8 can have wedge slopes that differ in sign (e.g., orientation) and magnitude from the slopes of the wedge dielectric film member 4 shown in FIG. 1A. As noted, fabricating filter 2 can be problematic in the prior art. In the best case, one wants high performance with control of as many spectral parameters (spectral range, bandwidth, transmission efficiency, preselected bands of radiation, etc.) as possible, ruggedness, very small size, very low cost, real time measurement at all wavelengths, and in some instances imaging capability at multiple wavelengths.

Understandably, batch processing and IC technology fabrication compatibility for filters, including filter 2, is very desirable. Further, ease of fabrication and control of filter parameters during fabrication is also important.

In general, wedge filters as presently fabricated suffer from serious limitations, especially when real time simultaneous measurement at all wavelengths is desired. Other limitations relate to bandwidth control, spectral range, intensity of transmission, absence of real time processing, and rejection of most of the optical radiation incident across the wedge of a wedge filter spectrometer.

As noted, fabricating a wedge filter with a thick dielectric layer (e.g., increasing the order n) produces higher order resonance, with attendant bandwidth decrease (since bandwidth varies as 1/n). However, increasing n produces but a narrow spectral range, if one wishes to eliminate potentially ambiguous transmission of more than one wavelength at a spatial location along the filter. This limitation follows, since the resonance condition $d=n\lambda_1/2=m\lambda_2/2$ can be met at the same location for two different wavelengths simultaneously. The range of wavelengths that may be unambiguously determined is called the spectral range, and the integer number of m or n is called the resonance order or filter order number. The higher the order, the narrower the bandwidth and the narrower the spectral range.

Unless a narrow spectral range is acceptable, Fabrey-Perot wedge etalons are typically made first order to maximize spectral range. Generally, a larger spectral range is desired to insure maximum spectral measurement application potential with a single device. But even first order (n=1) devices have significant spectral range limitations and bandwidth-transmission limitations. However, there would be significant advantages to increasing the spectral range of a wedge filter. The bandwidth of a wedge etalon is determined in relation to the filter transmission coefficient and the filter order number (n).

In the prior art, high wedge filter transmission efficiency has corresponded to wide bandwidth for the radiation allowed to pass through the filter. However, narrow transmission bandwidths are often more desirable. Increasing reflector reflectivity decreases bandwidth for first order Fabrey-Perot wedge filters, but seriously reduces transmission. Ideally, a wedge filter should exhibit narrow transmission bandwidth, high transmission efficiency, and large spectral range.

Unfortunately, wedge etalons are optically inefficient in that they waste too much available radiation, due to reflection. If one wavelength is transmitted at a particular location, all other wavelengths are rejected, and thus reflected away. For example, if 1,000 wavelengths in a beam are to be sampled, 99.9% of the beam energy can be lost. Further, the reflected radiation can create adverse effects. For example, the radiation can interfere with signal fidelity in the detection environment, such as in a satellite mounted spectrometer.

A further limitation of prior art wedge filters placed over a detector array is their inefficient use of the underlying detector area. In certain applications there are optical radiation bands wherein there are gaps having little or no energy, such as in certain water vapor absorption bands in the infrared ("IR"). It would be desirable in a distributed wavelength spectral discriminating device to increase spectral range while removing these bands from incidence on the detector array.

Further, as with most spectrometers, it is often desirable to AC modulate the incident optical signal for later amplification of the detected signal. But such modulators are usually bulky, expensive, and are placed external to the spectrometer and in the incident or exiting optical radiation.

Fabrication technology used in the prior art appears to be the use of a variable speed shutter to control the location of material deposition and therefore film thickness and its spatial variation. Such technology requires tight control, is more suitable for large area filters than for small area filters, is relatively unsuitable for small area wedge filters, and is not a batch fabrication technology in the sense of IC batch processing technology. As a result, wedge filters filter structure fabricated using this technology have significant limitations in size, performance, numbers fabricated in a single process sequence and cost.

In summation, there is a need to provide integrated solid state optical wavelength discriminating devices including spectrometers that can provide real time detection and measurement of optical signals. Such devices should be of small size, resistant to environmental degradation effects, and be capable of being mass produced inexpensively using IC batch fabrication processes. There is a need for a fabrication process that permits integration with and use of on-chip detector array and signal processing electronics.

Preferably such devices should exhibit controllable bandwidth characteristics, good transmission efficiency over a wide angle of incident radiation, and wide spectral range including multiple spectral ranges. There is a need for such devices that can provide for internal AC modulation of the signal to be measured, and that exhibit minimum crosstalk. There is also a need for integrated spectrometer device arrays that can provide optical imaging at multiple wavelengths, and that can provide real time imaging arrays.

There is further a need for thin film devices that can split optical radiation into preselected beams, and that can provide beam splitting and dividing, redundancy of detection of optical radiation according to band or wavelength, and that can selectively eliminate unwanted optical radiation. The effect of an edge on a thin film spatial profile arising from a distributed deposition source has been reported by others to result. This includes the observation that a protrusion on a substrate can cause this type of shadowing effect on thin film deposition.

The present invention provides such optical structures and fabrication technology.

SUMMARY OF THE INVENTION

In a first aspect, a top incident spectrometer structure includes a first distributed wavelength wedge filter region of order $n_1$ that discriminates incoming radiation as a function of location along the wedge, at least one second wedge region of order $n_2$, and an underlying detector array. The resultant structure has a spatial transmission that varies along a lateral dimension of the spectrometer. According to the present invention, the second wedge region may be a dielectric layer sandwiched between reflecting films, or a graded dielectric film. The second wedge region can be selected to optimize optical energy separation by wavelength, to modify transmission coefficient and bandwidth, to alter the filter acceptance angle, to influence radiation matching to an underlying structure, as well as to optically outcouple energy to the detector array.

In another embodiment, the second dielectric wedge filter includes a Fabrey-Perot etalon, a wedge dielectric film, or a graded index film that matches the second dielectric wedge region to an underlying substrate. One or more slopes associated with wedge elements within the filter may also be varied to alter filter characteristics.

In a second aspect, a wedge filter includes a dielectric material whose dielectric constant varies as a function of location. The wedge may be coated with a dielectric film whose dielectric constant varies in the dimension normal to the filter plane. This construction focuses incident radiation permitting relatively obliquely incident rays to enter into the filter plane in a more normal orientation.

In another embodiment, crosstalk is minimized in a wedge filter by providing a wedge dielectric region that is partitioned in the lateral dimension, or by providing a semiconductor film whose bandgap is a function of location along such film.

In a third aspect, an edge incident spectrometer includes an optical waveguide (which may be, for example, a dielectric slab waveguide or thin film dielectric optical waveguide) or thin film structure whose spatial optical impedance varies as a function of position. The resultant structure causing outcoupling of optical radiation as a function of wavelength along spectrometer propagation direction, where outcoupling wavelength is determined as a function of direction by the thin film spatial characteristics. Outcoupling of optical radiation may also be made to overlying structures, or to regions within a common, preferably solid state, structure.

In another embodiment, a combination of wedge structures is selected to intentionally create gaps in the spectral transmission for a filter structure, thereby improving efficiency of the overall filter detector system.

In a fourth aspect, the present invention provides a shadow masking method that permits inexpensive batch process fabrication of many embodiments of the present invention. Thin films having spatially varying features are fabricated by depositing a material onto a substrate using an edge to provide a shadow mask. The masking function affects the deposition stream and thus deposition rate in at least one dimension for the structure under fabrication. Such deposition produces a film having at least one film property that varies spatially in at least one dimension. The spatially varying property can include film thickness, dielectric constant, index of refraction, optical loss, reflection coefficient, bandgap, reflectivity, absorption, transmission coefficient, phase shift, optical impedance, scattering centers, chemical activity, optical energy coupling performance, among others.

Other features and advantages of the invention will appear from the following description in which the preferred embodiments have been set forth in detail, in conjunction with the accompanying drawings.

BRIEF DESCRIPTION OF THE DRAWINGS

FIG. 6A depicts a nonresonant non-segmented filter system with spatial separation, according to the present invention;

FIG. 6B depicts spatially separated transmission for the filter system depicted in FIG. 6A;

FIG. 6C depicts a filter system with enhanced spectral range, according system for enhanced spatial isolation, according to the present invention;

FIG. 16E depicts various mechanisms for incoupling radiation to devices according to the present invention;

FIG. 18A depicts a four-region impedance wedge filter device, according to the present invention;

FIG. 18B depicts a three similar region device functioning as a, or beam splitter, according to the present invention;

FIG. 18C depicts a dielectric wedge filter with a step thickness and optical impedance discontinuity, according to the present invention;

FIG. 18D depicts outcoupled detected radiation for the embodiment of FIG. 18C;

DETAILED DESCRIPTION OF THE PREFERRED EMBODIMENTS

Figure 2:
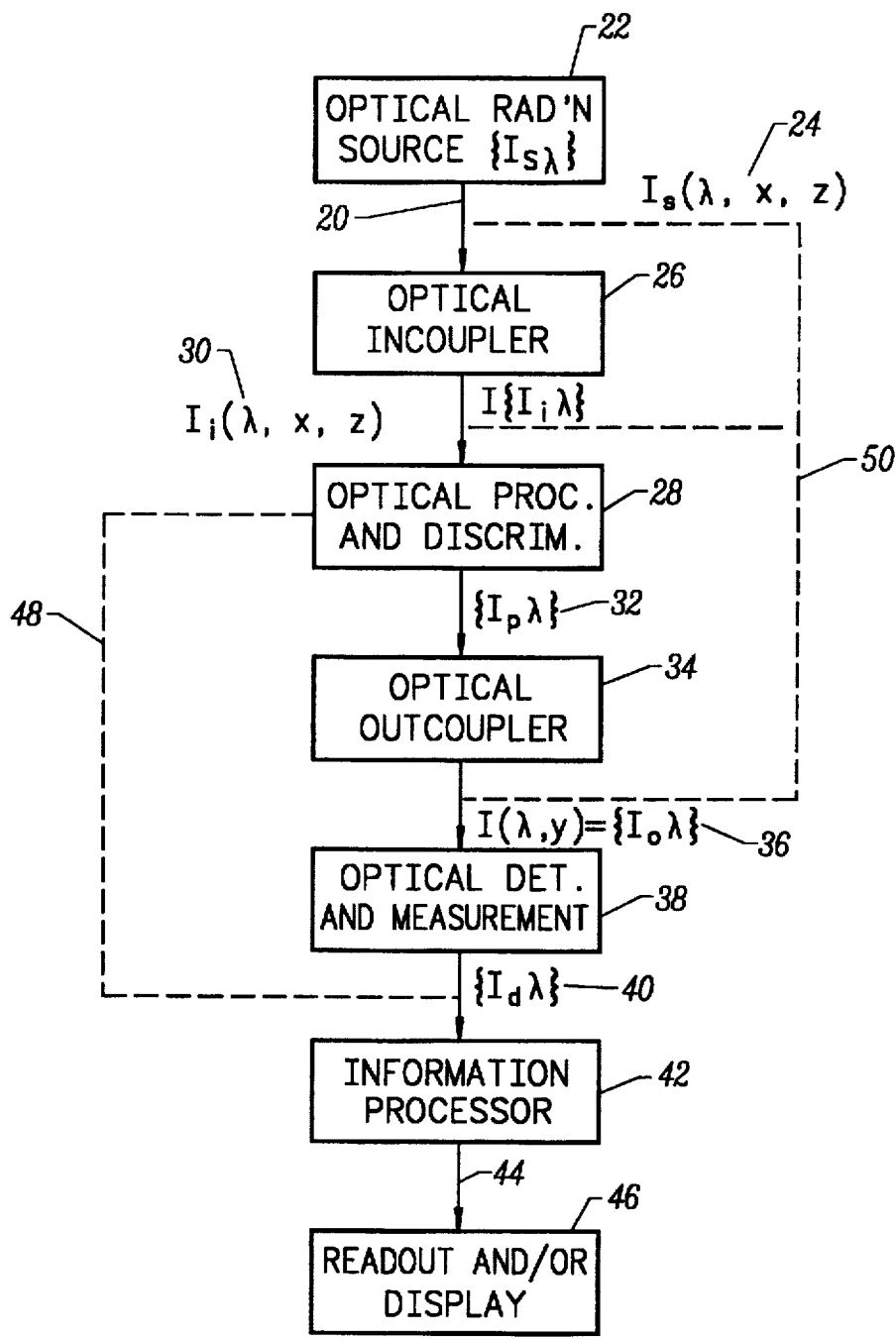
FIG. 2 is a block diagram representation of integrated optical wavelength discrimination devices and systems, according to the present invention.

Various embodiments of the present invention are schematically represented generically in the block diagram shown in FIG. 2. As shown therein a generic system according to the present invention receives optical radiation 20 from a source 22 that may be an object, an image, a reflection, a beam that has been transmitted through a material, one or more communication optical carriers, by way of example. Associated with radiation 20 are an optical radiation intensity and wavelength distribution, denoted $\{I_{s\lambda}\}$ or $I_s(\lambda,x,y)$ 24, where x and y are axes associated with the physical system. Radiation 20 is coupled by an optical incoupling mechanism 26 to an optical processor and discriminator unit 28. The radiation 30 presented to unit 28 has an optical radiation intensity and wavelength distribution denoted $\{I_{i\lambda}\}$ or $I_i(\lambda,x,y)$. Understandably, due to physical limitations inherent (by intent or otherwise) in incoupler 26, $\{I_{i\lambda}\}$ may be a subset of $\{I_{s\lambda}\}$.

As noted earlier, incident energy may be considered as being top incident I(x,y) or edge incident I(y,z), depending upon orientation of the radiation relative to the structure being illuminated. For example, for optical waveguide embodiments (to be described), the radiation is substantially incident from the y-axis direction, with the result that the incident intensity propagates along the y-axis and is distributed over the x,y coordinates of the structure. For top illuminated incoupling embodiments, the incident intensity is distributed over the x,y dimension of the structure and propagates substantially in the z-axis direction.

According to the present invention, unit 28 characterizes the incoming optical energy, and may include one or more of any of a variety of devices. For example, unit 28 may include a thin film spectrometer or other spectroscopic device that can separate optical intensity according to wavelength, and that can distribute optic intensity and wavelength spatially. By further example, unit 28 may include an optical electronic amplitude modulator and phase modulator.

The processed optical information $\{I_{p\lambda}\}$ is provided via an outcoupling mechanism 34 as $\{_{o\lambda}\}$ to a detector mechanism 38, wherein spatial distribution of the processed optical radiation is measured.

Although not required, optical incoupler 26 and outcoupler 34 may be provided by the same device that provides wavelength separation for the optical radiation $\{I_{p\lambda}\}$ 32. Examples of suitable structures for providing the incoupling and outcoupling mechanisms 26, 34 include a wedge dielectric film, a diffraction grating, an exit slit, a hologram, a groove, a distributed optical impedance device, a thin film structure, a textured surface, and so on. As used herein, "wedge" need not refer to a structure having a uniform slope, and thus can encompass non-linearly profiled wedge elements.

In a preferred embodiment, detector mechanism 38 has a distributed characteristic for measuring distribution of optical energy, such that a spatial location y along the y-axis of mechanism 38 corresponds to a particular wavelength $\lambda$. For example, detector mechanism 38 may include an optical detector array such as a silicon charge coupled device ("CCD") array, or a HgCdTe photodiode array.

The exiting detected optical radiation signal $\{I_d\lambda\}$ 40 contains information that is presented to information processor 42 for processing. Processor 42, by way of example, may include a microprocessor or a computer that compares the observed absorption spectra(signal) $\{I_{d\lambda}\}$ with spectra in a lookup table of spectra. The spectra in the lookup table (or equivalent) could relates optical characteristics for different materials, which would allow the system shown in FIG. 2 to identify, for example, one or more chemicals within a substance. The output 44 from the information processor 42 may then be coupled to a readout and/or display mechanism 46.

Collectively, optical incoupler 26, processor 28 and optical outcoupler 34 can represent a spectrometer. By also providing detector 38, information processor 42 and optional readout/display 46, spectroscopic identification and measurement capability are provided. As shown by phantom lines 48 and 50, in some embodiments is may be useful to reintroduce some of the radiation (or a related signal) back into the system to influence radiation 32 and 36. For example, it may be desired to introduce an internal AC modulation, or to block out some radiation band, or to introduce other optical radiation, or to control radiation phase shift, attenuation, bandwidth, spectral range, spectral extension and wavelength partitioning, optical band selection, or any combination of these alternatives.

As noted, the system of FIG. 2 may be configured as a thin film spectrometer that characterizes wavelength and energy distribution of incident optical radiation, and then processes such radiation. In some spectrometric application, it may be desirable to limit the optical characterization and processing to only a portion of the available optical radiation. Thus, the system may incorporate the further ability to measure amplitude and/or bandwidth of optical energy as a function of wavelength $\lambda$, to select and/or modify the spectral range, to remove undesired radiation bands, to modulate or otherwise control amplitude, phase, and polarization of the optical energy. Further, in many applications, the system must provide real time measurements of many wavelengths simultaneously.

It will be appreciated that it can be useful to partition the radiation into preselected bands that may be processed separately and perhaps in different ways. Further, it may be advantageous to divide a particular band of optical energy into several components of the same wavelength distribution, with the same or different amplitudes, phases, and bandwidths, and to use the component bands in different ways. This may be accomplished, for example, by reintroducing some radiation back into the system for processing the incident radiation 30, as above-described with respect to paths 48 and 50 (FIG. 2), to advantageously alter phase or other characteristics.

With further reference to FIG. 2, several embodiments of the present invention use one or more wedge shaped filters ("wedge filters") and detector arrays. These embodiments provide a distributed wavelength dependent spatial separation function (i.e., element 28), optical processing (e.g., element 34), amplitude measurement and wavelength identification (e.g., element 38). As will be described, several embodiments provide a distributed wavelength filter function for both transmitted waves (e.g., optical waves impinging upon the top of the filter unit 28, also called herein normal incidence waves) and reflected waves (e.g., waves at least partially reflected by filter unit 28).

It will be appreciated from FIG. 2, that if optical processor and discriminator 28 is, for example, a wedge shaped thin film Fabrey-Perot etalon, radiation not otherwise reflected will exit the bottom of element 28 at various physical locations that correspond to different exiting wavelengths. As used herein, a homogeneous thin film etalon will refer to an etalon that includes at least one homogeneous dielectric layer sandwiched between two homogeneous reflecting films. Such an etalon has homogeneous transmission characteristics independent of physical location across the etalon surface whereat optical radiation may be incident. An inhomogeneous thin film etalon has either geometric properties or material properties that vary as a function of location. For example, in the x-y plane, an inhomogeneous thin film etalon may have a film thickness that varies and/or thin film optical properties that vary in the x and/or y direction.

If detector 38 is a detector array disposed adjacent and beneath element 28 (typically in the x-y plane), exiting radiation will be detected as different pixels (or the like) at different physical locations along the length and breadth (x,y) of the detector array. Those skilled in the art will appreciate that a detector array, e.g., 38, comprises a plurality of detectors arrayed in a two-dimensional distribution. For example, the array will lie in the x-y plane for systems exposed to incoming optical radiation that comes essentially from the z-axis direction. Thus, a 1:1 correspondence will exist between radiation wavelength $\lambda$ and a detection signal 40 that is a function both of $\lambda$ and of physical location along element 28 and underlying element 38.

In this fashion, each detector component (e.g., a pixel) in the detector array 38 detects radiation intensity at each location and thus measures the optical energy magnitude for each wavelength $\lambda$ exiting the distributed wavelength optical filter 28. The resultant spectrometer system may be implemented using thin films and a detector array integrated into the same filter/detector device, or a filter and detector merged in hybrid fashion.

Figure 3A:
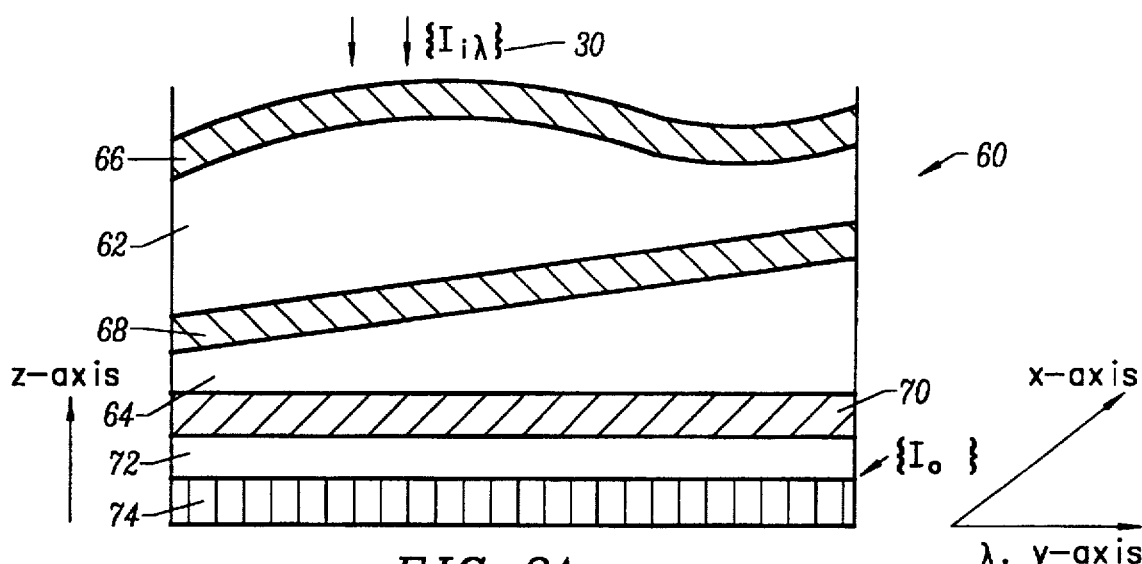
FIG. 3A depicts a generic wedge filter including homogeneously and inhomogenously graded components, according to the present invention.

FIG. 3A depicts a generic wedge shaped filter 60 according to the present invention, as including first and second dielectric filter member layers 62, 64, reflecting film members 66 and 68, and additional thin films 70, 72. Also shown in FIG. 3A is a detector array 74, which is analogous to the detector and measurement unit 38 shown in FIG. 2. As depicted, incoming radiation $\{I_{i\lambda}\}$ (which may be radiation 30 in FIG. 2) is presented to the top side of filter 60. Some of this radiation may be reflected away by the filter, and some of the radiation $\{_{o\lambda}\}$ (which may be radiation 36 in FIG. 2) will exit the bottom of filter 60 and enter detector array 74.

Although filter 60 is shown as including two wedge dielectric members 62, 64, in some embodiments it may suffice if but one of these members is present. In other embodiments, there may be more than two wedge dielectric members, and more than two reflecting films. For purposes of depicted various embodiments, members 62 and 64 are shown differently shaped, in that member 64 has a linear thickness profile, whereas member 62 does not. The present invention does not require, however, that the various dielectric members be shaped differently, and thus member 64 may be non-linear (but not necessarily with the same non-linearity as member 62), or members 62 and 64 may both be linear (but not necessarily with the same slopes or dielectric thicknesses).

Filter 60 may include more than two dielectric members 62, 64, which members will be separated from each other by an intervening reflecting film such as 68. Thus, the general embodiments available from what is depicted in FIG. 3A provide distributed wavelength filters with spatially inhomogeneous film thickness profiles, and inhomogeneous transmission characteristics. In general, one or more of the dielectric films (62, 64) and reflecting films (66, 68) may have inhomogeneous material properties as well.

It will be appreciated that optical energy $\{I_{o\lambda}\}$ exits filter 60 at locations along the horizontal x-y plane only where transmission wavelength constraints are met simultaneously by the dielectric members 62, 64, and the other thin film members 66, 68, 70, 72. By way of example, such transmission wavelength constraints may include the Fabrey-Perot resonator resonance constrain, the matching layer transmission constrains, and constrains associated with other filter elements, e.g., a bandpass filter, that may be incorporated in filter system 60. At a particular y-axis location y, both dielectric members 62, 64 will have a specific transmission dependence upon wavelength $\lambda$, which dependence may in fact be interactive, i.e., affected by the combination of the multiple dielectric members.

Thus, when optical energy wavelengths simultaneously meets the transmission requirements of all filter members 62 and 64 (or either alone if but one member is present) at a location along the horizontal x-y plane, incident optical energy is transmitted through filter 60. However, when transmission conditions for both filter members 62, 64 are not simultaneously met for a particular wavelength $\lambda$ at some location (x,y), energy at that wavelength is rejected by the filter. It will thus be appreciated that transmission only occurs for filter 60 for preselected wavelengths and at preselected (x,y) coordinate locations.

Figure 3B:
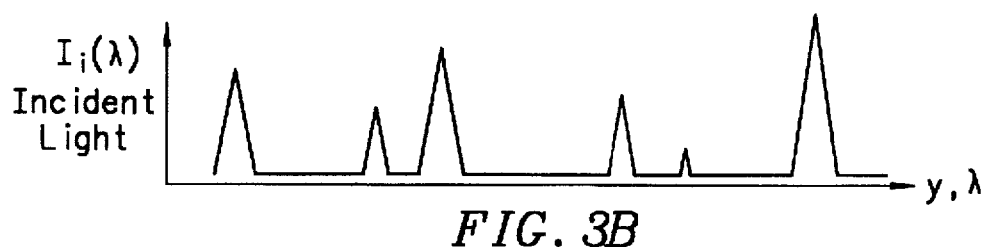
FIG. 3B depicts incident radiation presented to the filter of FIG. 3A.
Figure 3C:
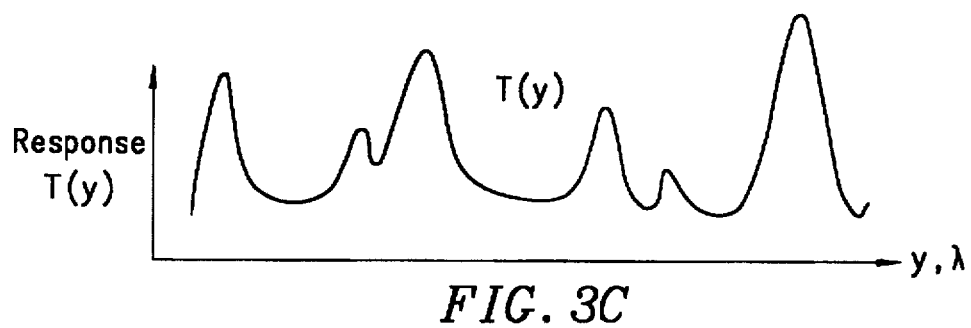
FIG. 3C depicts alteration of transmitted radiation by the filter of FIG. 3A.

FIG. 3B depicts optical energy $I_{i\lambda}$ incident on the filter portion of system 60, while FIG. 3C depicts the optical energy distribution as a function of wavelength ($\lambda$) exiting the filter function incident upon the underlying detector array 74. The incident energy wavelength dependence represented in FIG. 3B that is associated with a particular target optical signature, and the energy impinging upon the detector as shown in FIG. 3C can differ. For example, other energy sources may be present, perhaps including a source of high temperature blackbody-like emission, thermal radiation from within filter 60, and spatial bandwidth broadening effects can all contribute to such energy difference. Because of the preselected wavelength transmission and amplitude profile associated with filter 60, the detected wavelength and amplitude may not be the function of the (x,y) location as indicated by FIG. 3B (for y-axis location).

The ability of filter 60 to transmit only certain preselected bands of radiation, as shown in FIG. 3C can be especially useful for identifying certain preselected targets, e.g., target materials wherein each target has a specific associated optical wavelength signature.

Figure 3D:
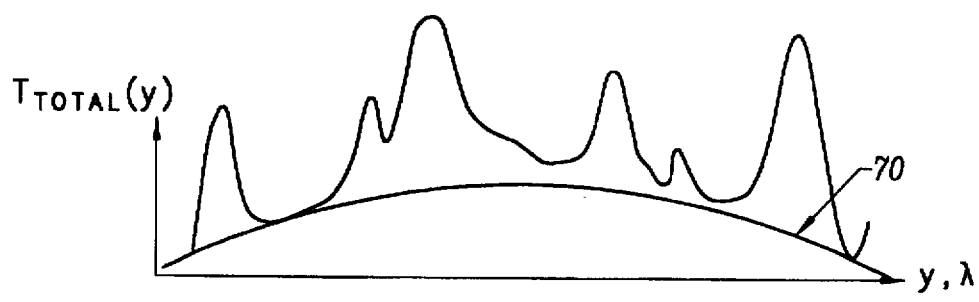
FIG. 3D depicts target radiation superimposed on high temperature source radiation for the filter of FIG. 3A.

By way of further example, if the source of the incoming optical radiation is "hot" and produces a significant high temperature source background radiation distribution 70 as shown in FIG. 3D, detector array 74 will provide a response superimposing the normal target T(y) response of FIG. 3C upon the source background response 70. However, by measuring the output from detector array 74 at several y-axis locations outside of the target radiation wavelengths of interest (e.g., such as outside of those shown in FIG. 3B), the background radiation may be characterized and subtracted from the target radiation. If desired, the background radiation could be used to provide a good measure of the background source temperature. It will be appreciated that in this example that both the target radiation and selective source radiation were transmitted through the filter to the detector array. With further reference to FIG. 2, the output from detector array 74 (e.g., 38 in FIG. 2) may be coupled to a computer or other processor 42 for comparison of the various transmitted radiation patterns with lookup tables for temperature, source and target information.

Figure 1A:
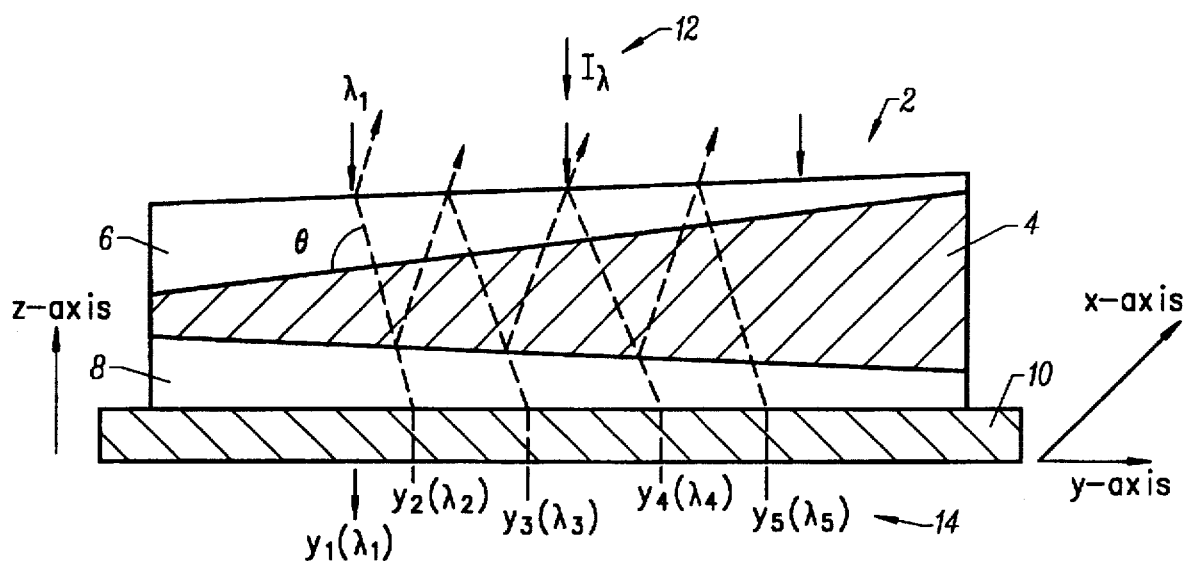
FIG. 1A depicts a distributed wavelength discriminating wedge filter, according to the prior art.
Figure 4:
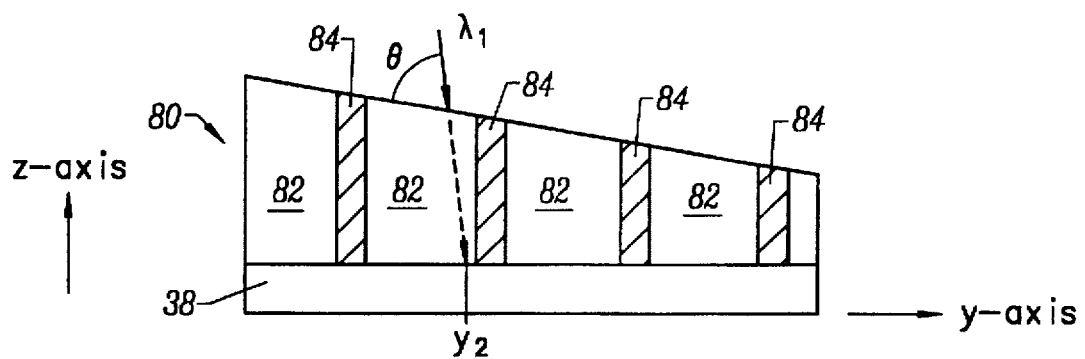
FIG. 4 depicts a wedge filter with reduced cross-talk and bandwidth widening, according to the present invention.

FIG. 4 depicts one embodiment of the present invention that is directed to problems associated with normal and oblique incidence, and crosstalk bandwidth broadening described with respect to FIG. 1A. In FIG. 4, a filter 80 has transmission regions 82 that are partitioned by etching grooves or gaps 84 between adjacent transmission regions. As shown by the ray of energy at wavelength $\lambda1$, these gaps prevent transit of unwanted radiation along and within the filter. Thus, underlying detector 38 will receive radiation at location y2 (corresponding to $\lambda2$, which is close to $\lambda1$), but receive no substantial radiation from $\lambda1$. Thus, in contrast to what was shown in FIG. 1A, filter 80 has improved crosstalk characteristics, and improved frequency and spatial bandwidth characteristics.

In FIG. 4, gaps 84 may be filled with a reflecting or absorbing material that absorbs all radiation incident on the gap, for example a lossy material, a reflective material, or even a dielectric material whose presence causes reflection at the slot location. The gaps may, but need not be, similarly sized, and may have other than a constant distance separating adjacent gaps as shown. Alternatively, where dimensions associated with the wavelengths at hand permit, the gaps may be sized such that resonance selectively blocks or alters the radiation transport. Of course, transmission regions 82 are defined for the bandwidth, detector separation and wavelengths of interest. Yet another embodiment forms a filter 80 having multiple quantum well structures with appropriate spacer bandgaps for absorption, and with appropriate transmission region bandgaps for spectral transmission. It is to be understood that the various other filter embodiments described in this specification may, if desired, be provided with gaps or well structures to improve crosstalk and bandwidth characteristics.

Having shown generally with respect to FIGS. 3A and 4, attributes of wedge filters according to the present invention, various preferred embodiments of wedge filter structures will now be described.

Figure 5A:
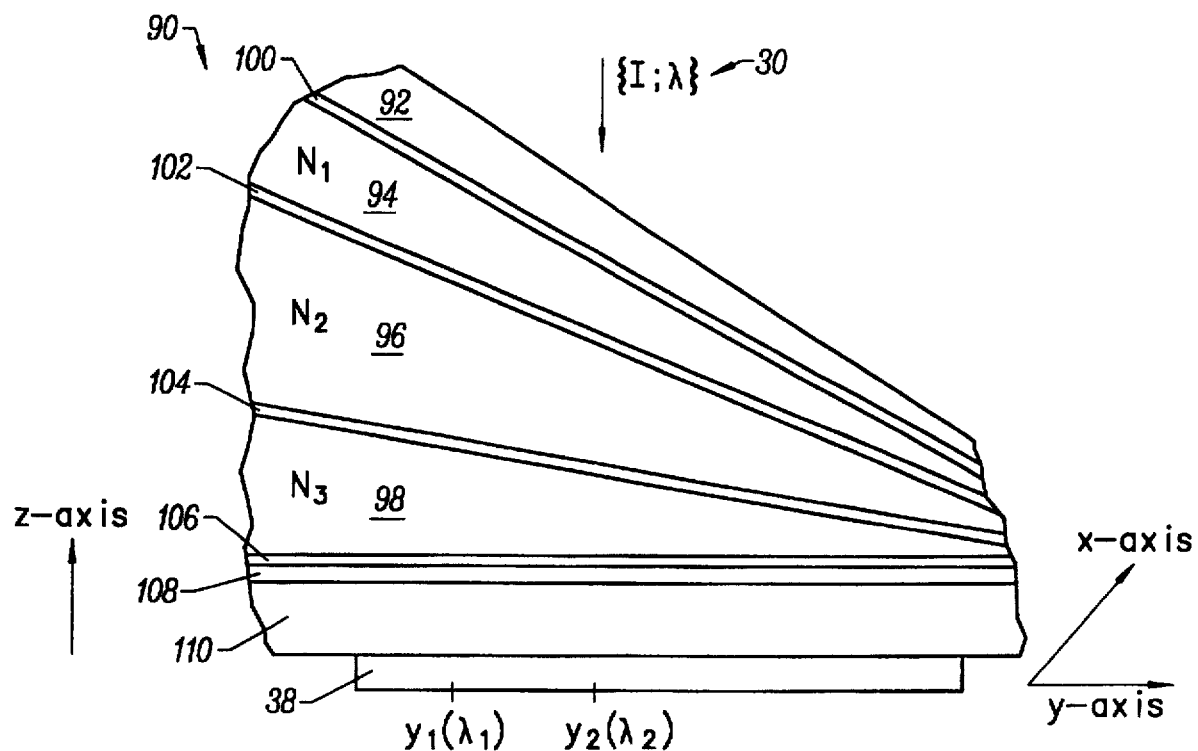
FIG. 5A depicts a generic multiple dielectric, multiple reflecting film filter system, according to the present invention.

FIG. 5A depicts a wedge filter 90 having four dielectric wedge regions 92, 94, 96, 98, and reflecting films 100, 102, 104, 106. Also shown in an optional thin film 108, and substrate 110, all of which are shown atop a detector array 38. It is understood that filter 90 may be analogous to element 28 in FIG. 2. Of course, more or less than four dielectric wedge regions may be used, and as described with respect to FIG. 3A, the various wedge regions need not all be linear, or if linear, have slopes of the same sign and magnitude. Further, as shown, the various wedge members may differ in wedge thickness, and may in fact have wedge thicknesses steps for certain applications. Further, it may be desirable to include grooves 84 in some or all of the wedges such as shown in FIG. 4, to obtain the enhanced crosstalk performance described above.

FIG. 5A is intended to illustrate by example potential useful embodiments of the present invention, and those skilled in the art will appreciate that other multiple film spectral filter embodiments may be derived from generic filter 90.

As will now be described, single and multiple wedge filter structures according to the present invention can advantageously provide optical impedance variation, useful to enhance optical transmission. Such impedance control, for example, enhances edge illuminated filter performance. Transmission through a thin film can be improved by adding a so-called quarter wave matching dielectric film, whose matching film thickness is essentially λ/4+nλ/2 if the dielectric film includes reflectors. This concept is extended and modified for coupling to certain embodiments herein. Impedance coupling to a wedge filter is complicated by the fact that the matching requirements are different for each spatial position along the y-axis, i.e., for different wavelength detecting locations in detector 38 (see FIG. 5A).

The present invention enhances optical impedance matching by providing a second wedge dielectric having appropriate thickness and y-axis dependency. With reference to FIG. 5A, assume that filter 90 includes a wedge-shaped Fabrey-Perot resonator filter member 96 and an overlying impedance matching wedge 94 (i.e., members 92 and 98 are not present). Uppermost reflector 100 may, but need not be present, although its presence or absence will influence impedance matching. Design of matching wedge 94 should account for all films above and below, and is preferably accomplished using known theoretical considerations and/or software. For example, for a first order Fabrey-Perot wedge resonator 96 having dielectric thickness λ/2(y) sandwiched between reflector films 102, 104, an optical impedance matching wedge 94 with thickness of about λ/4 (with reflectors) will improve filter transmission.

Precise thicknesses are preferably determined through analysis or theory and should account for any influencing films in the filter, including any underlying substrate(s). A wedge filter so matched has improved transmission, while exhibiting an essentially unaltered spectral range and bandwidth.

According to the present invention, a similar impedance matching wedge structure 98 could also be positioned below resonant Fabrey-Perot filter 96, with reflector film 106 present or not, according to the requisite performance. Again, detailed layer thickness dependencies are determined through computation or application of suitable software that accounts for all pertinent and influencing films in the multiple film system. This second matching wedge element 98 improves transmission, and can improve spectral range. Further, there can also be a substantial improvement in overall transmission bandwidth.

Incorporating a third quarter wave matching filter member will improve filter 90 performance further. Such third filter member is similar to the depicted members 94,98 but may have a different order number for further spectral range improvement. It has been found that the present combination of three matching filters and a resonant Fabrey-Perot filter can provide 100% of the maximum transmittable energy. The only losses remaining appear to result from optical losses associated with the lossy features of the reflectors and dielectric films comprising the filter structures. Over 80% transmission (e.g., net after losses) can be achieved using a compounded wedge Fabrey-Perot and matching wedge combinations. This compares favorably with a single Fabrey-Perot wedge sandwiched between upper and lower thin dielectric layers, wherein transmission is about 40% for a similar bandwidth. As noted, spectral range and bandwidth can be much increased by the matching/Fabrey-Perot wedge filter combinations.

However, other embodiments of the present invention can improve bandwidth and spectral range while maintaining a much improved transmission compared to a simple Fabrey-Perot wedge. For example, since bandwidth is proportional to 1/n, providing a suitably high order wedge Fabrey Perot filter can improve bandwidth, although as noted spectral range decreases as n increases. However, incorporating multiple order filter components as herein described can enhance spectral range, even for increasing n.

Generally, bandwidth decreases with increasingly mode number (n) for either the optical impedance matching wedge structures described above, and for a Fabrey-Perot filter. However, by carefully adjusting the thickness (d) as a function of position (y) of the dielectric wedge members, e.g., 94, 96, 98 in FIG. 5A), one wedge component can provide a narrower bandwidth associated with its order number, and where the impedance matching structures provide improved transmission.

Thus, in FIG. 5A, Fabrey-Perot resonator dielectric member 96 may be second order and the matching first order. So doing will decrease the bandwidth by a factor of 2, while maintaining essentially the same spectral range. The resultant structure has improved transmission compared to a simple Fabrey-Perot wedge filter structure. In this example, the second order filter number decreases bandwidth (relative to a first order filter). The first order filter member blocks unwanted wavelengths that the second order filter member would otherwise have transmitted. Similarly, increasing the Fabrey-Perot dielectric resonator to an order n>2 further decreases the transmitted bandwidth.

With further reference to FIG. 5A, another embodiment incorporates different order numbers for the matching and for the Fabrey-Perot wedge filter members. In this fashion, higher order mode structures having decreased bandwidth and good transmission characteristics may be implemented. However, it is noted that combinations of mode numbers for the different dielectric wedge members, e.g. 94, 96, 98, may cause higher order modes to be transmitted through filter 90 with a potentially substantial decrease in spectral range.

However, such subsequent spectral range reduction can be averted, and in fact substantially increased over a simple first order Fabrey-Perot wedge filter, using an alterative embodiment of the present invention. By making the mode number of the various dielectric wedge filter members different, shorter wavelength, higher order transmission redundancy can be suppressed. This occurs because where one of the filters (e.g., wedge 94, 96, 98, depending upon how many wedge members are present) might transmit many wavelengths at a particular y-axis location, the remaining filters may not transmit at those same wavelengths.

Ideally, in this example, wedge filter members 94 and 98 are designed to reject all but one of the multiple wavelengths transmittable by wedge filter member 96. Analysis indicates that such a system is more optimal when the order number for the various wedge filter members are prime numbers. In such case, only when all the filter members can transmit more than one wavelength at a different y-axis location will there exist any ambiguity as to the transmitted wavelength. Further, such a prime number filter combination can be used to create a substantial increase in the spectral range of the filter. For example, the three filter members 94, 96, 98 may have associated mode numbers $n_1, n_2, n_3$ respectively equal to 1,3,5.

In the above-described prime number filter combination, the combination of mode numbers determines the spectral range of filter combination transmission. As a rule of thumb, as the highest mode number increases, the overall filter bandwidth narrows. Higher mode numbers, suitably selected for the multiple wedge filter regime, in combination can also result in higher spectral bandwidths. As a second example, members 94, 96, 98 may have respective order numbers $n_1=3, n_2=7, n_3=13$ to produce a filter combination having a substantially smaller bandwidth and a substantially larger spectral range than the above-described 1–3–5 order combination filter. Further, the 3–7–13 filter combination can still provide very high optical transmission at each wavelength, if desired.

Film 108 allows filter 90 as shown in FIG. 5A to implement internal AC modulation of an optical signal, a useful pre-detection feature. AC modulation avoids DC drift problems, but in the prior art, modulators or choppers that modulate the incoming signal $\{I_{f\lambda}\}$ are bulky, and can block some of the incoming radiation. However, if element 108 is a thin film whose dielectric constant is modulatable by an externally applied signal (e.g., a voltage, current, magnetic field) effective AC modulation can result. By using an electro-optic film to which an AC voltage is applied (via sandwich electrodes, not shown), film 108 modulates the dielectric constant. Thus, the degree of matching between wedge structure 90 and underlying detector array 38 may be modulated. Detector array 38 then receives optical energy having an AC modulation component, suitable for signal processing including AC amplification.

According to the present invention, AC modulating film(s) may be disposed within a particular dielectric wedge component, or provided as a separate layer. While such film(s) may alter various optical properties to achieve modulation, dielectric constant alteration is especially effective. A portion of the distributed wavelength filter structure may be designed for high sensitivity to a small change in effective dielectric constant, or to change in the dielectric constant of an included thin film. So doing readily achieves substantial optical energy AC modulation. For example, a very high Q (e.g., sharp) Fabrey-Perot wedge portion operating at high mode number can incorporate an electro-optic modulation film, using transparent conduction films as electrodes. By way of example, in the visible spectrum, indium-tin-oxide ("ITO") may be used, and in the infrared region, poly-silicon may be used.

Figure 5B:
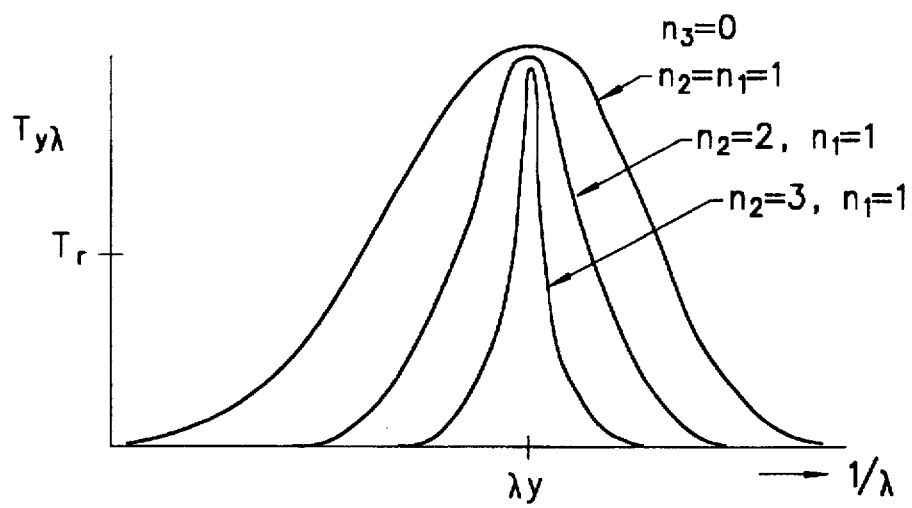
FIG. 5B depicts bandwidth as a function of filter member mode numbers for an embodiment of the system depicted in FIG. 5A.

Turning now to FIG. 5B, bandwidth narrowing is depicted as a function of order numbers $n_1$ and $n_2$ for various embodiments of filter 90 (see FIG. 5A), wherein filter combination 90 includes two wedge dielectric regions such as 94 and 98, wedge 96 being omitted. In FIG. 5B, $n_1$ is fixed at 1, and for three different filter structures $n_2$ is given order 1, 2, and 3. FIG. 5B is centered about frequency $\lambda_y$ and demonstrates that bandwidth can be narrowed, while maintaining a constant transmission amplitude $T_{y\lambda}$.

It is understood that the various bandwidths may be determined at a reference value of transmission Tr, and represent the horizontal half width of the three curves shown at that transmission reference. It is seen that the various bandwidths for transmitted radiation narrow essentially as $1/n_2$. It is noted that some adjustment of wedge member 94 may be required to maintain the constant amplitude transmission depicted. In this example, wedge members 98 and 94 may be combinations of Fabrey-Perot and matching members, two matching members, or two Fabrey-Perot members.

Figure 5C:
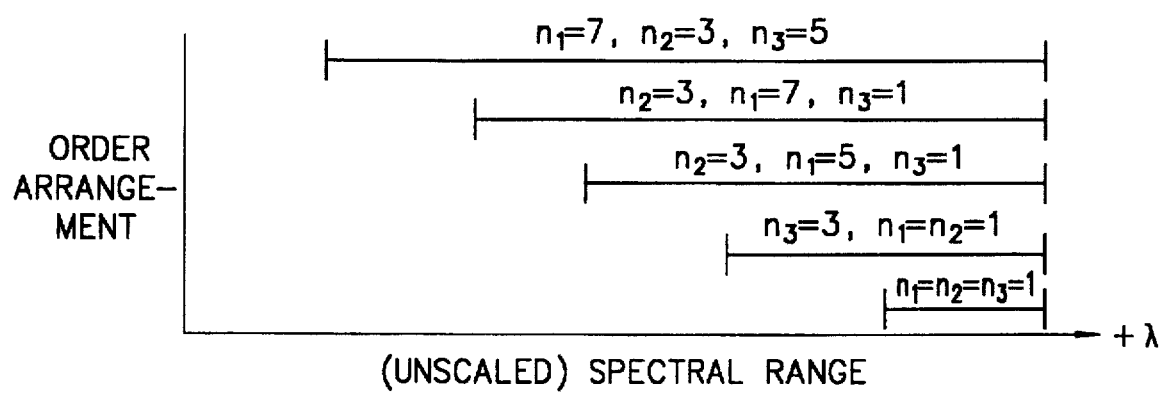
FIG. 5C depicts further combinations of wedge order numbers and resultant spectral ranges, for a filter as shown in FIG. 5A.

FIG. 5C depicts further combinations of wedge order numbers, wherein horizontal distances are not to the same scale as bandwidths in FIG. 5B. The ordinate scale in FIG. 5C is very non-linear to plot all spectral ranges. The data in FIG. 5C are plotted assuming that all filters were adjusted to provide the same long wavelength cutoff value.

The matching function provided by multiple wedge dielectric filter structures according to the present invention is quite versatile. By suitable adjustment of dielectric (and sometimes reflector) dimensions, matching of the overall filter structure transmission to a second optical structure, e.g., a substrate, another optical exit target, can be achieved. For example, essentially 100% of the exit radiation can be introduced into a very low dielectric substrate or very high dielectric substrates 110 (see FIG. 5A), such as silicon or other detector array materials (with or without additional thin films 108). Such incoupling of the filter exit radiation to a detector substrate directly impacts incident optical radiation detection sensitivity of the entire spectral measurement system.

Generally, incorporating reflector films above and below a wedge dielectric member sharpens the bandwidth associated with the particular wedge member. The use of matching wedge filter members with sharpness provided by two or more sandwiching reflectors still can provide excellent matching.

However, in some embodiments of the present invention, matching may be provided without sandwiching some of the dielectric wedge members between reflective films. Such non-reflector matching wedge filter components are more tolerant of slight deviations in the dielectric thickness profiles compared to similar wedge function where both dielectric wedge and reflecting films are included in the matching filter structure. Similar considerations apply to some other wedge combination embodiments described herein.

As a general rule, the incorporation of reflection films on either side of the wedge provides sharper dependence of wedge function on locations along that wedge component. Since the sharpness (e.g., bandwidth sharpness) can be controlled by one wedge reflector combination, more flexibility in fabrication can result from the selective elimination of some reflecting films (mirrors) in certain filter embodiments.

Figure 1B:
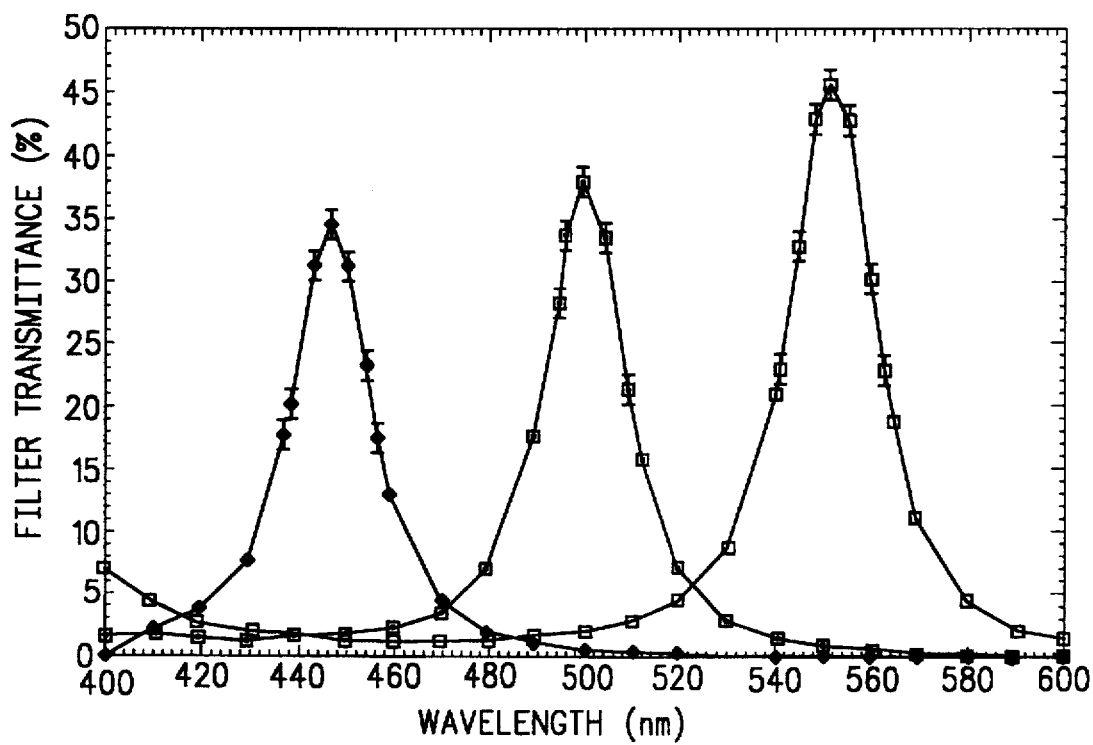
FIG. 1B depicts transmission characteristics as a function of wavelength for the filter of FIG. 1A.

As was noted earlier with respect to prior art FIG. 1A, fabricating wedge-shaped reflector films (e.g., 6, 8), which may have very tight slope constraints determined by reflector metal selection and applicable wavelength range, is difficult. In such prior art filters, the very strong influence of reflector 6, 8 (see FIG. 1A) thickness on transmission magnitude, and the addition influence of wavelength-thickness-transmission-reflection-loss relationship tightly constrains the film thickness and gradient. If these constraints, which can differ for each wedge (e.g., 94, 96, 98 in FIG. 5A) are not closely met, bandwidth and transmission inhomogeneities, such as shown in FIG. 1B, can result.

Understandably, elimination of these graded reflector metal components found in prior art Fabrey-Perot wedge structures would advantageously increase yields and performance, and decrease fabrication cost and inhomogeneous transmission characteristics. According to several embodiments of the present invention, metal wedge-shaped reflector films (e.g., 6, 8 in FIG. 1A) are replaced by readily fabricated homogeneous metal films (e.g., 102, 104 in FIG. 4A) in a filter having matching dielectric wedge(s) (e.g., 94, 98 in FIG. 5A).

The matching wedge dielectric thickness and thickness spatial dependence may be adjusted to accommodate the non-linear wavelength and spatial dependencies associated with a homogeneous thin reflecting film. The adjustment can be computed from theory or using available thin film filter software analysis. In addition to replacing hard to fabricate wedge-shaped metal reflectors with easily fabricated homogeneous metal films, the metal film thickness may be precisely controlled using known IC batchprocessing fabrication methods. Further, change in dielectric wedge spatial dependence is less dependent upon precise thickness percentage change than was the case for metal wedge-shaped reflectors. In the resultant filter system, grading metal reflector films is eliminated, further promoting ease and economy of fabrication, and yield of high performance optical filters for spatial separation by wavelength.

The present invention further provides spatial bandwidth control for filter systems. As noted, with respect to FIG. 4, spatial bandwidth and crosstalk present challenging problems in wedge filter design. As noted with respect to FIG. 4, in some embodiments, spatial bandwidth and crosstalk are suppressed using filter segmentation. However, FIGS. 6A, 6B and 6C depict embodiments wherein spatial bandwidth is enhanced; e.g., narrowed without necessarily using filter segmentation.

In FIG. 6A, a filter system 120 includes at least first and second wedge-shaped filter members 122, 124, which members may be any combination of a matching filter, a Fabrey-Perot filter, all Fabrey-Perot filters, or another combination of at least two wedge filter structures. In FIG. 6A, filter members 122, 124 and distributed detector 38 are drawn spaced-apart for ease of illustration, although in practice adjacent surfaces of these are in intimate contact with one another.

Let member 124 be a matching wedge and let member 122 be a Fabrey-Perot wedge, whose dielectric member 126 is selected to provide a continuous range of transmitted wavelengths as a function of y-axis location. Dielectric member 122 is augmented with an additional wedge dielectric member 128 having a different slope. In FIG. 6A, elements 130, 132, 134, 136 preferably are homogenous metal films. The resultant Fabrey-Perot wedge filter has a slope whose $n\lambda/2=d(y)$ transmission condition only occurs periodically along y-axis direction, where d is thickness along the z-axis. As shown by FIG. 6B, transmission occurs only periodically along the y-axis direction.

In FIG. 6A, the combined thickness ($d_1$) of members 126, 128 varies as $d_1=d_{o2}+\alpha_2 y+\alpha_3 y$, the thickness ($d_2$) of member 126 varies as $d_2=d_{o2}+\alpha_2 y$, and the thickness ($d_3$) of matching dielectric member 138 varies as $d_3=d_{o1}+\alpha_1$, where $\alpha_1$, $\alpha_2$ and $\alpha_3$ represent wedge slopes.

Matching wedge 124 has a slope selected to provide the appropriate matching and the exit optical radiation (shown in FIG. 6B) is not continuous as a function of y-axis position. Transmission conditions are only satisfied for the full filter system 120 (e.g., comprising all of members 122 and 124) at specific y-axis locations shown in FIG. 6B as corresponding to ya, yb, yc, yd. The resultant system 120 thus provides useful spatial isolation of the transmission of preselected wavelengths $\lambda_{min}-\lambda_{max}$. Thus, the described inclusion of a wedge dielectric combination with a spatially dependent transmission condition provides spatial isolation influences on preselected transmitted wavelengths. Intermediate to the preselected wavelengths ($\lambda a$, $\lambda b$, $\lambda c$, $\lambda d$), a predetermined amount of optical transmission occurs, which can be made substantially zero.

As shown by FIG. 6C, the spectral range of a selective spatially isolated transmission filter system can be enhanced forming one of the wedge dielectric members (e.g., 128, or 126, or 138) with a sawtooth profile. In practice a constant thickness layer of dielectric (128', 126', 138') may be formed, atop which a sawtoothed-profile layer of dielectric is then fabricated.

The sawtooth dielectric thickness profile depicted in FIG. 6C is intended to represent only a part of an entire filter structure, and may for example represent member 94 in FIG. 5A. In this example (wherein reflector members, if used, are not shown) the wedge dielectric provides a resonance order shift from along the y-axis dimension. The sawtooth dielectric wedge member in a filter system may (but need not) be sandwiched by reflecting films, since another dielectric wedge in the wedge filter combination can provide the narrow frequency bandwidth for transmission. Inclusion of such reflecting films generally depends upon overall performance criteria that can be characterized using known theory and/or soft-ware tools.

Figure 6D:
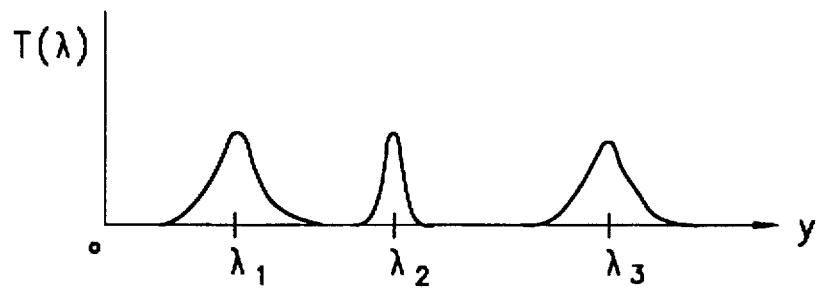
FIG. 6D depicts spatially separated transmission for the filter system depicted in FIG. 6C.

In FIG. 6C, phantom lines drawn for $\lambda_1$ and $\lambda_2$ indicate one spatial separation feature of this embodiment. To achieve a large spectral range and separation without extreme variation in the mode order number in a filter member, at least one filter member should vary appropriately in thickness. This "d" thickness variation is achieved in FIG. 6 by the sawtooth edge provided on dielectric layer 128 (or 126 or 138). The resultant sawtooth filter replaces the wedge filter shown in FIG. 6A on a stack. Transmission occurs only where the transmission conditions for both filters line up, indicated by the vertical phantom lines in FIG. 6C. The sawtooth profile helps keep the order variation for the resultant filter modest. Shadow masking according to the present invention may be used to fabricate the sawtooth-profile dielectric member 128, or 126, or 138. FIG. 6D depicts spatially separated transmission for the filter system depicted in FIG. 6C.

The present invention advantageously can provide other useful optical transmission functions, using combinations of wedge dielectric films and reflectors that may (but need not) also be wedge shaped. For example, transmission properties can be achieved that maintain a bandwidth that is a percent of the transmitted wavelength, that maintain a constant output transmission as a percentage of the incident radiation at each wavelength. Further, transmission properties can be achieved to maintain a bandwidth that is constant, independent of wavelength, and further, transmission properties can be achieved to provide specific functional dependencies of amplitude and/or bandwidth as a function of wavelength and location along the planar dimension.

In perhaps all of the embodiments described herein, it will be appreciated that the detector array 38 may be implemented to have different characteristics, for example, wavelength ranges, spectral ranges, in the x-axis and in the y-axis dimensions. Further, optical filter systems according to the present invention can provide parallel, duplicate, radial or other different spectral features, such as wavelength, transmission, bandwidth, spectral range, and the like.

Figure 7:
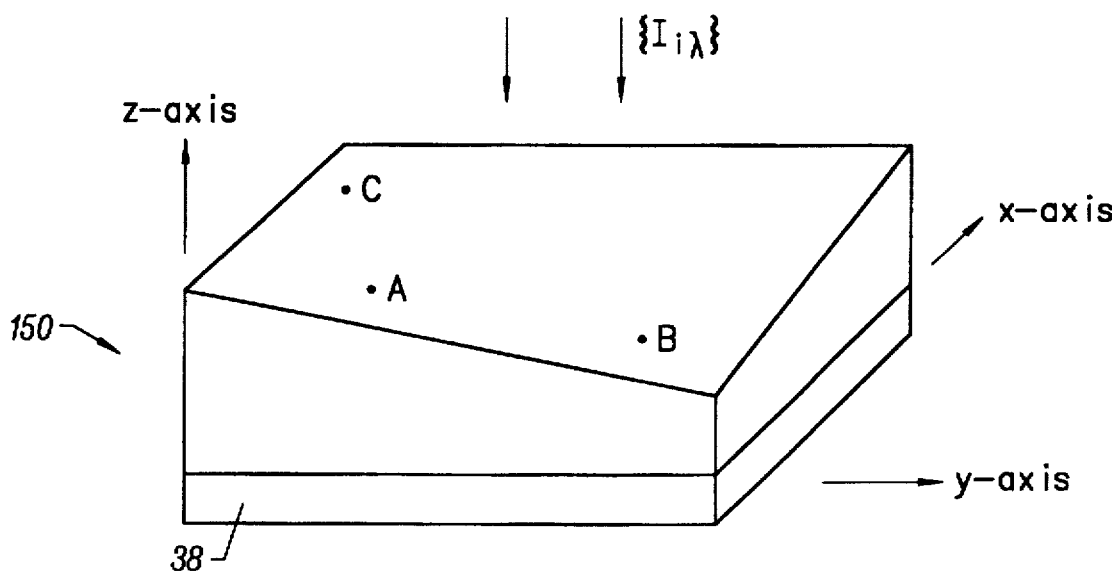
FIG. 7 depicts a filter system with multi-dimensional wedge thickness variation, according to the present invention.

FIG. 7, for example, depicts a simple embodiment of a filter system 150 whose spatial variation is a function of y-axis and x-axis location. As shown symbolically, spatial variation in the y-axis direction at locations A and B are different, and in the x-direction at location C spatial variation can be different still. As noted, the distributed detector 38 need not have linear characteristics across the x-y plane. In some embodiments where it is desired to linearize the performance of system 150 wherein non-symmetrical spatial characteristics are unavoidable, detector 38 may intentionally be fabricated to provide a measure of correction to the overall system response.

For ease of illustration a somewhat symmetrical filter system 150 is shown, but it will be appreciated that the spatial variation can be made to be symmetrical, nonsymmetrical be stepped, include at least one multiple wedge dielectric region, may include diffraction structure regions, holograms, optical guiding effects, groove isolation, among other regions.

In the prior art, fabricating system 150 would be challenging, to say the least. However, as will be described later herein, the present invention also provides an improved method of shadow masking that permits batch process fabrication of complex two-dimensional filter structures.

Other embodiments of the present invention that will now be described address the problem of oblique incidence common with Fabrey-Perot etalons. In general, the performance of such prior art filters is very sensitive to the angle of incidence of optical radiation impinging upon the filter surface. As the angle of incidence increases from 0°, filter transmission is generally reduced, undesired incoupling of optical radiation to the dielectric filter element can occur (see FIG. 1A), polarization effects can be present, among other problems.

Obliquely incident radiation can result from several factors, for example, filter misorientation, imperfect optics used to gather light in systems to increase the incident radiation intensity, and where images are focused on the wedge filter surface. Incident angle problems become more serious as the F number of the optical light gathering system is decreased. For imaging, the problems include relative transmissions that differ as a function of the image spatial distribution, and which translate to a false brightness profile.

Figure 8A:
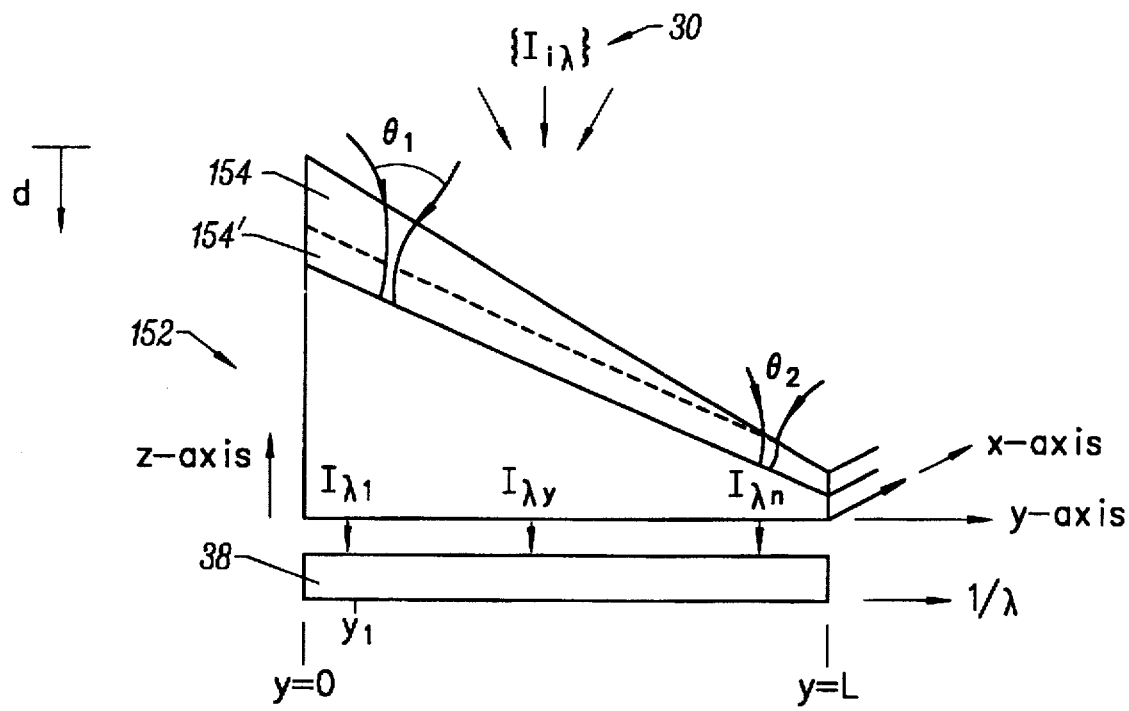
FIG. 8A depicts a filter employing a graded dielectric film to improve incident light focusing, according to the present invention.

FIG. 8A depicts an embodiment of the present invention that include a dielectric member that provides graded index focusing. The resultant filter systems are characterized by a more homogeneous acceptance of radiation, and by related homogeneous transmission features as a function of optical energy incident angle. Alternatively, these embodiments can provide a predetermined modification of filter performance as a function of optical energy incident angle.

In FIG. 8A, a filter structure 152 includes an overlying graded dielectric film 154, that may be wedge shaped or (as shown in phantom by 154') of constant thickness, where thickness is denoted as "d". For ease of understanding, underlying detector system 38 is shown spaced apart from filter structure 152. A wedge shaped graded dielectric film such as 154 has certain attractive features such as being tunable to a wavelength (e.g., $\lambda_1$) corresponding to a position (e.g., $y_1$) at a location along the filter, or to two locations (x,y) for two dimensional wedge filter structures.

As shown in FIG. 8A, wedge shaped graded dielectric member 154 permits a more homogeneous entry of optical rays $\{I_{i\lambda}\}$ 30 from various angles of incidence $\phi_1$ and $\phi_2$ into the underlying wedge shaped filter 152. In short, graded dielectric member 154 provides a wide acceptance angle $\phi$ of the top incident radiation. Although a constant thickness film 154' may also be used, wedge shaping can provide additional useful functions that improve performance as a function of targeted exit wavelength at each (x,y) location.

Figure 8B:
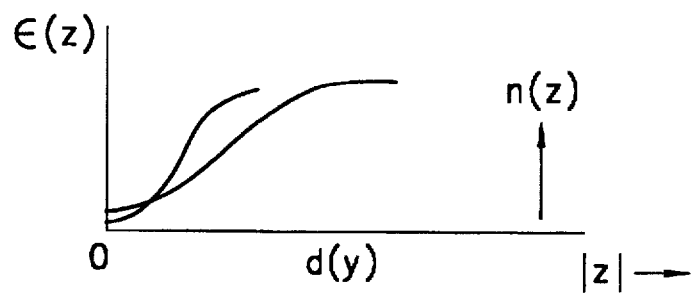
FIG. 8B depicts variation in a dielectric constant and index of refraction grading in the z-axis direction, for a film such as used in the filter of FIG. 8A.
Figure 8C:
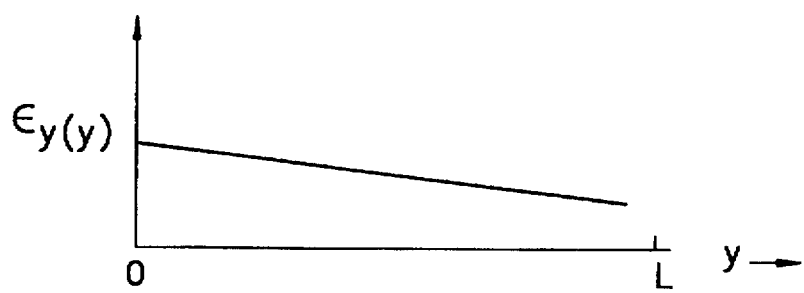
FIG. 8C depicts dielectric constant grading in the y-axis direction, for a film such as used in the filter of FIG. 8A.

As shown in FIGS. 8B and 8C, when a wedge graded dielectric 154 is used, generally one may provide dielectric constant gradients (e.g., $\epsilon(z)$, $\epsilon_y(y)$) that vary as a function of location z in the film 154. The ability to grade the graded dielectric film 204 thickness provides an additional design parameter useful for compensating for dielectric or metal reflector property dependence on wavelength, among other features.

It will be appreciated that wedge filters according to the present invention may be combined with other filter types, including "off-the-shelf" filters, either in integrated or hybrid fashion. For example, one or more bandpass filters may be mounted overlying filter 90 in FIG. 5A.

Repetitive transmitted wavelength range filters may be provided by yet another embodiment of the present invention. With further reference to the multiple wedge filter configuration of FIG. 5A, the spatial gradient of one of the wedge filters may be such that the thickness variation takes the filter through several different orders (e.g., values of n). In such an embodiment, the transmitted wavelength range repeats along the y-axis dimension. Each successive replication has a different bandwidth parameter as affected by the order change in the thickness-varying filter element.

Figure 9A:
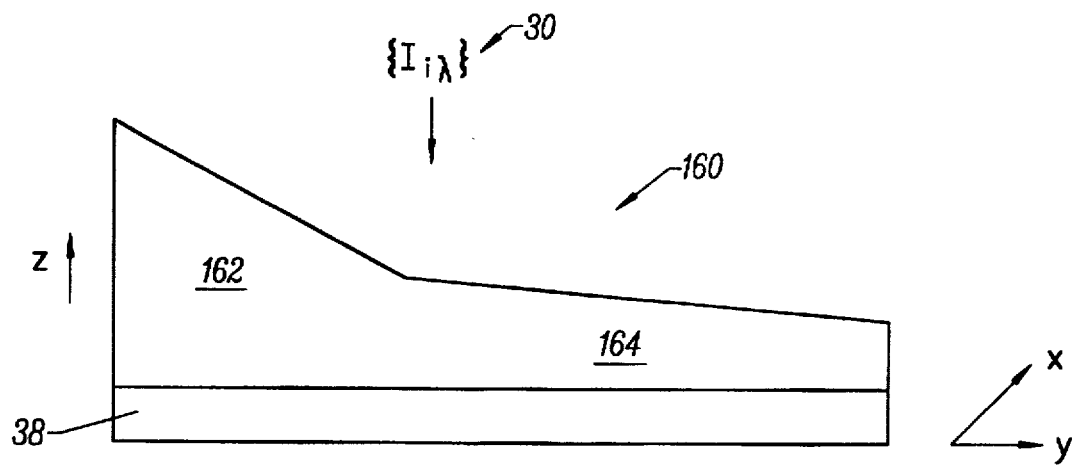
FIG. 9A depicts a stretched slope wedge filter, according to the present invention.
Figure 9B:
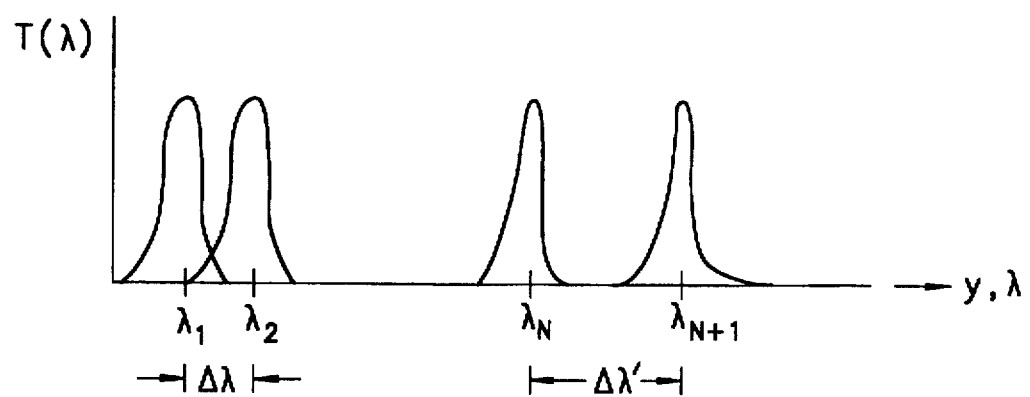
FIG. 9B depicts the spatial bandwidth and spatial separation characteristics for the filter of FIG. 9A.

FIG. 9A is directed to a stretched-length embodiment of the present invention, wherein a filter 160 includes a region of first slope 162 and a region of second, lesser, slope 164. As shown in FIG. 9B, due to the "stretched" length associated with region 164, radiation wavelengths exiting the filter are spread out along the y-axis (in this example) of underlying detector 38. As a result, the optical band of interest, perhaps blue/green, is spread out, allowing narrow spectral ranges to be addressed with high wavelength resolution using this embodiment.

The stretched-length embodiment of FIG. 9A is useful in many spectrometer applications, including imaging at different wavelengths, especially where different performance criteria are needed. For example, fiber optics may carry very closely spaced optical carriers that require separation. As another example, within the ocean there exists a narrow band of relatively good transmission in the blue/green spectrum. Communication and imaging within this band occur over a relatively short wavelength range, and thus related spectral separation requires good resolution, but need operate only over this narrow spectrum. Other applications may require large spectral ranges, in which case the need for several different wavelength ranges perhaps having differing performance needs exists. For example, both the narrow blue/green ocean band may be desired, as well as adjacent wavelength ranges requiring different wavelength resolution.

With further reference to FIGS. 9A and 9B, the smaller sloped region 164 of filter 160 may be designed to achieve a narrow bandwidth of the filtered optical radiation, for example, $\lambda_N$, $\lambda_{N+1}$. By contrast, steeper sloped region 162 provides a more spatially compressed spectrum, e.g., $\lambda_1$, $\lambda_2$, which may fall outside the blue/green spectral region in this example. Thus, the present invention permits partitioning the radiation spectrum into several parts, each of which may have differing amounts of spectral stretching. Of course, more than two differently sloped regions could be provided for filter 160.

Figure 10A:
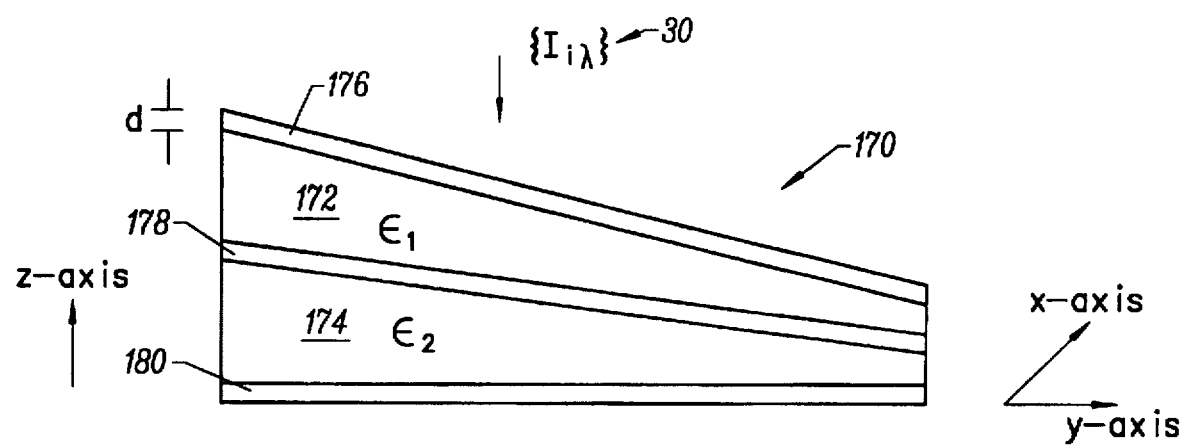
FIG. 10A depicts the use of wedge-shaped dielectric members to eliminate reflector grading requirements in distributed wavelength filters, according to the present invention.
Figure 10B:
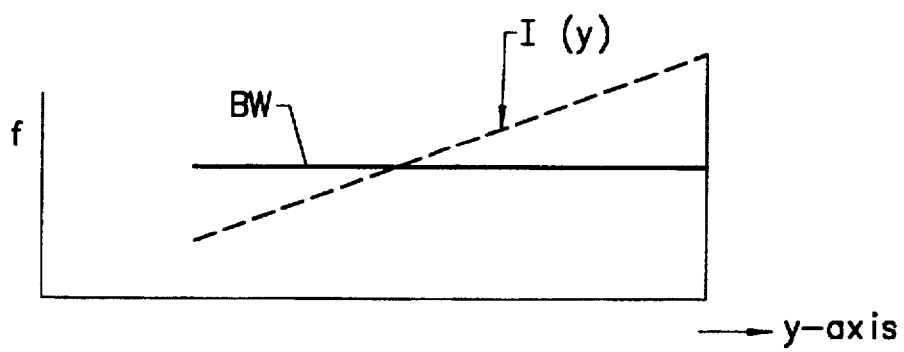
FIG. 10B depicts constant bandwidth and y-position dependent intensity characteristics of a filter embodiment such as depicted in FIG. 10A, incorporating selective reclector and dielectric film profiles.

FIGS. 10A and 10B will now be described with respect to filter embodiments wherein a wedge filter dielectric gradient obviates the need for difficult to fabricate graded metallic films. Returning briefly to the prior art Fabrey-Perot wedge etalon of FIG. 1A, recall that reflective elements 6, 8 are difficult to fabricate in that grading was required to create a constant transmission versus wavelength characteristic.

In FIG. 10A, filter system 170 includes first and second wedge dielectric members 172, 174 having respective dielectric constants ∈1, ∈2, sandwiched between reflector films 176, 178, 180, each having thickness "d". In this embodiment, the wedge-shaping of metal reflector films 6, 8 that were necessary in the prior art configuration of FIG. 1A are eliminated. More specifically, adjustment is made to the dielectric thickness profile of one or both wedge-shaped dielectric members 172, 174. Adjustment compensates for reflector reflectivity dependence upon wavelength and therefore only upon y. Such modification can also be used to selectively modify the effective reflectivity versus wavelength ($\lambda$) dependence and location dependence (y) for the reflector films 176, 178, 180 in other useful, predetermined fashions.

In FIG. 10A, reflector films 276, 278, 280 may be homogeneous in thickness, thereby simplifying the fabrication of filter 170, with resultant improved manufacturing control. Further, the reflector shapes may be used for other functions, and which FIG. 10A shows essentially identically shaped reflectors, their shapes may in fact differ. As such, the impedance matching function of the wedge dielectric elements may also be used for other impedance altering functions, while still maintaining the desired matching function and bandwidth selection.

It will be appreciated that the present invention permits control of intensity of bandwidth distribution by using wedge filter matching selections in conjunction with wedge reflectors. The use of a dielectric grading provides an additional design variable for filter matching purposes.

In the present invention, the various reflecting films (e.g., 66, 68, 70 in FIG. 3A, 100, 102, 104, 106 in FIG. 5A, and so on) need not be adjusted in slope to accommodate inhomogeneous reflection/transmission properties. This advantageously permits the use of reflecting film spatial thickness and composition distribution for other functions. As shown by FIG. 10B, one such other function can include providing a preselected transmission intensity function $I_\lambda(y)$ that depends upon position y, while maintaining a constant bandwidth BW that is independent of y.

Returning briefly to FIG. 5A, it will be appreciated that wedge dielectric members 94, 98, hitherto referred to as providing matching function, can provide other optical functions. Further, these other functions may have a large degree of useful spatial inhomogeneity in one or two dimensions (x, y).

Figure 11A:
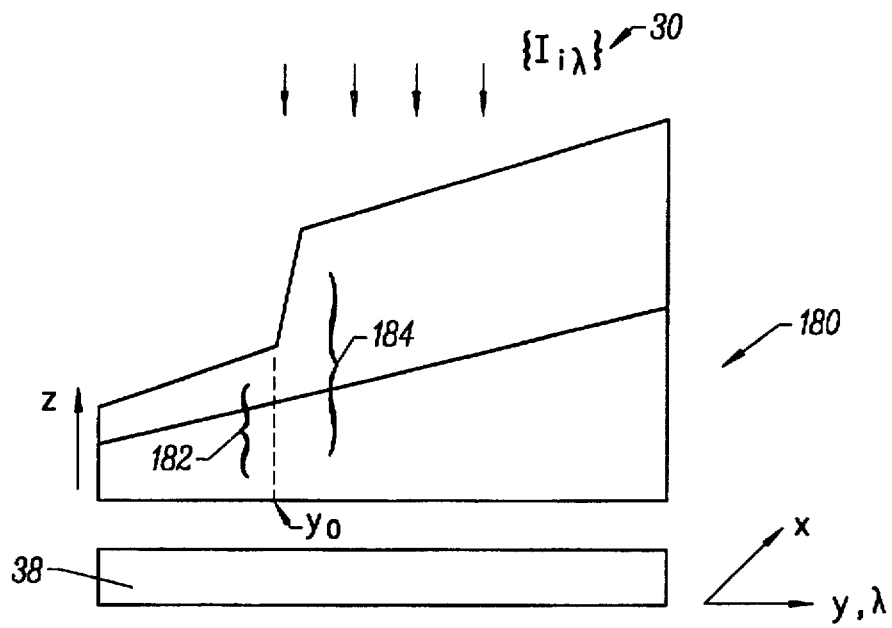
FIG. 11A depicts a filter embodiment that eliminates wavelength-selected bands of radiation, according to the present invention.

FIG. 11A is directed to a filter embodiment that eliminates wavelength-selected bands of radiation by providing transmission of only selected ranges of radiation. A wedge filter 180 is stepped such that the resonance and/or matching condition pass only optical radiation in the optical wavelengths bands of interest. For example, if structure 180, is a first order filter of homogeneous dielectric, region 182 will transmit shorter wavelength radiation than will region 184. As a result, there will be a significant discontinuity in the transmitted radiation at filter location $Y_o$.

Figure 11B:
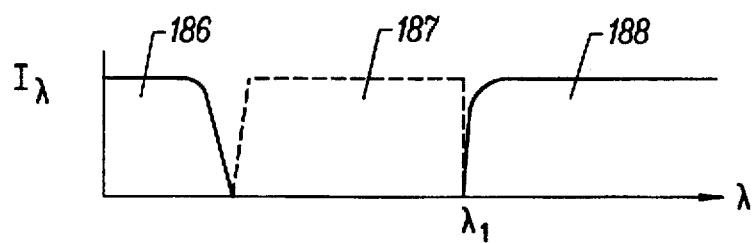
FIG. 11B depicts intensity output for the filter embodiment of FIG. 11A.

With reference to FIG. 11B, region 182 provides wavelength separation of the radiation band shown as 186. Note that at higher wavelengths $\lambda$, a wavelength band (shown in phantom as 187) is missing in FIG. 11B. However transmitted wavelengths begin again 188, adjacent first band 186 at transition location $y_o$ for wavelengths $> \lambda_1$. According to this embodiment, wavelength band control may be provided by stepping various dielectric films. These films can include a Fabrey-Perot resonator dielectric, a matching wedge dielectric, among other dielectric films.

The embodiment of FIG. 11A is especially useful in applications where there are missing wavelengths or bands of wavelengths, e.g., wavelengths not available for detection purposes. In other instances, there may be bands that do not provide useful information. Since optical radiation passing through the filter 180 impinges on an underlying detector array 38, fuller use of the detector array is made by not causing it to respond to useless wavelengths. The use of structure 180 in a spectrometer will increase overall spectrometer function. In an astronomy application, for example, in observing light from stars, planets and galaxies through the earth's atmosphere, certain bands of radiation are absorbed by water vapor. If useful radiation of certain wavelengths will not be incident on the spectrometer, the spectrometer should be designed to only observe wavelengths having a possibility of optical radiation.

Figure 12:
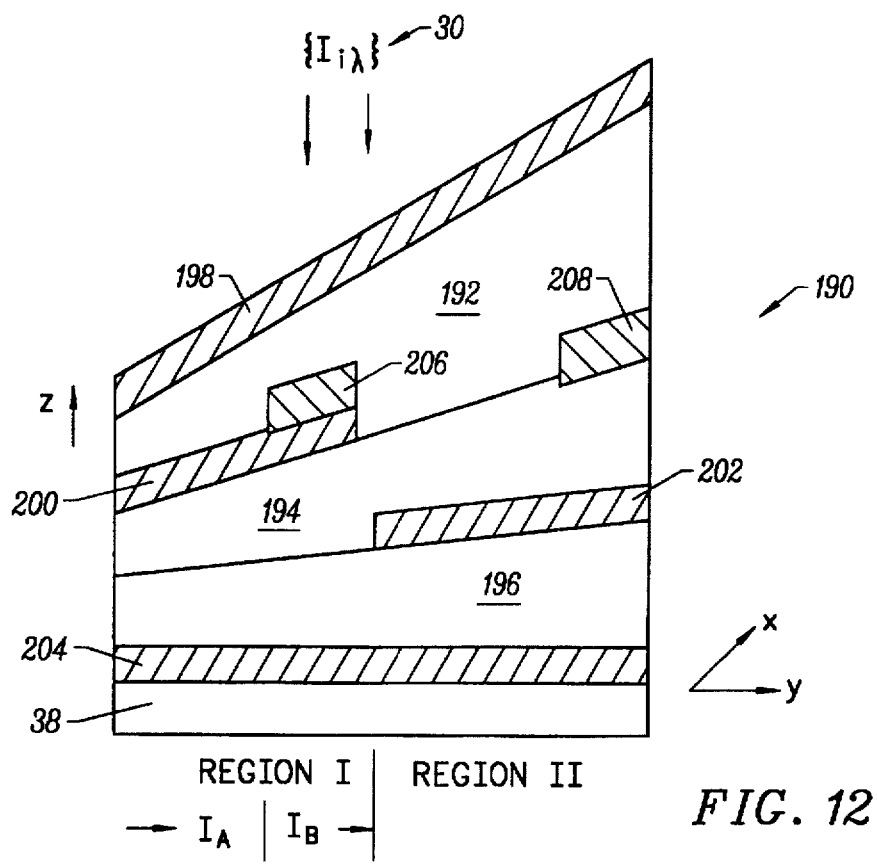
FIG. 12 depicts a wedge filter structure employing patterned dielectric, lossy and reflecting films, according to the present invention.

FIG. 12 depicts an embodiment employing pattern reflector and lossy films, to control preselected bands, bandwidth control, amplitude control, and other parameters of the optical radiation transmitted through the filter structure.

In FIG. 12, filter structure 190 includes various dielectric wedge shaped films 192, 194, 196, various reflecting metallic films 198, 200, 202, 204, and lossy thin films 206, 208. Structure 190 includes various interfaces between the dielectric films, patterned reflecting films, and lossy thin films. A detector array 38 underlies the x-y plane of filter structure 190.

The reflecting films provide essentially zero (or nearzero) constraint to the electric field of the optical wave being transmitted through filter 190. Thus, the reflecting metallic films force a nodal boundary condition where the conducting films are placed. The conducting films have some associated loss, which lossy features influence the transmitted optical radiation. Insertion of a lossy film 206 onto a conducting film 200 introduces additional loss, which loss is influenced by film thickness. If made of Au, Ag, Pt, and the like, the conducting films also are reflective, and may frequently be termed reflecting conducting films.

Alternatively, insertion of a lossy film by itself, e.g., 208, causes a loss of radiation that would otherwise have an electric field component at that location. If the optical electric field magnitude at the location of lossy film 208 is small, the losses are reduced. Thus, different wavelengths can be made to experience different amounts of attenuation by lossy film 208. The amount of attenuation will depend upon wavelength, film lossiness, film thickness, and lossy film placement within the dielectric wedge structures, e.g., within 192, 194, 196 in the embodiment of FIG. 12.

Patterning the reflecting and lossy films can thus provide preselected transmission features for spectral resolution by the resultant multiple component wedge filter 190. For example, only bands having harmonic relationships might be of interest, or perhaps different amplitudes and bandwidths.

Patterning can also be used to block transmission in selective regions. For example, there may exist locations in detector array 38 above which structure is present (such as metal interconnects between detectors or between detectors and other devices). At the correspond ing detector locations, undesirable diffraction may occur if the radiation wavelength into the detector array is on the order of the interconnect dimensions. The present invention provides selective patterning to block such radiation transmission at potential diffraction loca20 tions. This improves overall performance of the resulting spectrometer and distributed filter/detector combination.

Figure 13:
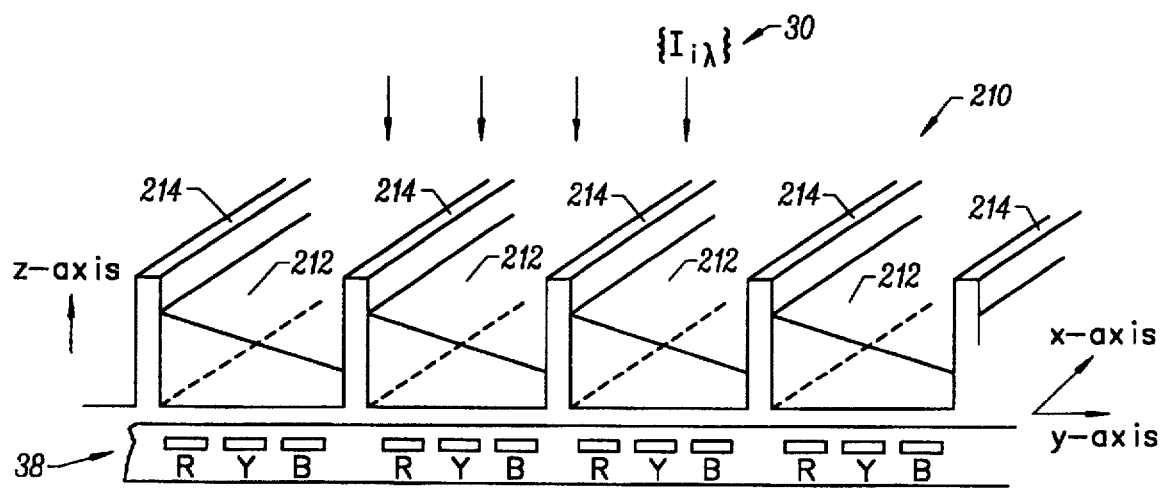
FIG. 13 depicts a spectral filter array for selective wavelength imaging, according to the present invention.

Embodiments of the present invention directed to real time imaging wedge filter arrays will now be described with reference to the spectrometer embodiment of FIG. 13. Filter structure 210 includes a plurality of wedge-shaped distributed wavelength optical filter strip elements 212 and intervening strip elements 214. In the embodiment shown, filter strip elements 212 cover lines of detectors element within detector array 38 in the x-axis direction.

Assume, by way of example, that structure 210 transmits as wavelengths of interest, red ("R)", yellow ("Y"), and green ("B") bands, and that detector array 38 includes patterns of three detector elements, denoted R, Y, B, which cover the spectrum and measure, respectively, the red, yellow and blue bands. Resultant device 210 provides real time imaging (e.g., processes simultaneously differing wavelengths), and could function as a color vidicon tube. Of course, various wedge filter structures as described elsewhere herein could also be included to provide array spectrometer imaging, for example, optical matching, bandwidth matching, stepped function structures.

Detector array 38 is preferably implemented using known submicron processing, with resultant good resolution. For example, a silicon CCD or silicon photodiode array may be used detector array 38 (in this and in other embodiments disclosed herein). As will be described, batch process fabrication of wedge filters, including structures as shown in FIG. 13, is simplified using the batch processing shadow masking technology described elsewhere herein.

The use of an array of spectrometers to image an object at different wavelengths, or bands of wavelengths, has application in many fields, including color television, planetary and other astronomical imaging, infrared ("IR") night vision imaging, medical imaging, among others. Imaging at only preselected wavelengths or at multiple wavelengths can provide an accurate temperature profile including that of low temperature bodies, including cancerous locations in a patient. Imaging of luminescent objects is useful in medical technology where a number of different biochemical tags may be identified by different wavelength fluorescence. Further, imaging of emission signatures from terrain can be useful to identify mineral and other valuable regions.

Imaging according to the present invention may be accomplished in several different ways. For example, one can selectively focus pixels to form the image onto the wedge spectrometer structure. The pixels can then be swept across the array structure to convey the spectral composition of that pixel component in a multi-pixel image. Ultimately, the full image is scanned and may be projected at any of the sampled wavelengths. However, such imaging takes time and is not provided in real time, and may be unsatisfactory if the real time image changes too quickly. Real time imaging is important in many applications, e.g., television, or perhaps reaction oscillations in a chemical reaction chamber.

Figure 14A:
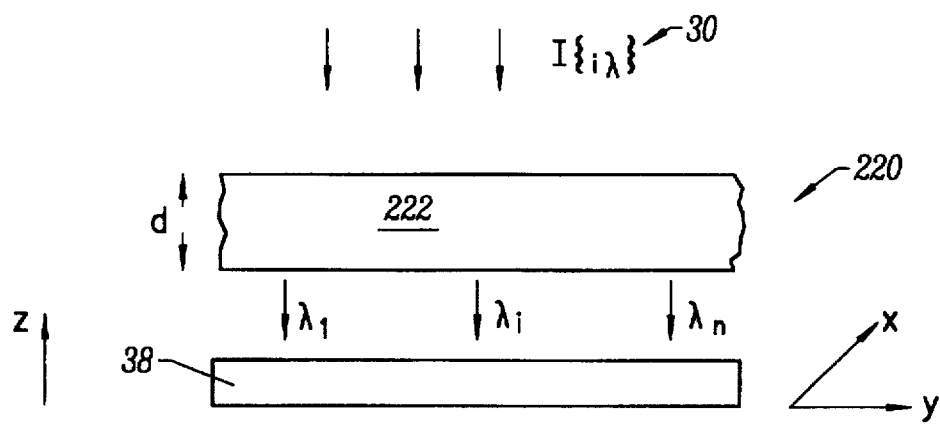
FIG. 14A depicts an embodiment using a graded dielectric film, according to the present invention.
Figure 14B:
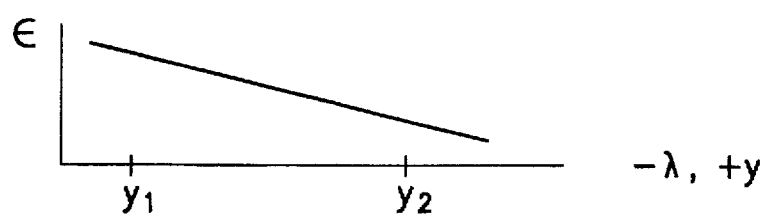
FIG. 14B depicts spatial dielectric constant variation for the film used in the embodiment of FIG. 14A.
Figure 14C:
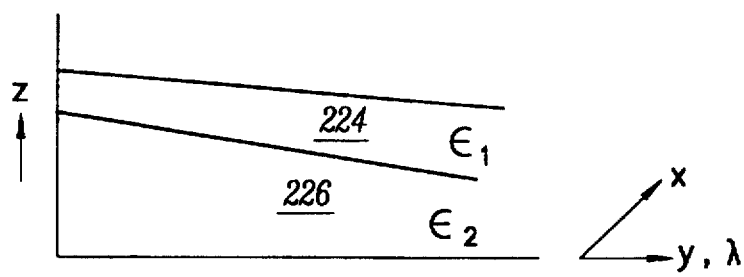
FIG. 14C depicts an alternative effective graded dielectric constant gradation embodiment, according to the present invention.

FIGS. 14A–14C will now be described with respect to using graded dielectric constants in an optical filter, where grading occurs in the filter plane. As noted, a wedge shaped filter provides spatially dependent wavelength transmission to an underlying detector array.

Alternatively, spatially dependent wavelength transmission may be achieved by varying the dielectric constant of a film along a lateral dimension, e.g., along the y-axis.

In FIG. 14A, filter structure 220 includes a graded thin film dielectric member 222. Regions within member 222 whereat the dielectric constant value ($\epsilon$) is high (and thus also the index of refraction) will be associated with transmission of longer radiation wavelength dimensions for a particular free space optical wavelength. As shown by FIG. 14B, the dielectric constant of a thin film member such as 222 may be graded along the x and/or y directions, thus affecting filter 220's transmitted wavelength dependence upon spatial position.

In FIG. 14A, thin dielectric film 222 may have homogeneous thickness d(y)=constant, and also have a dielectric constant dependence as shown in FIG. 14B. In FIG. 14B, at filter region corresponding to dimension y1 (e.g., increased $\epsilon$), longer wavelengths of incoming radiation are transmitted (e.g., first order). By contrast, at region y2 (e.g., decreased $\epsilon$) the shorter wavelength components will be transmitted. This characteristic can be very useful in a Fabrey-Perot etalon. The dielectric constant dependence on x or y may be linear or non-linear.

Further, the equivalent of a step function filter (FIG. 11), a stretch filter (see FIG. 11A) or a sawtooth filter (see FIG. 6C) may be achieved by providing an element whose dielectric constant depends upon x and/or y. Such graded index (index of refraction) or graded dielectric constant films can be used in distributed wavelength filter Fabrey-Perot etalons, matching films, and other dielectric film applications where the spatial property of the film is of importance. In general, the optical index (i.e., graded dielectric constant) film may have a gradient in all three dimensions (x, y, and z) and also be used for the focusing effects depicted in FIG. 8A.

Dielectric grading may be implemented using multiple beam sources, wherein each source deposits a different dielectric material. Depositions rates are easily controlled as necessary to achieve dielectric constant gradients in multiple directions. Dielectric constant grading in the z direction (see FIG. 8A) may be affected by various ionic diffusion methods and other dielectric constant altering methods.

FIG. 14C depicts an alternative effective graded dielectric constant gradation in the y direction, wherein first and second wedge members 224, 226 have respective di electric constant $\epsilon_1$ and $\epsilon_2$. Members 224, 226 may be deposited using the shadow masking methods disclosed later herein. The effective or "average" film dielectric constant is graded in the y and z directions, and combi5 nations of various graded dielectric films may be used for wavelength separation and optical ray directing purposes.

Various embodiments of the present invention dealing with optical guides, and guide illuminated structures will now be described with reference to structure 230 in FIG. 15. Generally, the embodiments to be described are characterized by the coupling of incoming radiation to a first structure (e.g., a waveguide) along a first axis, and outcoupling to one or more elements along a second and possibly orthogonal axis.

Figure 15:
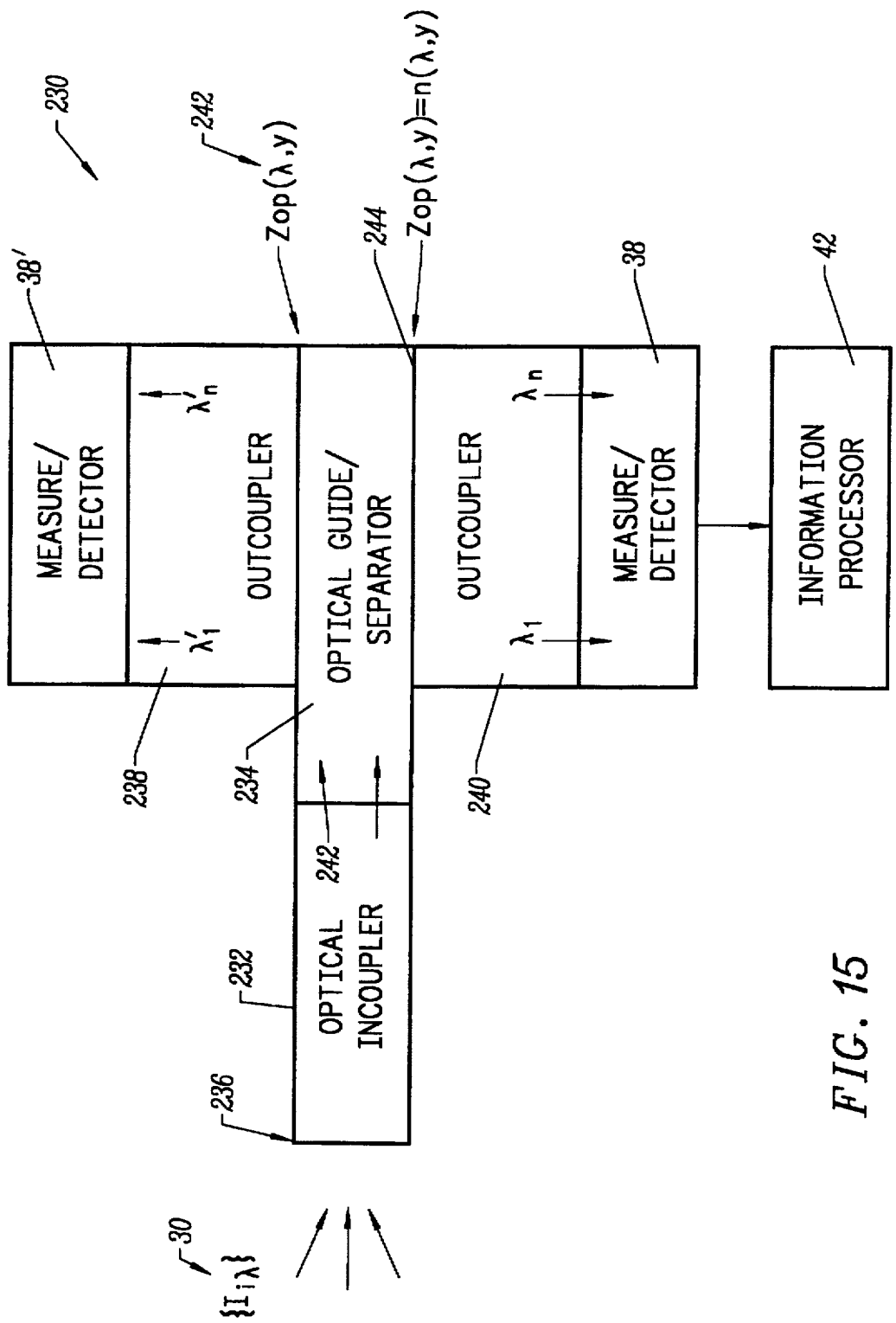
FIG. 15 depicts an optical processing and wavelength separating system employing edge or guide incident radiation coupling to a distributed wavelength-dependent optical outcoupler, according to the present invention.

With reference to FIG. 15, $\{I_\lambda\}$ is incoupled through an incoupling mechanism 232 (which may be analogous to mechanism 26 in the top illuminated structure of FIG. 2) to an optical guiding structure 234. Optical incoupling may occur by coupling optical energy from the end of a guide 232, or edge 236 of the optical guiding structure. Alternatively the optical energy can be incoupled from a disturbance in the guide 232, a fiber, a dielectric waveguide, a prism, a groove, hologram, a disturbed wavelength filter incoupler, or other mechanism.

After entry, optical energy is transported along the optical guide 234 to on e or more locations (e.g., 248, 238) whereat the optical energy is outcoupled. Generally, outcoupling occurs with different wavelengths being outcoupled at different y-axis locations. This relation35 ship is determined by an optical outcoupler whose outcoupling function is dependent upon y-axis location along the guide 234.

Such wavelength and location outcoupling dependance relationship can be provided by varying the optical impedance $Z_{op}(\lambda, y)$ encountered by the propagating optical radiation 242 along the guide in the propagation y-axis direction. Impedance $Z_{op}(\lambda(y),y)$ is such a function of location y and of the wavelength $\lambda$. It is understood that $Z_{op}(\lambda, y)$ and $\eta(\lambda, y)$ are used interchangeably as both Z and $\eta$ represent an impedance value. That is, while propagating along optical guide 234, each optical radiation wavelength 242 component encounters a different at each particular valve of y. These encounters occur at the optical waveguide distributed wavelength impedance 238, 240 $Z_\lambda(y)$ dependence at the optical waveguide interface/distributed impedance interface 242, 244 y-axis location.

Deviation in $Z_{op}(\lambda, y)$ for different $\lambda$ at a given location y relative to optical guide 234's characteristic impedance $\eta_g(=Zo)$ affects outcoupling of the light radiation. These effects include outcoupling magnitude and $\lambda$ dependence on y, polarization effects, phase shift, among others. At y-axis locations whereat deviation between $Z_{\lambda(y)}$ and $Z_o$ becomes small, the corresponding wavelength is coupled out of the guide 234, in whole or in part depending on the details of the structure 240. $Z_\lambda(Y)$ influence upon optical energy interaction at one side of the guide can alter optical energy propagation features such that energy outcoupling occurs, at least in part, at the other side of the guide as well. This outcoupling on the waveguide side opposite to a attached thin film distributed impedance structure such as 238 provides a very useful feature for structure 230.

The resultant spectrometer structure 230 will be referred to herein as an optical waveguide or an edge incident spectrometer device. In this structure, optical guide 234 may an optical slab waveguide, an single mode dielectric film waveguide, a multi-mode guide, and guide 234's shape may be rectangular or otherwise. Optical guide 234 may in fact be part of an integrated optical substrate.

In general both the optical impedance $Z_{op}$ ($\lambda(y)$, y) (or equivalently $\eta(\lambda(y), y)$, will have real and imaginary parts which influence both magnitude and phase of the outcoupled radiation, and can both be used to influence the details of said radiation outcoupling 283,240, of optical radiation 30 in useful ways , including wavelength distribution $\lambda(y)$, y). (Here both Z and $\eta$ represent the same optical impedance function and are used interchangeably.) It is noted here that the optical energy outcoupling at one side of the guide can be affected by optical impedance distribution on the other side of an optical guide as a function of wavelength. This latter effect is one of many useful innovation feature of the inventions.

In the embodiment of FIG. 15, at locations 238, 240 whereat light couples out of the guide 234, a distribution of detectors measures optical intensity at the location. Because the impedance distribution along the guide 234 as seen by each of the different wavelengths along the y-axis direction is different, different wavelengths can be made to couple out at different locations, as indicated by $\lambda_1-\lambda_n$ and $\lambda_1'-\lambda_n'$ in FIG. 15.

Detector array(s) 38, 38' provide output electrical signals permitting wavelength identification and related optical energy measurement. Similar to what was shown in FIG. 2, these signals may be coupled to a processor mechanism 42 for further analysis. As noted, associated with processor 42 could be look-up tables enabling identification of an unknown chemical, conversion form optical energy to source temperature, among other useful functions.

Figure 20A:
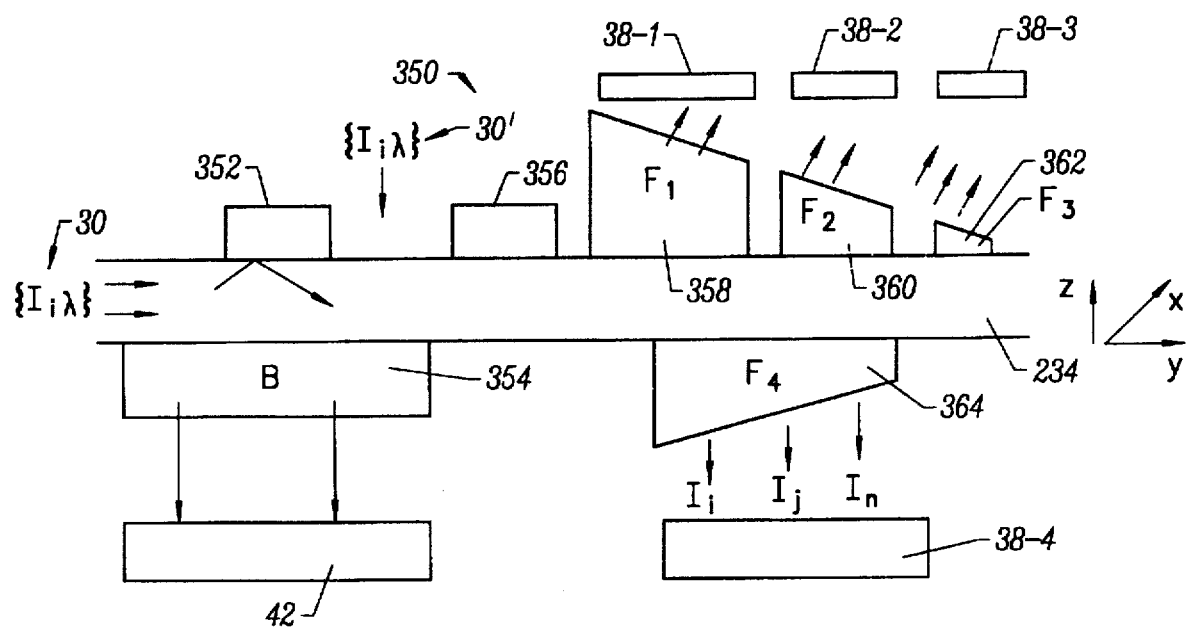
FIG. 20A depicts an optical waveguide wavelength separating structure incorporating multiple optical processing elements, according to the present invention.

An optical guide spectrometer system such as shown in FIG. 15, with edge or guide incident radiation and distributed wavelength-dependent optical waveguide attached impedance devices has many advantages over top incident wedge spectrometers. These advantages include overall transmission efficiency, the ability to extend a spectrometer's spectral range to very large values using a single multiple wedge waveguide structure, and the incorporation of many different wavelength discrimination outcoupling impedance structures and optical processing structures for outcoupling and other purposes (e.g., FIGS. 16A and 16B). For example, optical guide 234 may be integrated with multiple optical wavelength distributing and selecting outcoupling structures 238, 240, with different impedance structures suitable for outcoupling different desired wavelength bands of optical radiation. The various outcoupling devices 238, 240 are in general not aligned directly opposite one another on the two sides of the guide, but in general are distributed along the guide such as is indicated in FIG. 20A.

Consider briefly the contrast between edge incident optical wavelength separating devices such as the spectrometer of FIG. 15, and top incident spectrometers, especially with respect to transmission efficiency. If a top incident wedge spectrometer samples, say, 1,000 distinct wavelengths, the best theoretical efficiency obtainable is 0.1%. This poor showing occurs because energy in all but one of the incident wavelengths is reflected away, and lost (assuming that energy at only one wavelength $\lambda_j$ is transmitted at that particular location $y_j$). The same situation occurs at all other 999 wavelength locations, and the top incident device accepts essentially only 0.1% of the total incident radiation in this example.

Figure 16A:
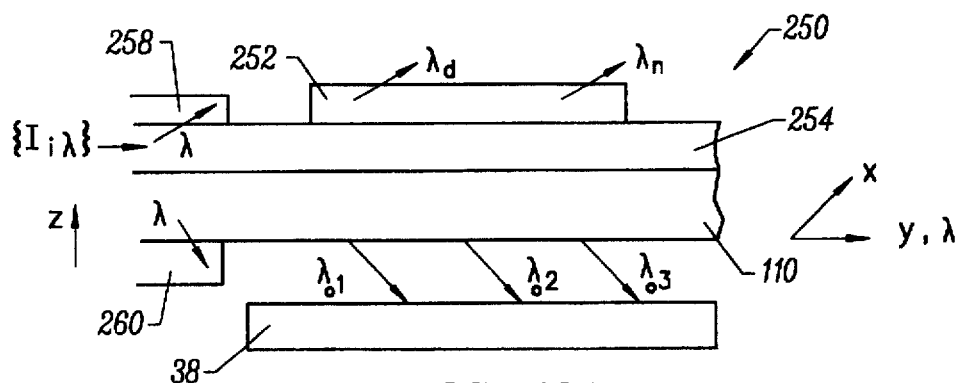
FIG. 16A depicts a single mode or multimode optical waveguide structure, according to the present invention.
Figure 16B:
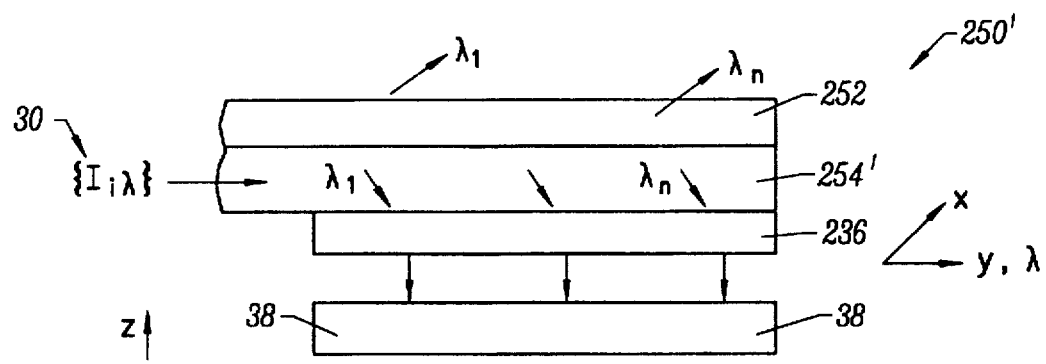
FIG. 16B depicts a slab optical waveguide structure, according to the present invention.

By stark contrast, for an optical guide, or edge illuminated spectrometer, the theoretical upper limit to the transfer efficiency is 100%, a difference of five orders of magnitude for this example. For such an optical waveguide spectrometer, when optical energy at one wavelength $\lambda_j$ is outcoupled, the remainder of the optical radiation remains in and propagates along the guide to outcouple at its preselected location y for each wavelength $\lambda(y)$. Various useful embodiments for such an optical guide spectrometer are described below. Briefly, FIG. 16A depicts a single mode optical waveguide, whereas FIG. 16B depicts a slab optical waveguide structure. While the embodiments of FIGS. 16A and 16B are geometrical and typically rectangular, other optical guide shapes (including those associated with fiber optics) may also be used.

FIG. 16A depicts an embodiment that provides optical guide wavelength separation and discrimination. Structure 250 includes a distributed optical impedance element 252 above a film optical guide 254, supported by a substrate 110, beneath which is a detector 38 (shown spaced apart for ease of understanding). In the embodiment of FIG. 16B, optical guide 254' is a slab waveguide that in essence provides its own substrate, and a pre-detection optical processor element 256 is shown. In FIG. 16A, film waveguide 254 may include several different thin films, including one or more graded index films. Further, in FIGS. 16A and 16B, more then one optical waveguide 254, 254' may be assembled together, for example, a thin film optical waveguide and a slab optical waveguide. Further, the film optical waveguide 254 may be a single mode waveguide, a multimode waveguide (e.g., such as a slab waveguide 254'), or a waveguide containing only a few preselected propagating (and/or evanescent modes), where the optical waveguide provides useful coupling to the outcoupler member.

In FIGS. 16A and 16B, light energy $\{I_{f\lambda}\}$ 30 upon incoupling to the guide 254, 254' propagates along the y-axis (as drawn) to spectral separation element 252, which may be a distributed wavelength outcoupling filter, and/or a spectral processor 28 (see FIG. 2). Outcoupled light $\lambda_{o1}$, $\lambda_{o2}$, etc. is distributed along the optical guide outcoupler 252, to be delivered to a detector (e.g., 38 or other optical devices (not shown) for wavelength discrimination and/or other detection or optical functions.

In each embodiment 250, 250' depicted in FIGS. 16A and 16B, the distributed optical impedance element 252 provides a spectral separating function and outcouples radiation from the optical waveguide 254, 254'. Outcoupling, spectral separating member 252 may incorporate various bandwidth controlling functions, amplitude influencing functions, intensity controlling functions, spectral range functions, redundant functions, optical switches, optical modulators, phase shifting.

Outcoupling is such that different wavelength optical radiation outcouples at different y-axis locations along optical guide 254 and substrate 110, or along guide 254'. Outcoupled optical energy (e.g., $\lambda_1$ ... $\lambda_n$) may be coupled from the first optical waveguide 254, 254' to one or more potentially different elements, such a distributed detector array 38. Coupling could also be to one or more other optical waveguide element located adjacent and in suitable proximity to guide 254, 254' for examples, guide elements 258, 260.

The destination of outcoupled optical radiation (e.g., $\lambda_1$ ... $\lambda_n$) may include, by way of example, an optical processor element 256 as shown in FIG. 16B. It is understood that element 256 may in fact include an amplifier, another spectrometer, a modulator, a selective wavelength incoupler, a phase shifter, a beam divider, among other elements. Thus, the embodiments of FIGS. 16A and 16B, wherein optical energy is outcoupled according to wavelength or wavelength bands, need not be limited to a simple spectrometer function.

Those skilled in the art will appreciate that many of the devices described herein are reciprocal in nature. As such, a given embodiment can often execute the inverse function described. Thus, spectral separating structures can also be used as spectral merging devices. Wavelength de-multiplexing and multiplexing can both occur in various devices, and are intended to be embraced by the descriptions of the preferred embodiments set forth herein. Thus, while many of the embodiments are described with respect to spectrometer functions, other functions are also possible.

The ability of optical impedance wavelength separator 252 to outcouple wavelength dependent optical radiation "up" and "down" along the z-axis (e.g., through spectral separator 252, or through substrate 110 to the detector 38), is quite useful. For example, a reflector (not shown) can be placed above the spectral separator 252 (also termed an optical filter and a distributed wavelength filter herein). Optical energy is then only outcoupled downward to detector 38 (or some other structure).

This upcoupling/downcoupling function is advantageous, for example, where an optical detector array is to be integrated into the system in hybrid fashion, but outcoupler 252 might be damaged during adhesion of the detector array.

Figure 16C:
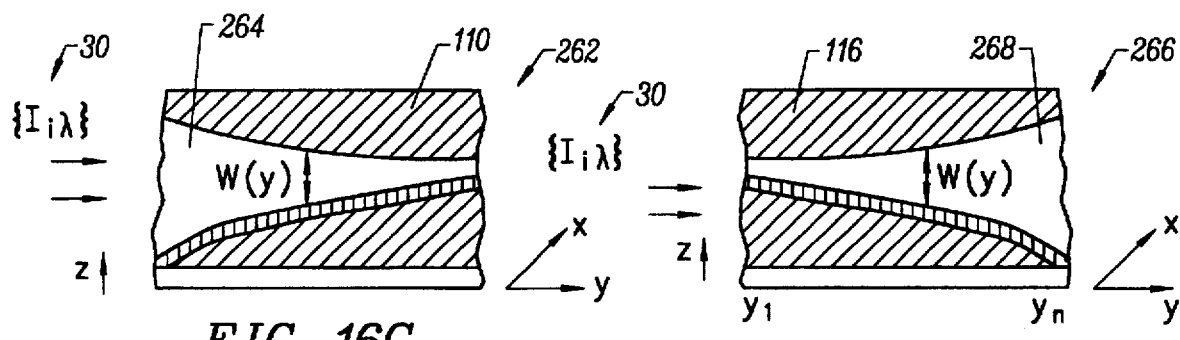
FIG. 16C is a planar perspective view of a converging multifilm film waveguide structure, according to the present invention.

FIG. 16C shows an optical waveguide embodiment 262 where atop substrate 110 a converging dielectric film 264 has been deposited. Film 264 acts to concentrate incoming radiation $\{I_{f\lambda}\}$ 30 across the y-axis dimension. This optical guide width narrowing can be used, for example, to cause structure 262 to function as an optical concentrator that increases intensity of the light delivered to an outcoupler, such as a detector array. Such a concentrator configuration is especially useful where the available optical energy is of weak intensity. Further, for thin films having useful optical intensity dependent optical properties, such concentration can provide switching and other useful function. For example, a concentration of 100 can increase the signal to noise ratio of a detector output by a factor of 100, speeding up the detection process and perhaps obviating the need for certain post-detection signal conditioning.

Figure 16D:
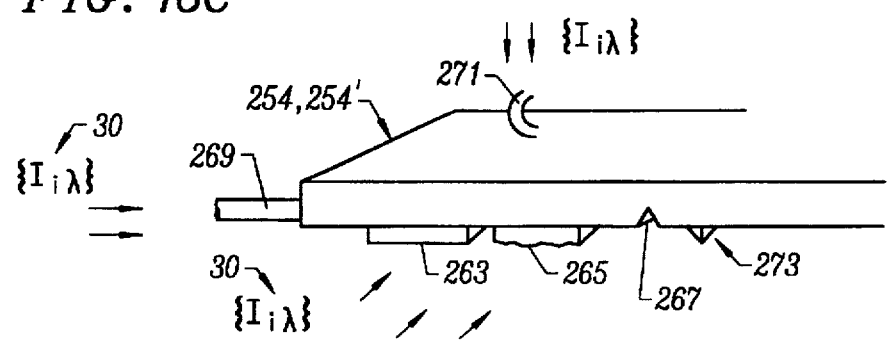
FIG. 16D is a planar perspective view of a diverging multifilm film waveguide structure, according to the present invention.

FIG. 16D shows an alternative structure 266, wherein atop substrate 110 a diverging layer of dielectric 268 is deposited. In this configuration the narrower region corresponding to $y_1$ may be coupled to receive optical energy 30, perhaps from a fiber optic pipe or from a focusing mechanism (collectively incoupler elements) also providing narrow incident radiation. The diverging construction of FIG. 16D advantageously provides a broadened guided beam along the y-axis, wherein portions of the broadened beam may be coupled to a plurality of different optical outcoupling wavelength separating devices, e.g., 252. Such multiple outcoupling wavelength discriminating devices may, by way of example, be a collection of narrow spectral range "stretch" filters intended to cover a broad spectrum in a single instrument. One application might be a de-multiplexing device used for optical radiation arriving from one or more IC devices that incorporate optical addressing.

Many techniques may be used to incouple radiation to a slab waveguide or a thin film optical waveguide. As suggested by FIGS. 16A or 16B, coupling to a waveguide 254, 254' may include simple geometric focusing of the incident radiation onto the end of a slab waveguide. As shown by FIG. 16E, other coupling mechanisms can include a hologram 263, a diffraction grating 265, a wedge shaped groove 267, an optical fiber 269, an optical thin film waveguide 271, a microprism 273, as well as an optical waveguide coupler (not shown). While FIG. 16E shows a waveguide including all of these coupling mechanisms, it is understood that not all mechanisms would necessary be present.

It will be appreciated that an optical thin film guide 254 or a film 252 (see FIGS. 16A, 16B) can incorporate incoupling/outcoupling elements including a diffraction grating, hologram, microprism, input waveguide, optical fiber, surface texture, by way of example. Further, a distributed wavelength optical device, e.g., a wedge filter, can also be used to incouple optical radiation. As noted, in many instances the inverse function of the distributed wavelength outcoupling device can be used, whereupon the device becomes a wavelength multiplexer or distributed wavelength incoupling device.

Other useful functions for such optical distributed wavelength outcoupling devices are available. For example, all but a preselected optical wavelength or optical wavelength band can first be outcoupled (and disposed of). The optical energy wavelengths remaining in the optical guide would be the optical energy of interest (or not of interest in certain applications). The guide structure 254, 254' would then deliver the remaining optical energy elsewhere for the intended function.

Real space radiation and reception of the optical energy distributed by wavelength to/from another location is also useful. Thus, embodiments of the present invention may be used in a real space transfer application to couple information between different IC devices, between different optical substrates without wire links and capacitive delay, and between regions on a common IC chip. Of course, other optical devices such a two dimensional diffraction structures, reflecting facets, by way of example, may also be incorporated with the present invention.

With further reference to FIGS. 16A and 16B, other outcoupling members may be used with a thin film optical guide. Such elements can be incorporated with and narrowing of the optical waveguide to suppress unwanted modes and wavelengths. This can permit but a relatively narrow band of optical energy to propagate and be separated according to wavelength by the spectral separating member 252. Such a structure would also permit selective outcoupling to one or more other regions.

As noted, in FIG. 16B, the slab waveguide may itself include the substrate. Optical energy can advantageously be directed for processing to various outcoupling devices located along the slab waveguide. For example, different optical filters 252 having different wavelength spectral range, different bandwidth, or other properties may be disposed at different y-axis locations along the guide. So doing would permit measuring different optical energy for various wavelength bands. By including distributed wavelength optical outcoupling with large spectral range and/or incorporating a number of distributed wavelength outcoupling elements, a single optical waveguide device can be used to address and processes optical energy over a very large spectral range. The resultant device can function as a spectrometer that simultaneously samples, in real time, UV, visible, and IR spectral ranges, for example.

Further, redundant wavelength distributed energy outputs can be acquired for useful function. Optical switching devices can be incorporated in the outcoupling device, or along the optical waveguide, to provide AC modulation of the optical energy, or preselected and electronically controlled removal of particular bands of radiation for other uses, or to introduce desired polarization, among other purposes. Light may be introduced into the waveguide using the reciprocal features of the distributed wavelength optical filter device. Reciprocal optical processing 252, such as wavelength multiplexing with large spectral ranges may also be employed. Thus, the described embodiments lend themselves to applications including optical modulation, polarization, dielectric interface alteration, among other electronically controllable functions.

It will be appreciated to be successful, an optical waveguide spectrometer will incorporate at least one distributed wavelength optical outcoupling device. To function properly, the outcoupling device must provide a suitable distributed optical impedance function $Z_{op}(\lambda(y),y)$ with respect to a waveguide impedance $\eta_g$ and in relation to an exit impedance $\eta_o$ outside of an outcoupling region. One aspect of the present invention is directed to acquiring such a useful distributed wavelength outcoupling or incoupling function.

With further reference to FIGS. 6A and 6B, the present invention can provide a spatially varying optical impedance having a preselected position dependence impedance. Further, the present invention provides a wavelength dependent outcoupling energy $T_\lambda(y)$, with preselected spatial and frequency bandwidth. These capabilities are achieved by introducing a suitable wavelength dependent interface impedance that is attached in influencing proximity to the optical waveguide 254, 254'.

Suitably designed thin film structures can provide the outcoupling function of interest. By way of example, such a thin film structure may be a wedge Fabrey-Perot etalon, a combination of wedge Fabrey-Perot wedge etalon and matching wedge, a matching wedge alone, various order wedge and other thin film structures, and other film combinations. Such outcoupling selectivity has been demonstrated experimentally with thin film structures or optical waveguides.

Figure 17A:
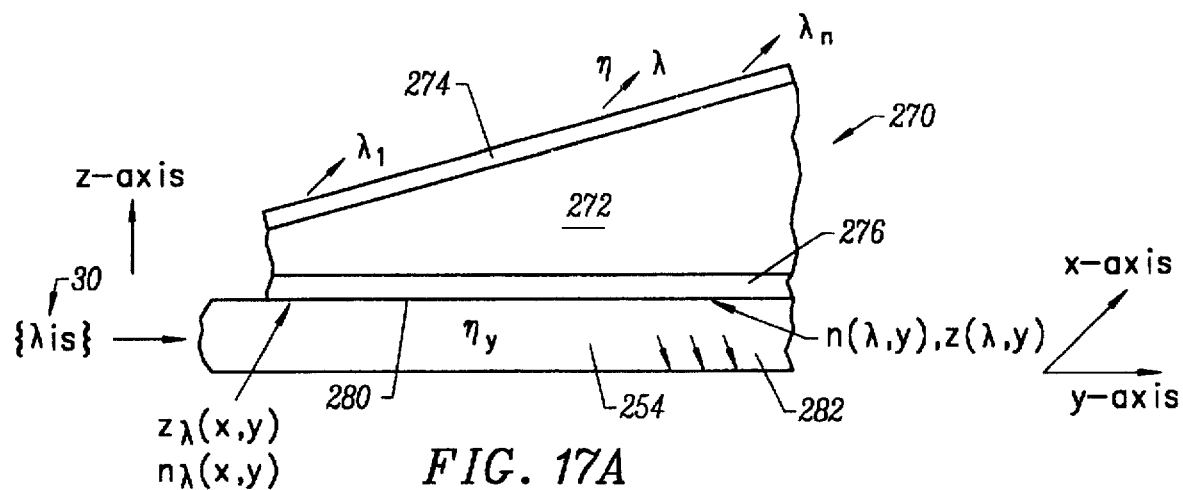
FIG. 17A depicts a generic distributed wavelength outcoupling device used with an optical waveguide structure, according to the present invention.

Most if not all of the distributed wavelength outcoupling devices described herein are intended to be schematically represented by the linear wedge filter 270 shown in FIG. 17A. Filter 270 includes a wedge-shaped dielectric member 272, sandwiched by reflective films 274, 276, which together overlie an optical guide 254. Of course, although filter 270 has but one wedge component in an outcoupling impedance matching capacity, additional wedge components may in fact be present, as needed and appropriate for a preselected distributed wavelength outcoupling function. Of course, other distributed wavelength outcoupling thin film devices such as patterned reflector and patterned lossy film element, stepped dielectric wedge shaped element, graded dielectric films, graded thickness waveguides may be used, among other elements.

Figure 17B:
FIGS. 17B–17D depict outcoupling amplitude transmission distribution as a function of wavelength for the device of FIG. 17A.
Figure 17C:
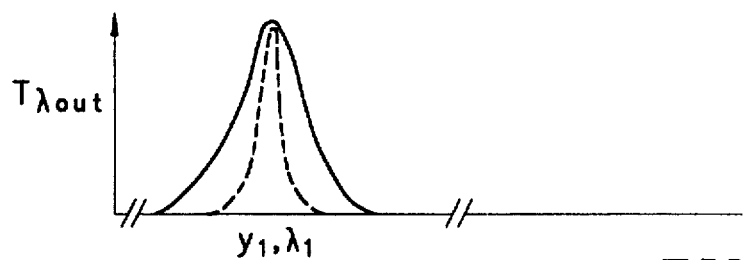
Figure 17D:
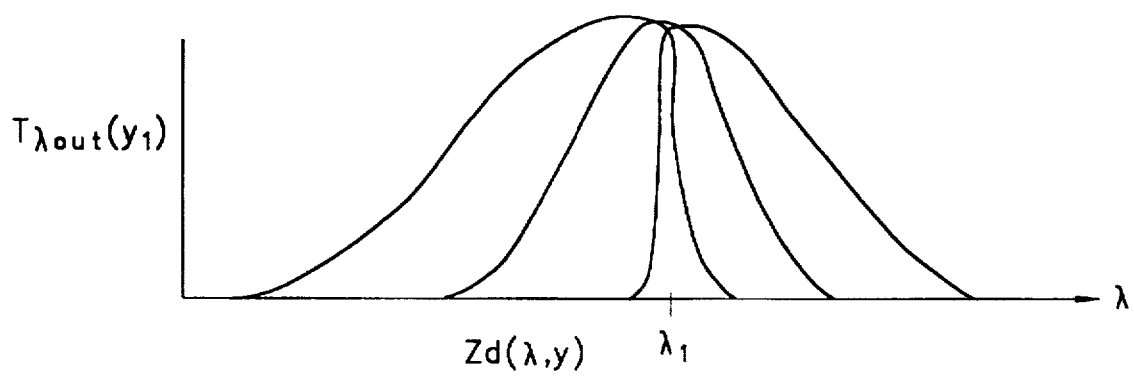

With further reference to FIG. 17A, the outcoupling amplitude $T\lambda(y)$ for structure 270 in response to the propagating radiations $\{I_\lambda\}$ 30 is determined by optical guide 254's characteristic impedance $\eta_g$ (or, $Z_0$) together with $\eta_\lambda(x,y)$ (or, $Z\lambda(x,y)$). As shown by FIGS. 17B–17D, $T_\lambda(y)$ varies as a function of wavelength $\lambda$ at specific y-axis locations for the optical guide 254/distributed optical impedance interface 280.

Such location-dependent wavelength optical radiation outcoupling can occur in a +z-axis direction or a −z-axis direction (e.g., "up" or "down" with respect to FIG. 17A), either on side of optical waveguide 254. Down-exiting radiation 282 can be affected by introduced polarization alteration at the impedance/optical waveguide interface 280. In addition, radiation 282 can be affected by impedance alterations occurring at an associated outcoupler (e.g., 252 in FIG. 16A). Such radiation is also affected by a change in the reflected angle of the light reflecting from interface 280. As used herein, a distributed optical impedance that affects outcoupling of optical radiation as a function of location is generally termed an optical filter, an optical waveguide filter device, or distributed wavelength optical outcoupling device.

A conventional wedge Fabrey-Perot filter fabricated on a planar optical waveguide can provide wavelength separating functions. However, multiple wedge structures incorporating selective order numbers can provide various preselected optical impedance variations along the outcoupling device interface 280. The interface optical impedance associated with an outcoupling thin film device can be made to control in a preselected fashion various performance criteria. These criteria can include amplitude percentage outcoupled, spatial bandwidth, and frequency bandwidth control.

FIGS. 17B–17D depict different optical outcoupling wavelength dependent and spatially dependent transmission features Tλ(y) as a function of exiting optical radiation wavelength λ. Such features include amplitude, spatial and frequency bandwidth, and arise from impedance spatial dependencies. These dependencies can arise from different optical filters attached to the optical waveguide, which attachment influences optical outcoupling and related optical characteristics. The degree of any mismatch between the filter optical impedance (which impedance is a complex number) along the optical waveguide impedance and the sharpness of impedance variation along the y-axis influence the sharpness of the spatial dependence of the spatial and frequency bandwidth of the exiting optical radiation. In addition, details associated with the optical waveguide propagating wave, such as mode configuration, are also influencing factors.

In FIGS. 17B–17D, outcoupled optical amplitude $T_{\lambda out}$ (λ,y) the spatial and frequency bandwidths, as well as other parameters, are a direct function of the optical impedance values and variations in same as a function of λ and spatial location (x,y) along the optical impedance device. Variation in optical impedance magnitude may advantageously be affected with multiple wedge structures similar to what has been described herein with respect to top incident illumination wedge filters. For example multiple order and multiple region wedge Fabrey-Perot filters, wedge filter stacks, including stacks having at least one matching filter including matching films without reflecting films can be incorporated to controllably vary optical impedance. Such variation may be along one or more spatial dimensions (x,y) associated with the optical guide.

In FIG. 17C, for example, two different bandwidths are depicting, arising from two different distributed optical impedance spatial distribution functions.

FIG. 17D is an expanded scale depiction of the outcoupled optical amplitude $T_{\lambda out}(\lambda,y)$ centered about $y_1$ in FIG. 17C, but with three different bandwidths represented.

Those skilled in the art will recognize that the above-described advantages may be afforded to the disclosed top illuminated wedge filter wedge filter structures for top incident distributed wavelength applications and spectrometers. The resultant structures can advantageously provide an optical guide optical spectrometer system. Such structures benefit from improved performance including significantly increased optical energy throughput as contrasted with top illuminated thin film micro-spectrometers.

Turning now to FIG. 18A, an impedance wedge filter device 290 includes four regions each having an associated order number, e.g., region 292 n=4, region 294 n=3, region 296 n=2, and region 298 n=1. Also shown in an optical guide 254. These four impedance regions are shown only schematically, and it is understood that additional filter components such as reflectors and matching films may be present as necessary. Structure 290 may be used to outcouple optical radiation in a preselected wavelength band. Different bandwidths occur for the same spectral range at different y-axis locations, where frequency bandwidth is controlled in the different filter regions by the associated order number n for the wedge filter element.

Optical outcoupled components or outputs are collectively depicted as $o_1$, $o_2$, $o_3$ and $o_4$. Of course if more (or fewer) regions 292-298 were present, the number of output groups would also change. The filter elements are designed to select out only a portion of the optical waveguide propagating energy, and thus any or all of the outputs used.

Alternatively, voltage controlled dielectric film devices operating as optical switches may be incorporated into (or in conjunction with) the distributed wavelength optical impedance device shown. Such optical switches, e.g., a liquid crystal switch, would permit selecting one or more of the outputs $o_1 \ldots o_n$. A liquid crystal switch can also be used in analog fashion, and integrated in the design of the distributed wavelength outcoupling filter 290. It is also noted that wedge shaped liquid crystal distributed wavelength devices can affect selection of outcoupled bandwidth. (Similarly, for top incident distributed wavelength filters, a voltage tunable liquid crystal wedge filter may be so used.)

FIG. 18B depicts a structure 300 comprising three identical filter members 302, 304, 306, attached to an underlying optical waveguide 254, as to outcoupling identical spectral ranges $o_5$. Of course, instead some spectral features may be varied. However, if the outputs corresponding to regions 302, 304, 306 are maintained with the same spectral characteristics and amplitude distributions (or varying distributions), device 300 functions as a beam splitter.

FIG. 18C depicts yet another useful embodiment 310, which includes a dielectric wedge filter element 312 with a step discontinuity 314 in the dielectric film thickness. This discontinuity produces an optical impedance discontinuity.

As shown by FIG. 18D, as a result the optical distributed wavelength output has a gap in the outcoupled wavelength distribution. Thus, outcoupling wavelengths fall only in preselected bands $B_1$ and $B_2$ on either side of the gap, in this example. In the embodiment shown, out-coupled wavelengths are presented to an underlying detector array 38.

Figure 18E:
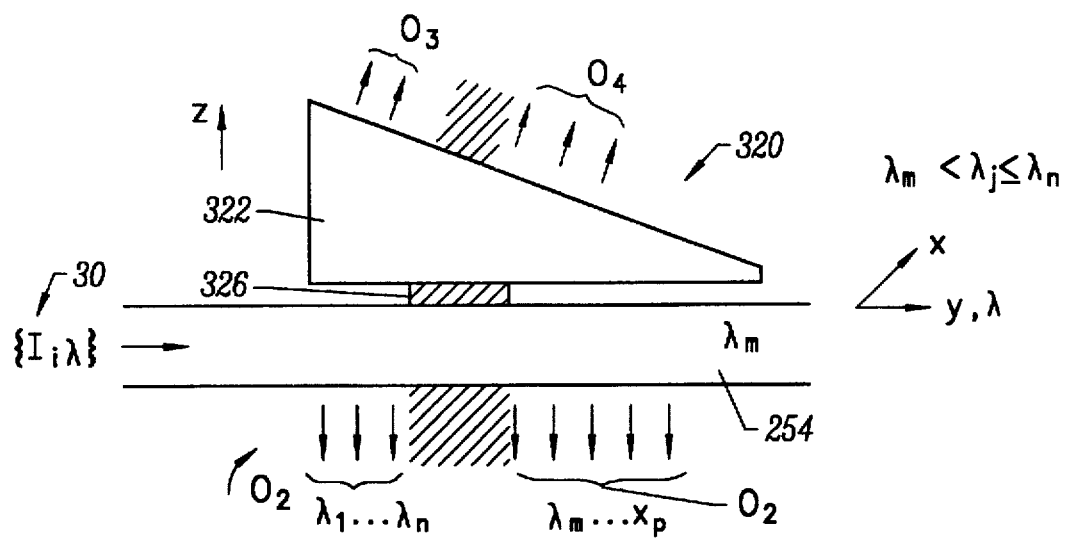
FIG. 18E depicts an embodiment with selective gaps in its outcoupling distribution, according to the present invention.

FIG. 18E shown an alternative structure enabling selective impedance distributions to outcouple unwanted radiation. Structure 320 includes a wedge shaped impedance element device 322, and an underlying optical guide 254 (or other element). An optical reflector or voltage controlled optical switch 326 is disposed between elements 322 and 254 so as to block an intermediate region of the underside of element 322.

Optical energy may be outcoupled spatially downwards, depicted collectively as radiation bands $o_1$ and $o_2$, and/or upwards, depicted collectively as radiation bands $o_3$ and $o_4$. As depicted in FIG. 18E, between bands $o_1$ and $o_2$, and between bands $o_3$ and $o_4$ there exists gaps corresponding to wavelength distributions $\lambda_1$, $\lambda_n$, $\lambda_m$, $\lambda_p$ where essentially no radiation is outcoupled. Thus, waveguide 254 may be regarded as having loss regions corresponding to these regions. Of course if element 326 is modulated, the band gaps may exist or not exist. Of course, the required impedance functions may be designed using known dielectric waveguide theory and/or empirical development.

Figure 18F:
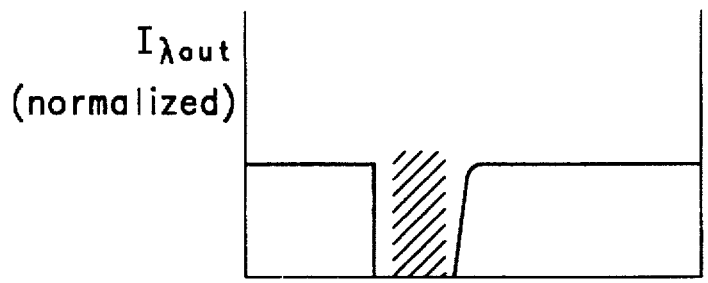
FIG. 18F depicts exiting radiation spatial distribution for the embodiment of FIG. 18E.
Figure 18G:
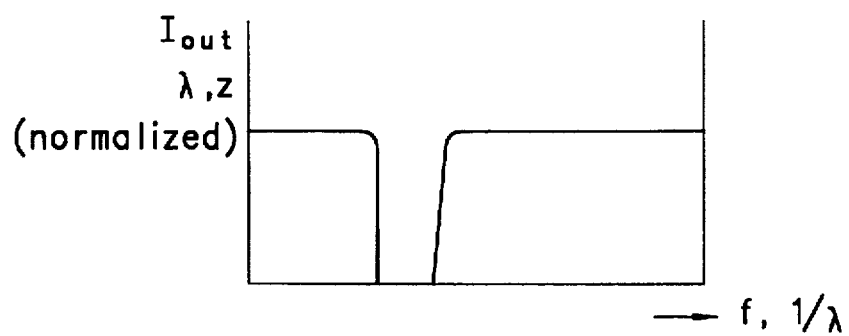
FIG. 18G depicts exiting radiation wavelength distribution for the embodiment of FIG. 18E.

FIGS. 18F and 18G depict exiting radiation spatial distribution, and wavelength distribution, respectively.

Figure 19:
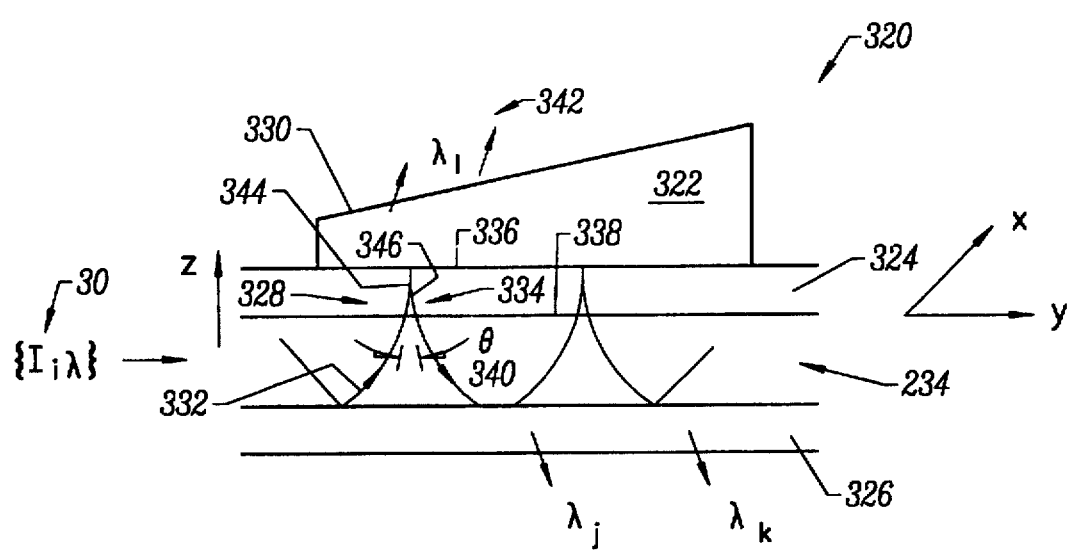
FIG. 19 depicts use of a graded index film with an optical guide and distributed wavelength optical impedance structure, according to the present invention.

FIG. 19 depicts another embodiment of the present invention, wherein a graded index film is used with optical guides and a distributed wavelength optical impedance structure. As shown therein, structure 320 includes a distributed optical wavelength impedance element 322, beneath which is a graded dielectric film 324. Film 324 is atop on optic propagation waveguide 234, beneath which is an outcoupler film 326.

The optical waveguide 324 is fabricated to include a graded index region 328. Illustrated schematically, region 328 may be located near distributed wavelength optical impedance wavelength discriminating impedance device and outcoupling structure 322. In structure 320, outcoupling element 322 may be a wedge filter structure similar to what has been described elsewhere herein with respect to top illuminated spectrometer applications.

Some moderate modification would be necessary to integrate the wedge filter 322 to the optical guide 234. Such modification would accommodate optical waveguide dielectric constants (and their distributions) and that of the exit space 330. Exit space 330 may be air, the semiconductor material of a detector array, or other substance. In practice, wedge filters incorporating Fabrey-Perot wedge etalons and multiple matching regions can be integrated with an optical guide to produce near 100% exit transmission, narrow spatial and frequency bandwidth and large spectral range.

As for top illuminated distributed wavelength filters and spectrometers, in general a distributed outcoupling device may include Fabrey-Perot etalon filters with high mode number, and at least one attached matching filter incorporating a high mode number. Similar to top incident wedge filter combinations, for optical waveguide distributed outcoupling wedges, the mode numbers of different filter components generally will differ. As disclosed elsewhere herein, these modes may be selected to be prime numbers to increase spectral bandwidth features, according to the present invention.

In FIG. 19, graded index region 328 provides a desired interaction of an incident ray 332 in the waveguide 234, which may a slab or a thin film optical waveguide. Consider the case of a slab optical waveguide 234, where light is represented in a ray diagram as shown in FIG. 19. Consider a propagating ray 332, e.g., in an optical slab waveguide, as the ray 332, 334 approaches the impedance interfaces 336, 338. The angle of incidence θ of this ray affects the optical impedance at the interface 338 as seen by the propagating wave 332.

If the angle of incidence θ 340 as indicated at the bottom of the graded index film 328 is relatively oblique, significant angle dependency effects on the resulting outcoupled intensity percentage 342 can occur. Consider, however, the case where the incident wave 332 can be made to have nearly normal incidence to the thin film optical impedance device 322. In that instance, device 322 can operate for this multimode example in a manner very similar to that of normal incidence wedge filter. Stated differently, in that instance, device 322 can operate similar to a top illuminated distributed wavelength filter structure as described elsewhere herein.

In the above example, in principle, nearly 100% optical emission at each wavelength can be achieved using essentially the Fabrey-Perot and matching structures described herein for normal incidence. Suitable choice of different wedge component order number(s) can permit resultant waveguide wedge filter 320 to access a relatively large spectral bandwidth.

Incorporating the graded dielectric film region 344 as shown in FIG. 19 can result in near normal ray incidence (θ=0) between incident ray 344 and reflected ray 346.

Experiments with slab waveguide distributed wavelength filters and outcoupling devices have successfully demonstrated distributed wavelength outcoupling. Further, these experiments have demonstrated that wedge dielectric structures can provide distributed wavelength outcoupling, multiple order outcoupling, and multiple outcoupling locations for similar bands. Experiments have also demonstrated outcoupling, both through wedge filter distributed optical waveguide impedance thin film devices, and from a slab waveguide surface below a wedge filter device. In addition, separation of bands of primary colors (of use for color displays) has also been exhibited in devices and experiments.

Optical fiber waveguides can also be fabricated using the guidelines and principles described herein with respect to slab optical waveguides and thin film optical waveguides. For example, a fiber can be rotated while wedge dielectric films are deposited using the shadow masking methods described herein.

In short, the present invention permits integration of multi-optical devices having diverse functions. The disclosed optical waveguide spectrometers and spectral separating and managing embodiments have significant advantages contrasted to top incident distributed waveguide structures and optical instrumentation, and to conventional spectrometers. Those skilled in the art will recognize that improved optical throughput is one advantage. Other advantages include incorporating many spectrometer functions, spectral ranges, and spectral operations within a single optical waveguide device whose fabrication may be simplified.

FIG. 20A depicts an optical waveguide structure that can incorporate the various outcoupling distributed wavelength embodiments and other optical structures described herein, in a single optical waveguide system.

As shown therein, system 350 includes an optical guide 234 to which optical energy of various wavelengths $\{I_{i\lambda}\}$ 30 has been introduced using incoupling devices disclosed elsewhere herein. Radiation 30 propagates down a slab optical waveguide 234 (in this example), interacting with a host of optical processing devices 352, 354 or "B" (e.g., a selective outcoupler), 356 (e.g., an optical modulator), 358, 360, 362, 364, four wedge-shaped filter elements denoted respectively F1, F2, F3, F4 (in this example). System 350 also includes an optical processor 42, and various detectors 38-1, 38-2, 38-3, 38-4. System 350 is shown as receiving as one input unmodulated optical energy $\{I_{i\lambda}\}$ +.

System 350 may function as an optical waveguide system to inspect multiple different or overlapping bands, where filters F1–F4 are distributed wavelength outcoupling filters. For example, filters F1–F4 can outcouple different bands of optical radiation bands such as the ultraviolet ("UV"), visible, near IR, intermediate IR and far IR.

Figure 20B:
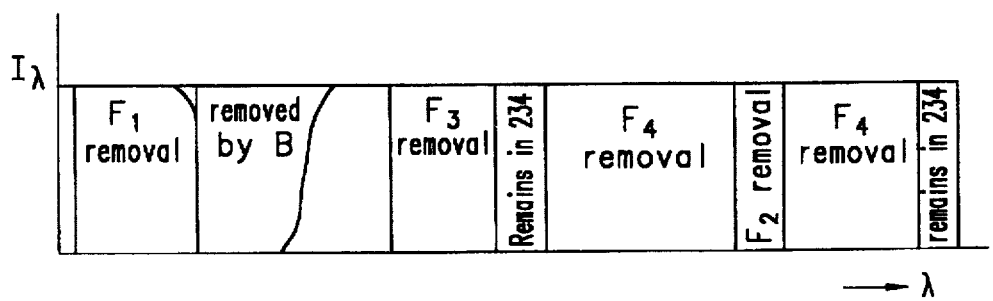
FIG. 20B depicts intensity response for the structure of FIG. 20A.

So configured, system 350 can perform diverse functions, and can process different, multiple, or overlapping optical radiation wavelength bands and produce highly managed transmission features as shown by FIG. 20B. Radiation propagating along the waveguide experiences an optical impedance that is affected by the various distributed wavelength outcoupling filters F1–F4, in this example. Depending upon implementation of system 350, the out-coupled different optical bands may include UV, visible, near IR, intermediate IR and far IR. In principle, mm wave outcoupling devices may also be used with such an optical waveguide system. Of course, such systems need not be configured with four filters as shown in FIG. 20A.

Figure 21A:
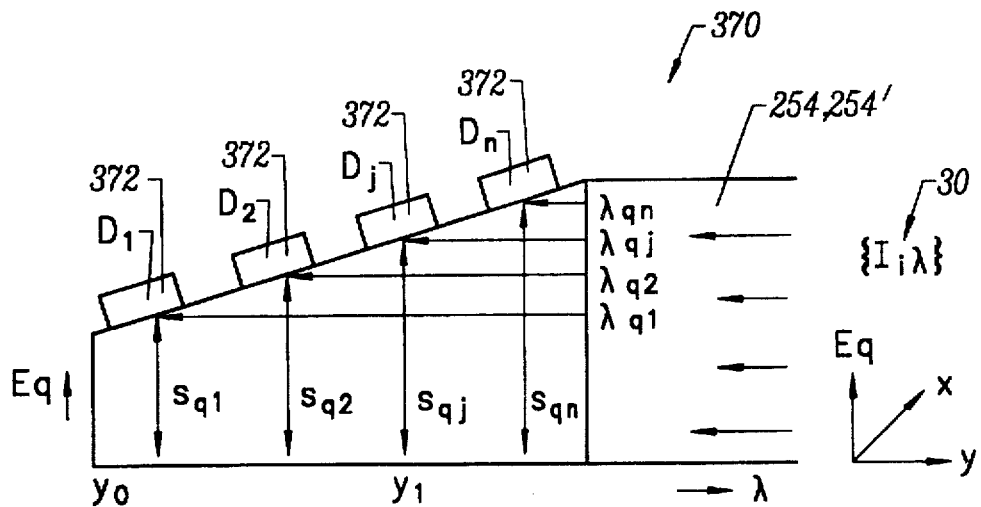
FIG. 21A depicts a semiconductor waveguide structure whose bandgap varies as a function of y-axis, according to the present invention.

Turning to FIG. 21A, a system using graded bandgap detection wedge structures will now be described. An optical filter 370 (which need not be wedge shaped) includes a semiconductor member having a bandgap $\epsilon_g$ that varies as a function of dimension y. Optical-to-electrical signal conversion of an incident optical radiation beam 30 propagating down an optical waveguide 254, 254' is affected by the bandgap grading over the spatial yaxis dimension (in this configuration). For example, on the right-hand side of FIG. 21A, the bandgap $\theta_{q_n}$ is relatively large, so incoming radiation 30 passes leftward. However at lateral position $y_1$, for example, the bandgap is narrower, and at leftmost position $y_o$ the bandgap has a minimum value. Detectors 372 are configured in regions where optical energy from a particular wavelength is absorbed by the semiconductor over a very short dimension in the y-axis direction.

Shorter wavelength (i.e., higher energy photons) are absorbed first in the larger bandgap region (i.e., right region of FIG. 21A) where the wavelength $\lambda_n$ is such that the corresponding photon energy exceeds the bandgap $\epsilon_{gn}$. Longer wavelength (lower energy) photons continue to propagate leftward down the guide to smaller bandgap regions where these photons are also absorbed according to bandgap value and location. Detectors 372 convert to electron-hole pairs and current by the detectors. Wavelength resolution is determined by the bandgap grading along the y-axis dimension.

Figure 21B:
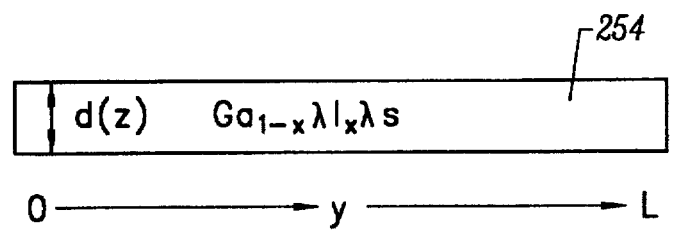
FIG. 21B depicts stoichiometry as a function of location for a semiconductor waveguide structure, according to the present invention.

FIG. 21B shows a semiconductor waveguide 254 of thickness d, for example $Ga_{1-x}Al_xAs$, whose stoichiometry in X is graded along the y-axis and varies with dimension Y.

Figure 21C:
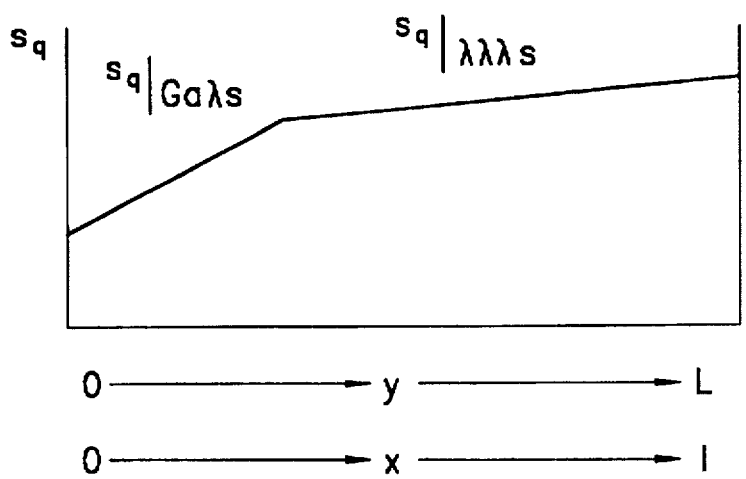
FIG. 21C depicts bandgap as a function of location for the semiconductor waveguide structure of FIGS. 21A and 21B.

FIG. 21C depicts bandgap variation with stoichiometry X for waveguide 254, and may also apply to variation for the waveguide in FIG. 21A.

Figure 22A:
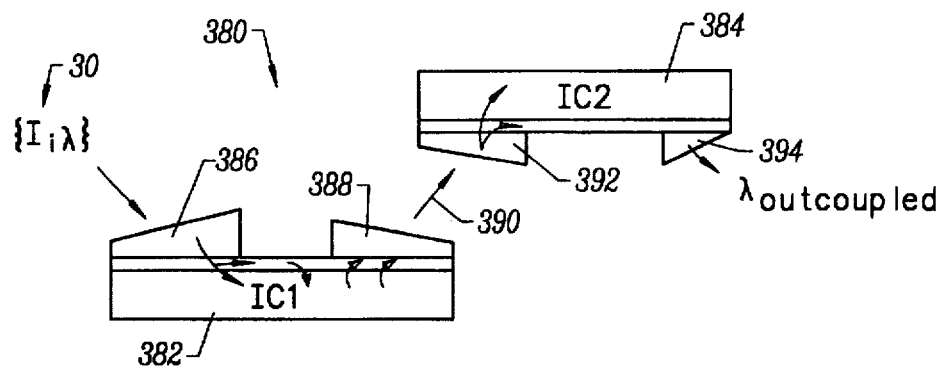
FIG. 22A depicts inter-chip optical coupling, according to the present invention.

FIG. 22A is directed to an embodiment of the present invention pertaining to outcoupling/incoupling optical energy from a dielectric waveguide to another location, through free space or through an intermediate dielectric material. Understandably, an import aspect of the present optical waveguide distributed impedance outcoupling structures is the ability of wedges and other thin films to outcouple optical radiation.

As noted, a reciprocal character is present in an outcoupling wedge. Thus, according to the present invention, optical waveguide wedge filter structures may also be used to incouple optical radiation of multiple wavelengths into the optical waveguide, providing thereby a multiplexing function. That is, optical waveguide and wedge filter combinations may, according to the present invention, be used to provide both multiplexing and demultiplexing functions.

The use of optical waveguides and wedge filter combination structures has significant application in transferring optical carriers, across real space for coupling between different optical and/or electronic devices, including use in communication systems, optical computers, interchip communications systems, as represented in FIG. 22A by system 380.

As shown in FIG. 22A, system 380 may include first and second IC chips 382, 384 between which it is desired to coupled incoming radiation 30 presented to IC chip 382 via an incoupler 386. Incoupler 386 may, for example, be an incoupling wedge filter device portion of an IC optical waveguide. After at least a portion of incoming radiation 30 has been incoupled and perhaps after the different wavelength optical carriers therein have been encoded with information from on-chip electronic processing, different wavelength optical carriers may then out-couple from IC1 via outcoupler 388 and transfer (390) to incoupler 392 associated with IC2. IC2 of course may provide the coupled carrier components thus received to an optical waveguide (not shown) on IC2 for signal processing, and perhaps further linkage to other ICs, via optical outcoupler 394. In this fashion, edge linked optical waveguide wedge filters according to the present invention can provide useful optical linkage functions across spatially separated electronic and optical components.

Figure 22B:
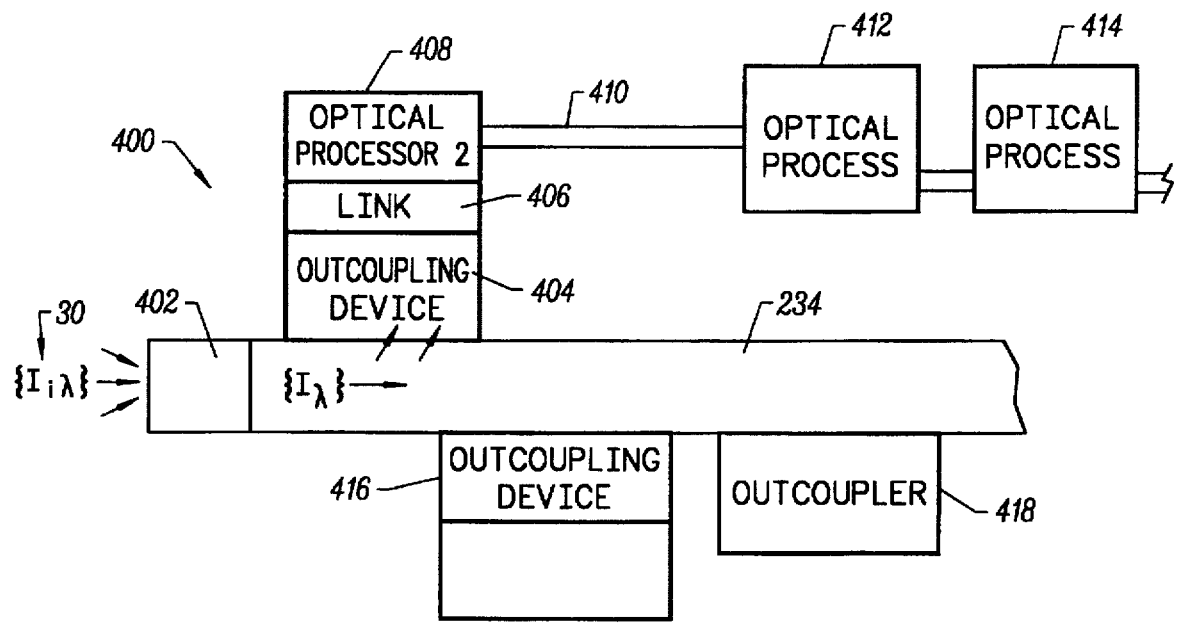
FIG. 22B schematically depicts a planar spectrometer or spectroscopic system, according to the present invention.
Figure 22C:
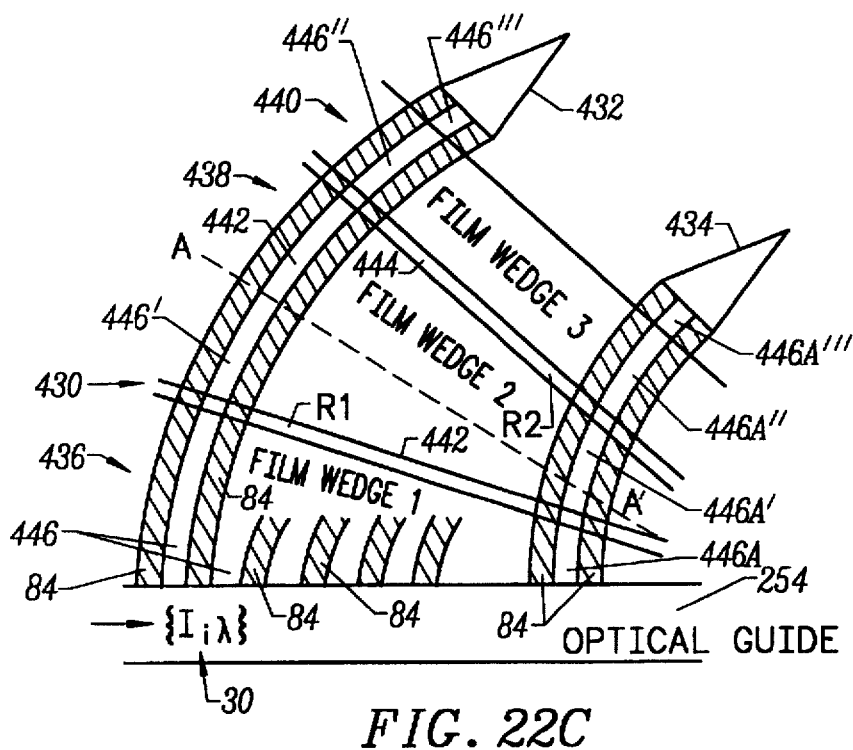
FIG. 22C is a plan view of a planar optical system, according to the present invention.
Figure 22D:
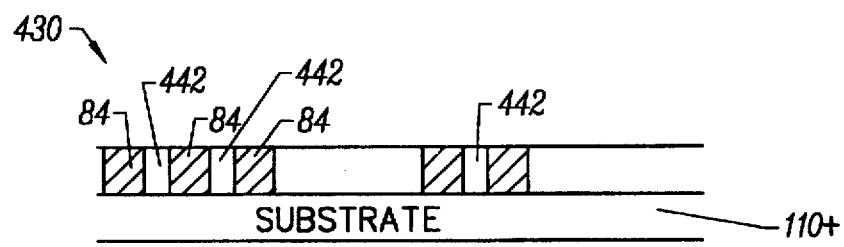
FIG. 22D is a cross-section of the embodiment of FIG. 22C taken along section line A–A'.

FIGS. 22B-22D depict other embodiments of the present invention using substantially planar optical processing devices. However these embodiments may incorporate various outcoupling and incoupling wedge filter devices as described herein.

FIG. 22B schematically depicts a planar spectrometer or spectroscopic device 400. Optical radiation of one or more wavelengths 20 is incident on an incoupling device 402, which may for example be a wedge filter, a diffraction grating, the end of a slab waveguide, a fiber optic cable, or the like. The thus incoupled optical radiation $\{I_\lambda\}$ propagates down optical waveguide 234, which may be a dielectric waveguide or a slab waveguide that supports many optical modes.

The propagating optical radiation $\{I_\lambda\}$ encounters optical outcoupler element 404, which outcouples at least a portion of $\{I_\lambda\}$ via a link 406 to a receiving element 408. Element 408 may be coupled via a transport element 410 to additional optical processing elements 412, 414. Of course, or sidecouplers such as 416 and 418 may also be provided for other functions.

Receiving element 408 may be one or more optical waveguides, a detector array, or some other device for optical or electronic processing. For example, if the receiving device is a collection of dielectric film optical waveguides (e.g., 446 in FIG. 22C) such dielectric waveguides may be regions of a wedge, for example, such as defined between the optical waveguide 232 and a reflector element 1, such as shown in FIG. 22C.

Figure 22E:
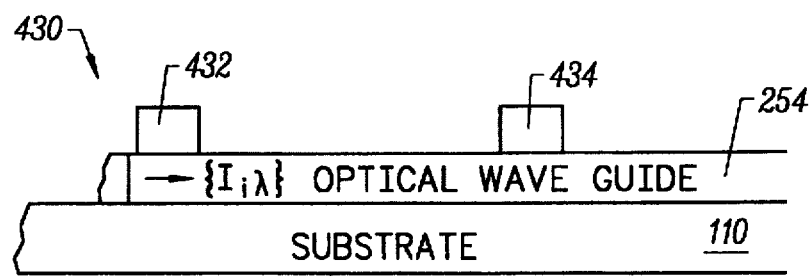
FIG. 22E is a side view of the embodiment of FIG. 22C.

FIG. 22C is a top view of a planar structure 430 that is fabricated on a substrate 110 (visible in FIGS. 22D and 22E). As best seen in FIG. 22E, atop substrate 110 is an optical waveguide 254, atop which are located optical outcouplers 432, 434. As shown in FIG. 22C, structure 430 includes (in this example), first, second and third film wedges 436, 438, 440. Also shown are reflector regions R1 or 442, and R2 or 444. Similar to what was described in FIG. 4, these wedges include crosstalk reducing gaps or grooves 84. When viewed from above, as in FIG. 22C, on sees bands of these grooves 84 separating regions, e.g., 446, of wedge filter, which wedge filter regions act as dielectric film optical waveguides.

In FIG. 22C, film wedge 1 may act as an impedance matching device for incoming radiation 30, film wedge 2 may act as a Fabrey-Perot filter, and film wedge 3 may act as an output impedance matching device. Incoming optical radiation that outcouples into waveguide region 446 can then propagate further, into planar dielectric optical waveguide region 446'. In so doing, the radiation experiences a Fabrey-Perot resonance environment created by reflector R1, reflector R2 and an in-between dielectric film that collectively forms a wedge filter.

Subsequent transmission along the planar dielectric optical waveguide from 446' into planar dielectric optical waveguide 446" can occur if the various resonance and other optical conditions are met. For example, region 446 may provide a first matching region, region 446' may provide a Fabrey-Perot resonator region, and region 446" may provide another matching region. These wedge region functions are similar to what has been described elsewhere herein for multiple wedge structures.

In a preferred embodiment, different modes for the different regions may be selected to control bandwidth, outcoupling (i.e., transmission) efficiency, and spectral range. The radiation propagating down the planar dielectric optical waveguide filter combination sequence provides wavelength selection of optical energy to be received at region 446''', e.g., by another dielectric optical waveguide (not shown) or coupled out of the planar spectrometer by wedge outcoupler 432. Similarly, other planar dielectric optical waveguide filter combinations (e.g., 446A, 446A', 446A", 446A''')

provide optical energy outcoupled from optical waveguide 254 and simultaneous wavelength or wavelength band selection.

By way of further example, the optical spectrum separated by the outcoupler distributed wavelength filter of dielectric wedges 436, 438, 440 in FIG. 22C may be delivered through a transporting mechanism 410 (see FIG. 22A) such as a collection of planar dielectric optical waveguides to further a further optical processing element (412, 414, FIG. 22B), such as a planar diffraction device. In this example, the diffracted radiation may further separate the optical radiation by wavelength into narrower bandwidth for delivery to a further optical processing device, such as a collection of fiber optical cables, and so on.

FIGS. 22D and 22E further depict the planar system of FIG. 22C. FIG. 22D is a cut side view of planar spectrometer device 430 (FIG. 22C), taken along direction A—A'. FIG. 22E is a side view of device 430.

The above described planar thin dielectric film spectrometer advantageously eases manufacture of high order Fabrey-Perot planar wedge etalons and wedge matching regions. This is because in a planar configuration, it is easy to control dimensions and to constrain the matching wedge and Fabrey-Perot wedge regions to have very high order numbers. As a result, very narrow bandwidth outcoupled radiation, large spectral range and good outcoupling transmission efficiency can be provided. Planar spectrometer according to the present invention also permits integration of various useful integrated optic devices, diffraction gratings, and other devices. Outcoupling up or down from the plane of the planar spectrometer via, e.g., distributed wedge filter devices attached to the optical waveguide as described herein, permits linking of preselected wavelength with optical devices on other substrates. Those skilled in the art will appreciate that these embodiments permit communications, optical computer applications, IC optical integration, and imaging, among other applications.

Applicants' optical waveguide combination with distributed wavelength outcoupling (and incoupling) devices additional useful device functions. By way of example, the outcoupling wedge filter structure 252 (FIG. 16A) and 238 (FIG. 15) can provide preselected separation of bands of radiation for many applications. In one example, the separated wavelengths can constitute the primary colors and be subsequently delivered to a receiving device comprised of several planar optical waveguides for display purposes. Such displays may include TV displays, liquid crystal displays, heads up displays, helmet counted displays, and other special purposes displays.

The outcoupling wedge devices can also provide other useful optical functions. By way of example, a wedge outcoupling device 238 (FIG. 15), 34 (FIG. 2), 240 and 238 (FIG. 15) may have multiple orders associated with one or more wavelengths. In such case, if optical radiation of, for example, a single wavelength, or several wavelengths, propagates down the optical guide 234, light at each wavelength will outcouple at multiple locations along the outcoupler - optical waveguide interface. For example, a single Fabrey-Perot wedge filter having 5 orders for a particular wavelength will in general outcouple light of that particular wavelength at 5 different locations along the optical waveguide 234. The amount of light outcoupled at each location (not shown) is controlled by the impedance function which can be designed into the device and provided by the thin film wedge filter, for example. In this example, the distributed wavelength outcoupling device is a beam splitter.

In the various embodiments, the beam splitting can be out of a slab waveguide, or along a planar system such as represented in FIG. 22C. While several of the various representations of the devices may show, for example, outcoupling from an optical waveguide 234 via an outcoupler into a measurer/detector, it will be recognized that other optical processing devices can be used in place of the detector, or prior to detection.

With further reference to FIG. 22C, outcoupler 432 can provide other useful functions. By incorporating electronically altering mechanisms, such a liquid crystal dielectric constant variation with applied voltage, one can to some extent direct the exiting radiation. For example, if a single wavelength of coherent light is delivered along optical waveguide 254, and then further outcoupled to an electronically controlled outcoupler 432, the interference of the various exiting beam components of the coherent light can interfere, providing constructive and destructive interference. By controlling the phase of the exiting light, an array of such outcouplers could provide a beam steering features. Further, such beam steering structure can be reciprocal, receiving coherent light multiplexed in the optical waveguide 254, and detected further down the optical waveguide by a detector (not shown). In this example, the planar spectral imaging device of FIG. 22C provides an directed reception mechanism.

The distributed wavelength selection devices of the inventions can be used to provide phase shifting functions. In this example, a portion of an optical carrier propagating down an optical waveguide 254, for example, can be partially outcoupled at one location such as via optical waveguide 446. Upon exiting at 446''', the exiting radiation can be reintroduced to the optical waveguide 254 with a delay. The merging of this outcoupled radiation component with the remaining radiation in the waveguide can shift the phase of the optical radiation in 254. Such phase shifting can have application in beam steering and direction interrogating structures.

It will be appreciated that the present optical guides can incorporate impedance functions (including "stretch" functions) that provide narrow band outcoupling versus wavelength as a function of location. Such optical guide systems may be used to outcouple selective bands of radiation, which may be relatively wide bands. This function is useful in outcoupling bands of color for example in liquid crystal, heads up, helmet mounted or other display applications. The thus outcoupled bands of light can be directed along planes of an optical guide that comprises a sandwich of multiple planes, each perhaps corresponding to a separate color. Further, one can incorporate a pattern of outcoupling switches along such planes. So doing would allow selective writing and display, including only colors associated with a particular plane.

Alternatively, such systems can provide flat panel color TV displays. For example, liquid crystals have dielectric constants that are a function orientation of the liquid crystal molecular orientation, which in turn is controlled by voltage applied to the different pixel locations. By designing planar guides and outcoupling devices according to the present invention, one orientation of a crystal can be caused to correspond to no outcoupled light for a color at a pixel location. By contrast, another crystal orientation cam correspond to maximum outcoupled light of predetermined amount, with inbetween biasing providing a range of outcoupled light intensities. By introducing a fanning function into the planar guides, which fan to multiple optical planar guides, a large array of readout pixels can be generated, each having the same range of output optical energy.

The present thin film optical guides and slab waveguides can also incorporate outcoupling devices with electrically controlled properties. Such configuration permits directing outcoupled light to different locations, or scanning the outcoupled light over a solid angle in front of a screen. Scanning could occur at a fast scan rate to provide a wide field of view display, e.g., for heads up, flat panel TV, or front windshield automobile information projection applications.

It will also be appreciated that the present optical waveguide distributed wavelength filter systems can be used for splitting an incident optical beam into identical or different portions or subsets with preselected properties. Such splitting can be combined with reassembling of the differing radiation portions that have traversed different path lengths or environments, and thus have different phases. Such reassembly of optical radiation can be used to implement a phase shifting device.

FIGS. 23A–23G are directed to shadow masking processes for fabricating various embodiments of the present, including manufacturing graded film thickness and graded material property composition elements.

Unfortunately, prior art wedge filter fabrication technology is not well suited for batch processing and microfilter fabrication, especially where an IC wafer is to include many detector array chips. As was noted, prior art manufacturing techniques are not static, and cannot readily and flexibly provide thin film parameter control, especially where fabrication of large and small dimension films with spatially varying geometrical, optical and material property characteristics is desired. As will now be described, the present invention provides methods and processes suitable for batch processing of distributed wavelength discriminating devices for hybrid and IC integrated optical spectrometer structures, among others.

FIG. 23A-G illustrate various embodiments of the shadow masking thin film fabrication systems suitable for applications to the current inventions.

Figure 23A:
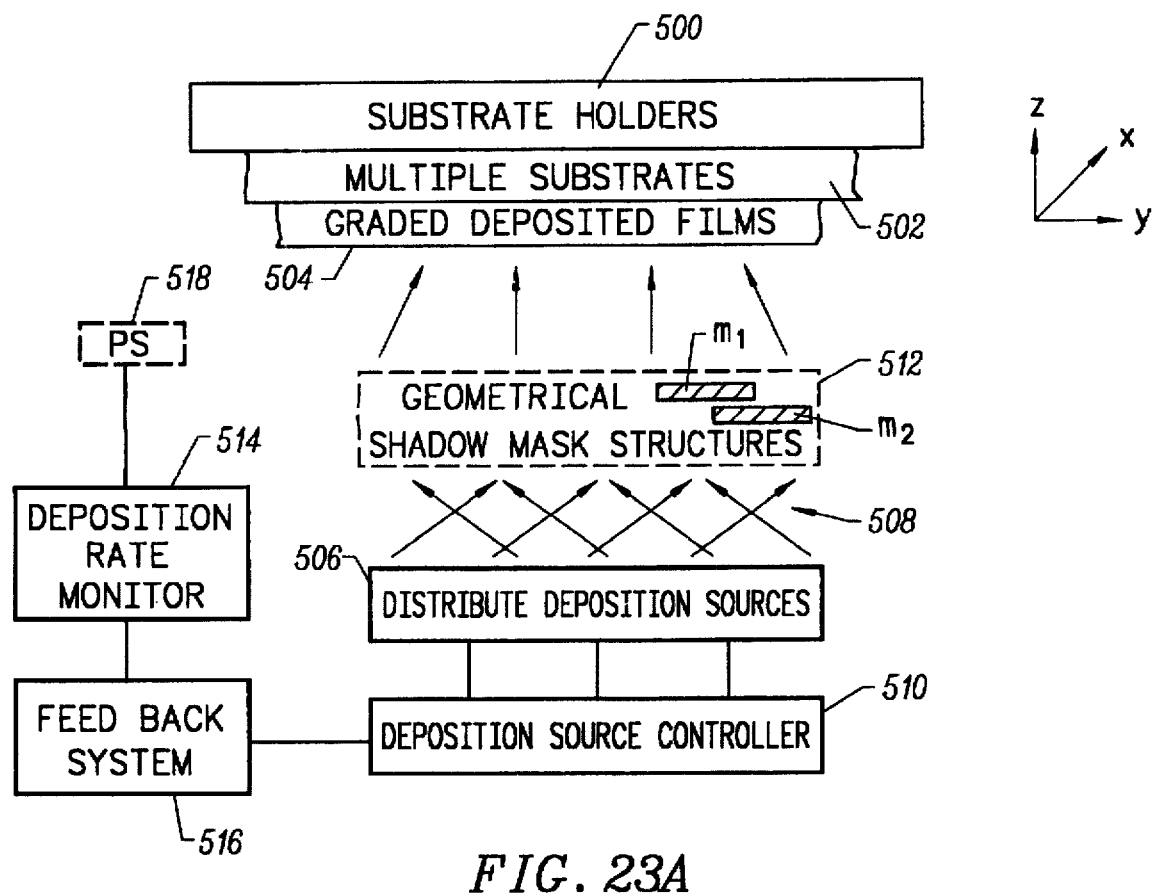
FIGS. 23A–23G depict various aspects of shadow masking, multiple source masking for batch production of spatially dependent films, according to the present invention.

FIG. 23A schematically represents the present generic related system for batch processing. A holder 910 retains one or more substrates 502 on whose lower (in FIG. 23A) surface graded thin films 504 are to be deposited. According to the present invention, this grading may be spatial in one or in all three dimensions (x, y, z). Further, the grading can be in dimension and/or material properties over very large ranges of dimension. The process described below functions well for metals and dielectric materials.

In FIG. 23A, which is intended to be a depiction of generic shadow masking, one or more distributed deposition sources 506 provide an inhomogeneous thin film deposition rate 508 that are controlled by a controller unit 510. This system generally uses mechanical masks 512 that are fixed in place, thereby avoiding moving mask limitations.

Because deposition source 506 is distributed, the geometrical mask structure 512 shadows the deposition, thereby creating different deposition rates at different locations along the substrates 502. Where the deposition rate is high, the resultant film is relatively thick, and where the deposition rate is low, the film will be relatively thin. This spatial variation in deposition rate creates a graded film thickness. Film thickness control is provided by rate monitoring 514, which is fed back via 516 to the power supply control 518 for the distributed deposition source 506.

Figure 23B:
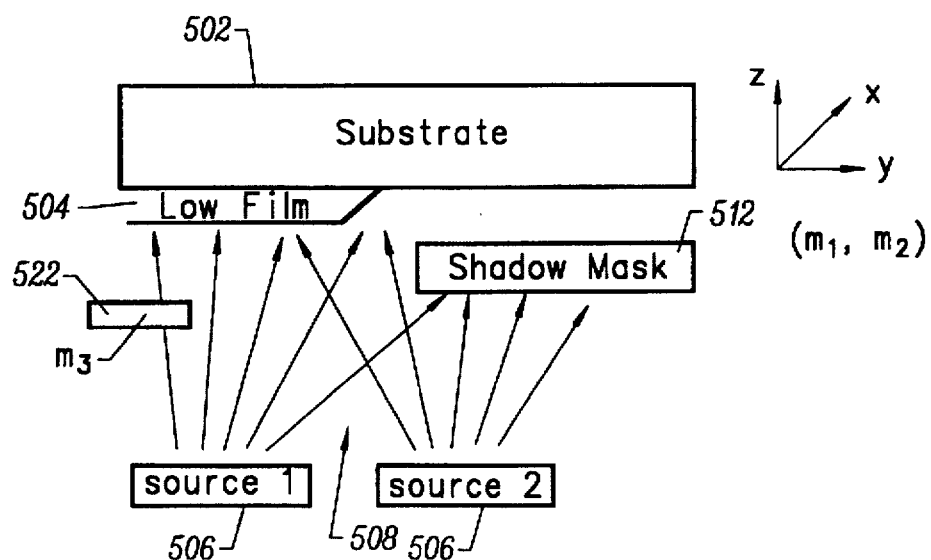

As shown in FIG. 23B, multiple deposition sources (e.g., 506, 506') may be used, with multiple shadow masks, e.g., m1, m2, m3. Of course more (or less) than two deposition sources and more or less than three shadow masks may be used. In general, the mechanical masks may have various shapes such as straight edged, circular edge. Further, different masks may generally be placed a different distance between the substrate and the deposition sources to provide films of particular properties. These distances control the detailed geometrical variation of the deposited thin film. It can be shown theoretically that the resultant regions can be very linear in character, when using a distributed source, mask, and substrate arrangement as described herein.

Further, the deposition sources may be distributed in one or two dimensions and may be of crucible, wire, or other geometry as needed to acquire the thin film variation desired.

As further shown in FIG. 23B, deposition can produce a thin wedge shaped film 522 having a gradient region 524 that is controlled by the location of the masks (e.g., m1, m2) associated with shadow mask structure 512. By adjusting mask structure 512, the slope of the deposited film's wedge region 524 may be easily controlled. By way of example, using this method, one can readily fabricate wedges of linear dimension ranging from a few microns to several inches. Further, the control of the wedge dimension may be readily and reproducible determined by preselected locations of the shadow masks (e.g., m1, m2, m3). It is understood that shadow mask structure 512 may in fact include more than two or three masks.

Figure 23C:
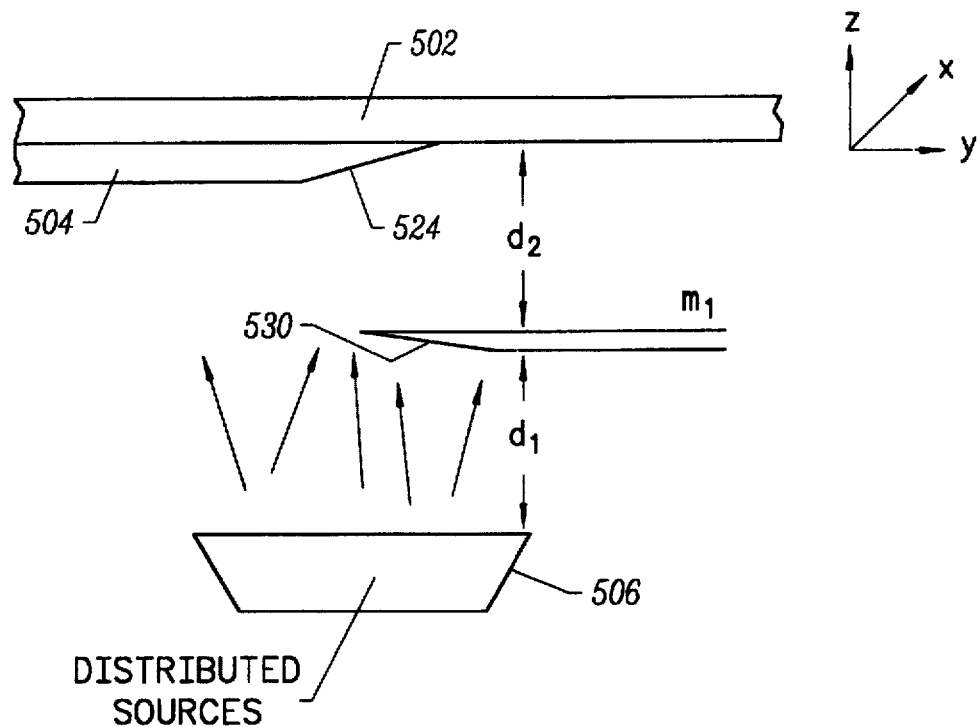

As shown by FIG. 23C, the masks, e.g., m1, may have a profiled edge, and may be disposed a desired distance d1 from the distributed source(s) 506, and a desired distance d2 from the deposition target region. By using large sources, which are readily available in the IC industry, for example, wedge shaped films may be simultaneously deposited on many substrates in a single process step. By using shadow masks m1, m2 that incorporate array patterns, multiple sites on each substrate can be covered with identical wedge shaped films in a single process step. In this manner, batch processing of a great many filters in a sequence of process steps can be achieved.

Figure 23D:
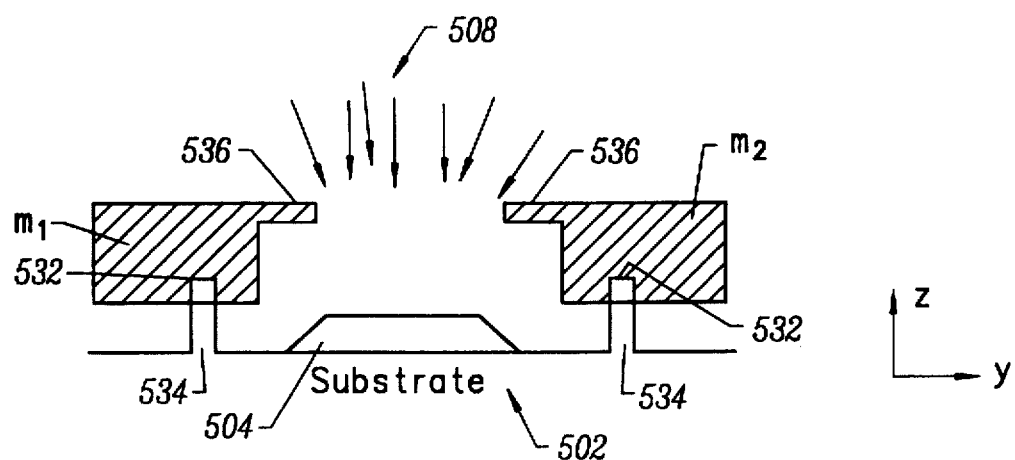

FIG. 23D depicts profiles of masks, e.g., m1 and m2. These mask structures can be for example micromachined from silicon with high precision and reproducibility. These masks can be patterned with alignment grooves 532 that mate with precisely located ridges 534. So doing can provide precision alignment, with masking edge 536 in close proximity to the location of the deposition film 504. The fabricated wedge profile feature 524 may be very small, with wedge dimensions being controlled by mask, source, and substrate relative distances and locations.

Figure 23E:
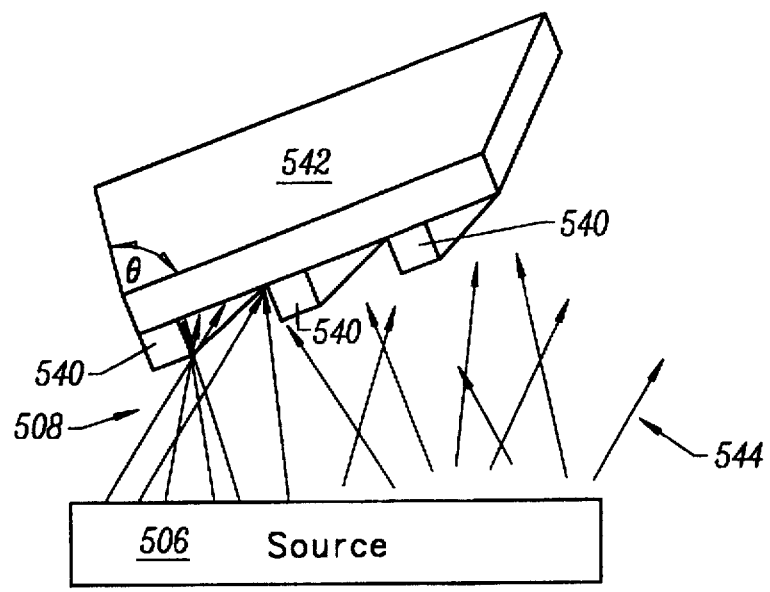

FIG. 23E depicts integrated shadow masks 540 on a substrate 542. Such masks can be created with respect to the direction of deposition beam source 506 such that the diverging deposition beam 544 provides preselected wedge profiles upon the substrate 542.

Applicants' shadow masking wedge fabrication technology is compatible with the deposition of many different materials, including metals, dielectrics, insulators, semiconductor, among others.

Further, the described shadow masking deposition method is compatible with many types of deposition sources. For example, wedges can be formed using thermal evaporation, e-beam evaporation, sputtering, CVD sources with aperture controls, and any other deposition source where the deposition beams are divergent or inhomogeneous.

Fabrication of a wedge filter structure such as the current invention takes occurs with a series of deposition process steps. For each step, the source to substrate, the source to mask, other spatial location features, and the number and distribution of shadow masks is easily set and controlled at each step, reproducibly.

The shape of the wedge region in two dimensions can be controlled with great flexibility through the use of mask shapes and location. Circular films, rectangular films, triangular films and many other geometries can be fabricated. Special shapes may be desired for selected applications, such as in special purpose imaging where, for example, the image is always of a particular geometry.

Figure 23F:
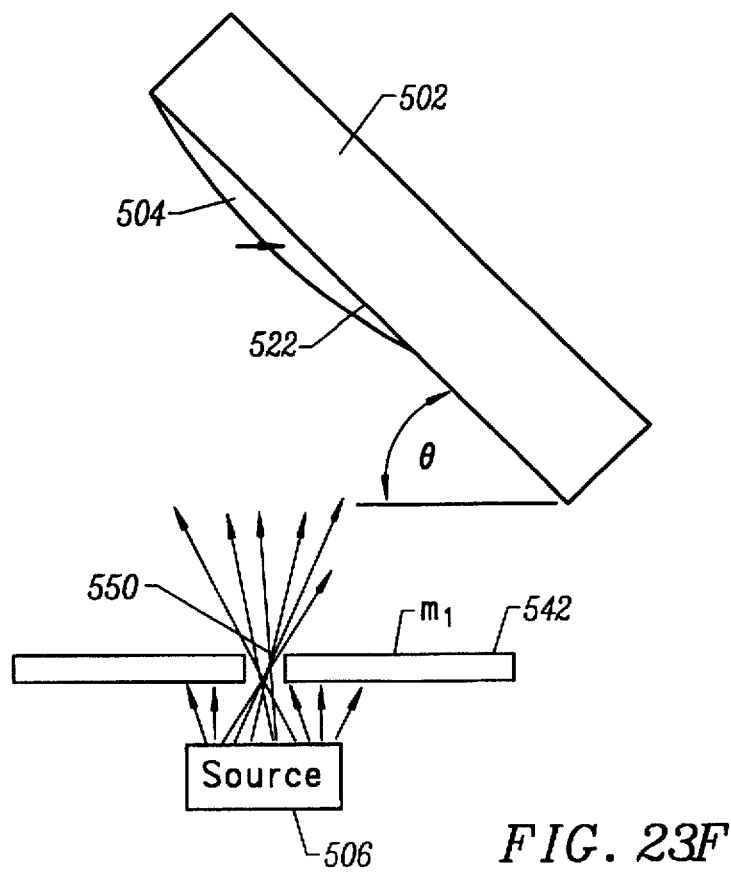

As shown in FIG. 23F, in some embodiments, at least one mask m1 includes an aperture 550 (or in fact a pattern of apertures). Forming such apertures is readily accomplished as ml may be made from etching a silicon micromachined mask. Aperture 550 permits some deposition beams from underlying source 506 to pass, going toward the target region. By tilting substrate 502 through a desired angle θ, the resultant film 504 can have a desired non-symmetry 552.

For example, sawtooth cross section films can be fabricated by use of a series of apertures, or by using a series of bars that can result from etching a silicon micromechanical mask, e.g., ml or 512. By way of additional example, stretch filters having multiple linear, or non-linear slopes are easily fabricated using the disclosed shadow masking method.

Figure 23G:
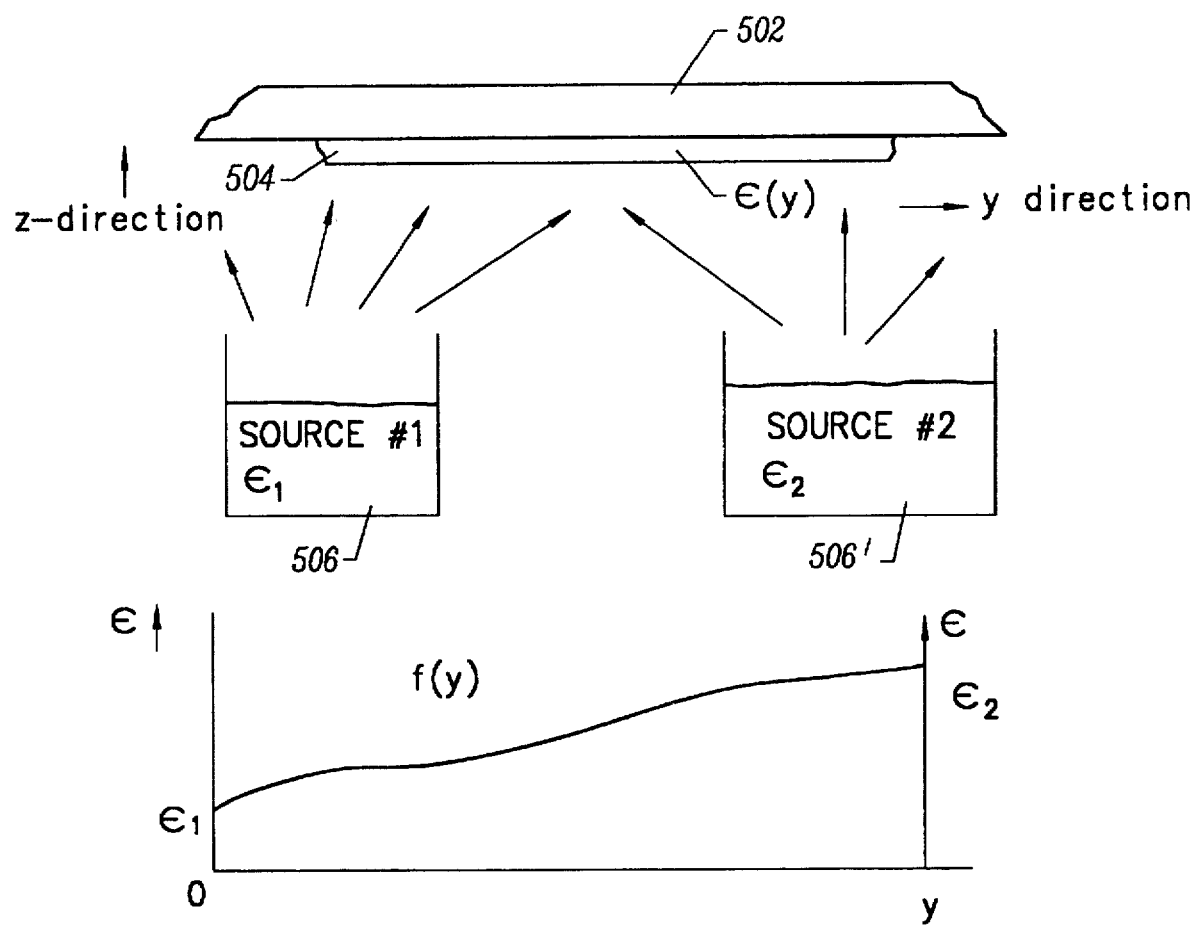

FIG. 23G depicts the use of two sources 506, 506' to create dielectric film 504 on substrate 502, wherein the sources deposit two different materials having different dielectric constants. A shadow mask may or may not be used, depending on thin film properties targeted. The mix of the two deposition beams from sources 506, 506' provides the desired thin film dielectric gradient ε(y) as a function of the y-axis dimension, as shown. As described elsewhere herein, such graded dielectric films find use in distributed wavelength wedge filters, graded index lens functions, among other functions.

Incorporation of a homogeneous film with a multiply graded shadow mask generated film can be used to fabricate stepped optical filter devices as disclosed herein. For example, a thin film may be patterned with a step. Next, a graded wedge film may be deposited to provide the appropriate step profile for distributed wavelength discrimination. This can provide selective optical wavelength band removal, as described herein. Spatially varying glassy, dielectric, and reflector thin films can be deposited with preselected profiles and subsequently patterned for special function filters.

The shadow masking method can also be applied to fabricating multiple microfilters according to the invention, either as discrete filters or in long strips covering a particular line of imaging pixels, for example. Applications of such arrays of distributed wavelength microfilters include imaging in primary colors, or in other preselected wavelengths. For example, the imaging microfilter and detector array may be fabricated for a specific imaging target such as a pollution signature.

Modifications and variation may be made to the disclosed embodiments without departing from the subject and spirit of the invention as defined by the following claims.

What is claimed is:

1. A substantially linear optical device (i.e., an optical device with locally linear regions, such as might be fabricated on a curved or flat substrate) with a filter plane defined by an x-axis and a y-axis, a normal defined by a z-axis and a lateral defined by said y-axis, comprising:

(a) an optical waveguide means for guiding propagating optical energy or light along an energy average propagation or vector direction parallel to said y-axis, said propagating light being character by an energy distribution and a bandwidth, and (b) a wavelength selective filter comprising an outcoupling device for selecting wavelengths from said energy distribution of said propagating light and delivering spatially distributed outcoupled radiation charactertized by said selected wavelengths at separate outcoupling positions longitudinally along said wavelength means.

2. The optical device of claim 1 wherein said wavelength selective filter outcouples said outcoupled radiation away from said optical waveguide means, thereby generating said outcoupled radiation, in such a way that some of said selected wavelengths are spatially distributed with outcoupling positions that are a function of y-axis location along said waveguide means.

3. The optical device of claim 2 wherein said wavelength selective filter comprises an influencing thin film structure located proximally to said waveguide means, said influencing thin film structure presenting a spatially dependent optical impedance to said propagating optical energy or light.

4. The optical device of claim 3 wherein said influencing thin film structure comprises at least one film type selected from the group consisting of a graded dielectric constant thin film, a spatially graded dielectric film, an electro-optic film, a liquid crystal layer, a wedge shaped filter comprising an etalon thin film with at least one reflector film, a lossy film, a reflecting film, a conducting film, an optically active dielectric film and a spatially patterned film.

5. The optical device of claim 4 wherein said wedge shaped etalon thin film comprises a plurality of wedge shaped dielectrics to provide at least one transmission feature improvement of transmission features of said optical device, said at least one transmission feature improvement being selected from the group consisting of improving transmission coefficient, increasing spectral range, decreasing bandwidth and polarization.

6. The optical device of claim 5 wherein said plurality of wedge shaped dielectrics comprise different wedge dielectric films with spatially dependent thicknesses described by different orders.

7. The optical device of claim 6, wherein said orders and thickness are chosen to provide improved spectrometer performance, wherein said performance is at least one of (a) output coupling efficiency, (b) spatial bandwidth, (c) frequency bandwidth, (d) spectral range and (e) system transmission coefficient.

8. The optical device of claim 5 wherein said at least one transmission feature is selected from a group consisting of a plurality of wedge shaped dielectrics to provide at least one transmission feature improvement of transmission features of said optical device, said at least one transmission feature improvement being selected from the group consisting of improving transmission coefficient, increasing spectral range, decreasing bandwidth and polarization.

9. The optical device of claim 4 wherein a component of said outcoupled radiation has an outcoupling direction that is along the z-axis and away from said influencing thin film structure.

10. The optical device of claim 9 wherein said outcoupled light has an outcoupling direction that is to the side and out of said influencing thin film structure.

11. The optical device of claim 4 wherein a portion of said outcoupled light characterized by particular wavelengths of said selected wavelengths is reinserted as reinserted light into a second optical guide to combine with a second propagating optical wave.

12. The device of claim 11 wherein said second propagating optical wave is selected from the group consisting of at least a part of said propagating light in said optical waveguide means, a different optical wave at a second wavelength identical to one of said particular wavelengths, and a different optical wave at a third wavelength different from said particular wavelengths, said device thereby providing at least one function arising from said combining of said reinserted light with said second propagating optical wave selected from the group consisting of a phase shift, an amplitude change, an interference, a beat, a hologram and diffraction.

13. The optical device of claim 4 wherein said wedge shaped filter has a spatial gradient causing a thickness variation that takes said wedge filter through several different orders such that the wavelength range of said radiation is replicated along said y-axis of said wedge shaped filter and each successive replication has a different bandwidth parameter.

14. The optical device of claim 3 wherein said influencing thin film structure further comprises a plurality of wedge shaped etalon thin films providing at least one useful function selected from the group consisting of beam splitting, phase control, switching of outcoupling radiation, amplitude control of outcoupling radiation, delivery of selected wavelengths of optical radiation to a separate regions for additional optical processing, holographic function, interference function, propagation direction alteration, delivery to a different optical waveguide, radiation intensity increase, radiation intensity decrease, combining outcoupling radiation with a second optical beam, subtracting outcoupling radiation from a second optical beam, adding outcoupling radiation to a second optical beam, amplifying, mixing and influencing or controlling optical functions of other optical devices.

15. The optical device of claim 3 wherein a component of said outcoupled radiation has an outcoupling direction that is along the z-axis and away from said influencing thin film structure.

16. The optical device of claim 3 wherein a component of said outcoupled radiation has an outcoupling direction that is selected from the group along said z-axis, and edge.

17. The optical device of claim 3 wherein said outcoupled radiation is coupled to at least one item selected from the group consisting of a second optical waveguide, a detector, a hologram device, a diffraction device, a filter device, an optical wavelength selecting device, a microlens, a prism, a reflector, a second thin film structure with or without parameter spatial variation and an optical readout device.

18. The optical device of claim 3 wherein said outcoupled light has an outcoupling direction that is to the edge of said influencing thin film structure.

19. The optical device of claim 1 wherein said wavelength selective filter has a spatially varying property that varies as a function of location along said energy average propagation direction.

20. The optical device of claim 19 wherein said spatially varying property influences outcoupling of said outcoupled radiation as a function of said selected wavelengths such that at least two of said wavelengths couple out at different locations along said optical waveguide means thereby providing a spectrometer function.

21. The optical device of claim 20 wherein said optical waveguide means comprises at least one waveguide member selected from a group consisting of a dielectric film whose thickness varies as a function of location in at least one dimension, a dielectric film whose dielectric constant varies in at least one dimension, an optical slab waveguide, a single mode thin film optical waveguide, a multimode film optical waveguide, a dielectric optical waveguide, a fiber optic cable, a waveguiding substrate and a waveguiding substrate film.

22. The optical device of claim 21 wherein said optical waveguide is imbedded in a dielectric material.

23. The optical device of claim 21 wherein the amount of said light outcoupled at each location along an exit interface for said outcoupling device is controlled by an impedance function designed into said outcoupling device and provided by a thin film wedge filter provided on said outcoupling device.

24. The optical device of claim 23 wherein said waveguide is a slab waveguide, a dielectric waveguide or a planar system.

25. The optical device of claim 21 further comprising an optical switching device in a configuration selected between said outcoupling device or along said optical waveguide, wherein said optical switching device provides at least one feature selected from the group consisting of AC modulation of said optical energy or light, preselected and controlled removal of particular bands of said bandwidth, introduction of desired phase, introduction of desire attenuation of said outcoupled radiation, introduction of control of desired amplitude of said outcoupled radiation, introduction of desired phase of said outcoupled radiation and introduction of desired polarization.

26. The optical device of claim 1 wherein said wavelength selective filter comprises a plurality of filter members, each of said filter members spatially distributing incoming optical radiation; such that said filter members split said incoming optical radiation into a plurality of transmitted beams.

27. The optical device of claim 26, wherein said filter members have spectral characteristics that are identical, thereby providing said transmitted beams with identical optical characteristics.

28. The optical device of claim 1 wherein said wavelength selective filter comprises a dielectric wedge element with a step discontinuity in said dielectric's thickness, said step discontinuity producing a discontinuity in optical impedance of said wedge, thereby causing a discontinuity in wavelengths of radiation outcoupled by said wavelength selective filter.

29. The optical device of claim 1 wherein said wavelength selective filter comprises a wedge shaped impedance element disposed above said y-axis of said optical waveguide means and an intermediate layer selected from the group consisting of an optical reflector, voltage controlled absorber or voltage controlled optical switch interposed between said wedge shaped impedance element and said optical waveguide means; said intermediate layer thereby controlling the outcoupling from said impedance element and said waveguide means and providing at least one optical processing function selected from the group consisting of attenuation, phase shifting, amplitude and frequency modulation of said outcoupled light.

30. The optical device of claim 1 further comprising a graded dielectric region between said waveguide means and said wavelength selective filter to create more normal incidence on said wavelength selective filter and altered wavelength discrimination characteristics.

31. The optical device of claim 1 wherein said wavelength selective filter is a stretch filter comprising a first filter region with a first slope and a second filter region with a second slope, said second slope being less than said first slope; such that wavelengths of optical radiation exiting said filter are spread out along said y-axis of an associated detector.

32. The optical device of claim 1 wherein said wavelength selective filter outcouples said outcoupled radiation away from said optical waveguide means, thereby generating outcoupled light or radiation.

33. The optical device of claim 32 wherein said wavelength selective filter's orientation with respect to said waveguide means is selected from a group consisting of an extension of said waveguide means or adjacent to said waveguide means.

34. The optical device of claim 32 wherein said outcoupled light is coupled by said wavelength selective filter to at least one structure selected from a group consisting of a thin film, a detector, an optical waveguide, a diffracting structure, a holographic structure, a fiber optic cable device, a wavelength sating device, a wavelength multiplexing device, a distributed wavelength outcoupling device, a distributed wavelength incoupling device, a dielectric medium, air, and free space.

35. The optical device of claim 1 wherein said wavelength selective filter incorporates at least one distributed wavelength filter.

36. The optical device of claim 35 wherein said distributed wavelength filter comprises at least one wedge filter component.

37. The optical device of claim 1, wherein said optical waveguide means is a non-rectilinear structure of substantially planar local waveguide regions, said y axis therefore being a local y axis defining said energy average propagation direction in each of said local waveguide regions.

38. The optical device of claim 1, wherein said wavelength selective filter comprises a combination of wedge structures and provides at least one optical system characteristic selected from the group consisting of a large spectral range, a non-continuous range of output wavelengths, more than one region of outcoupling radiation, improved outcoupling efficiency, a distribution of outcoupling coefficients, a distribution of outcoupling frequency bandwidths, a distribution of spectral ranges, a distribution of intensity amplitudes, repetition of outcoupled optical radiation, a distribution of bandwidths and a distribution of spatial bandwidths.

39. The optical device of claim 38 further comprising a graded dielectric film situated between one of said wedge structures and said optical waveguide means, said one wedge structure being a wavelength discriminating wedge structure, said graded dielectric film influencing said propagating light to generate a third light signal with a third propagation direction more normal to said wavelength discriminating wedge structure than light otherwise exiting said waveguide means and coupling said third light signal to said wavelength discriminating wedge structure, thereby altering wavelength discrimination characteristics of said one wedge structure.

40. The optical device of claim 39, further comprising a first thin film structure adjacent said optical waveguide means where said first thin film structure assists in outcoupling of said propagating light and assists in coupling said propagating light to an optical detection device.

41. The optical device of claim 40 wherein a plurality of wavelength discriminating and spatially separating second thin film structures are mounted on said optical waveguide means to provide optical radiation outcoupling from said waveguide means through each of said second thin film structures.

42. The optical device of claim 41 wherein at least two of said second thin film structures are adjacent to said optical waveguide means in at least one configuration selected from the group consisting of two identical said second thin film structures, two said second thin film structures providing different bands of output optical radiation with at least one different characteristic selected from the group consisting of different outcoupling efficiencies and bandwidths.

43. The optical device of claim 42 wherein said wavelength selective filter is a wedge dielectric structure that has thickness related properties of multiple orders along its surface leading to coupling of at least some of the same wavelengths at more than one location along the optical propagation direction.

44. The optical device of claim 43 wherein said outcoupled optical radiation at two different wavelengths exiting said optical waveguide means at two different locations maintains constant at least one parameter selected from a group consisting of amplitude relative to the propagating amplitude, spatial wavelength, frequency bandwidth where the amplitude of the emitted radiation is the same for the same percentage of the incident radiation at for at least two different wavelengths at least two said locations.

45. The optical device of claim 43 wherein said wedge dielectric structure includes higher orders and allows the same wavelength centered radiation band to exit said optical wavelength means at different spatial regions.

46. The optical device of claim 42 wherein said second thin film structure includes at least two dielectric, wavelength discriminating films which when superimposed constrain the exiting radiation to be of a substantially non continuous range of wavelengths with at least two wavelengths of exiting radiation being significantly different and spatially separated.

47. The optical device of claim 42 wherein said two second thin film structures provide different bands of output optical radiation with at least one different characteristic selected from the group consisting of different outcoupling efficiencies and bandwidths.

48. The optical device of claim 1 further comprising at least one incoupling device selected from a group consisting of a diffraction grating, a holographic structure, direct incidence onto the optical waveguide means, a dielectric waveguide a prism, a groove, an optical device incorporating at least one lens, a dielectric waveguide, a thin film coating, a textured surface, and a graded index lens, such that said incoupling device introduces/incouples said optical energy or light into said waveguide means.

49. An optical energy transfer system comprising:
(a) an optical waveguiding structure to carry propagating optical energy or light, said propagating light including at least one optical carrier, each of said optical carriers having different carrier wavelengths;
(b) at least one wedge filter structure, each of said wedge filter structures having a first and second surface, said first surface located adjacent said optical waveguiding structure and performing an optical function selected from the group consisting of outcoupling said propagating energy from said optical waveguiding structure or incoupling incident light illuminating said second surface into said optical waveguiding structure, said wedge filter structures performing said outcoupling being called outcoupling structures, said wedge filter structures performing said incoupling being called incoupling structures.

50. The optical energy transfer system of claim 49 further comprising an optical receiving structure located adjacent to said second surface of at least one of said outcoupling structures, said at least one of said outcoupling structures thereby outcoupling at least one of said optical carriers from said optical waveguiding structure into said optical receiving structure.

51. The optical energy transfer system of claim 49 wherein said optical waveguiding structure includes at least one optical processing structure selected from the group consisting of at least one integrated circuit, a multichip circuit or discrete electronic components, said optical processing structure generating a second light signal from said propagating light, said second light signal propagating in said optical waveguiding structure.

52. The optical energy transfer system of claim 51 wherein said outcoupling structures and said incoupling structures are located in at least one processing configuration selected from the group consisting of said outcoupling and incoupling structures located (1) on one said integrated circuit, (2) on different ones of said integrated circuits, (3) on different ones of said electronic components and (4) on different chips of said multichip circuit.

53. The optical energy transfer system of claim 52 wherein at least one of said outcoupling and incoupling structures located on one said integrated circuit is for receiving/transmitting off said integrated circuit at least one of said optical carriers, said outcoupling and incoupling integrated structures located at different spatial locations of said optical waveguiding structure.

54. The optical energy transfer system of claim 49 wherein said incident light includes one or more optical carriers, each of said optical carriers having at least one wavelength, said wedge filter structure incoupling at least one of said optical carriers into said optical waveguiding structure.

55. The optical energy transfer system of claim 54 wherein said wedge filter structure also performs an optical processing function on said at least one optical carrier incoupled by said wedge filter structure.

56. The optical transfer system of claim 54 including an optical receiving structure selected from the group consisting of a second wedge filter, a second optical waveguide, at least one detector, a holographic structure, a thin film structure, an attenuating structure, a wavelength shifting structure, an amplifying structure or a mixing structure.

57. The optical energy transfer system of claim 49 wherein said optical transfer system provides at least one optical processing function selected from the group consisting of demultiplexing or multiplexing said incoupled and outcoupled light.

* * * * *